(12) United States Patent
Holroyd et al.

(10) Patent No.: US 9,527,532 B2
(45) Date of Patent: Dec. 27, 2016

(54) THREE WHEELED VEHICLE

(71) Applicant: Polaris Industries Inc., Medina, MN (US)

(72) Inventors: James A. J. Holroyd, Stillwater, MN (US); Brian T. Utter, Greenbush, MN (US); Jason J. Hohenstein, East Bethel, MN (US); Todd L. Rachel, Scandia, MN (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 14/639,475

(22) Filed: Mar. 5, 2015

(65) Prior Publication Data

US 2015/0175209 A1    Jun. 25, 2015

Related U.S. Application Data

(63) Continuation of application No. 13/425,949, filed on Mar. 21, 2012, now Pat. No. 9,004,214.

(Continued)

(51) Int. Cl.
*B62D 21/18* (2006.01)
*B62K 5/05* (2013.01)
(Continued)

(52) U.S. Cl.
CPC ............ *B62D 21/18* (2013.01); *B62D 61/065* (2013.01); *B62J 1/00* (2013.01); *B62J 17/00* (2013.01); *B62K 5/05* (2013.01); *B62K 5/06* (2013.01); *B62K 5/08* (2013.01); *B62K 7/02* (2013.01); *B62K 25/04* (2013.01); *B62K 25/283* (2013.01); *B62K 2003/125* (2013.01); *B62K 2201/08* (2013.01)

(58) Field of Classification Search
CPC .......... B62D 21/18; B62D 61/065; B62J 1/00; B62J 17/00; B62K 25/283; B62K 7/02; B62K 25/04; B62K 5/06; B62K 5/05; B62K 5/08; B62K 2201/08; B62K 2003/125

See application file for complete search history.

(56) References Cited

U.S. PATENT DOCUMENTS 4,453,763 A   6/1984 Richards
7,090,234 B2 * 8/2006 Takayanagi .......... B60G 21/007
                                                180/210

(Continued)

OTHER PUBLICATIONS

Ace Cycle Car Liberty Motors, available at http://cycle-car.com/, available at least as early as Jan. 10, 2007, 3 pages.

(Continued)

*Primary Examiner* — Paul N Dickson
*Assistant Examiner* — Darlene Condra
(74) *Attorney, Agent, or Firm* — Austin A. Holt

(57) ABSTRACT

A three wheeled vehicle is disclosed having a vehicle frame with a frame sidewall providing a substantially flat surface, with recesses in the flat surface. Alignment arms have inner ends and outer ends, where the inner ends are mounted to the frame sidewall, and the outer ends mount a wheel hub. The inner ends have couplings with pivotal portions and fixed portions, the pivotal portions being at least partially positioned within the recesses, and the fixed portions being attached to the substantially flat surface.

24 Claims, 62 Drawing Sheets

Related U.S. Application Data

(60) Provisional application No. 61/454,911, filed on Mar. 21, 2011.

(51) Int. Cl.
| | | |
|---|---|---|
| *B62K 5/08* | (2006.01) | |
| *B62K 25/04* | (2006.01) | |
| *B62K 25/28* | (2006.01) | |
| *B62J 1/00* | (2006.01) | |
| *B62J 17/00* | (2006.01) | |
| *B62K 5/06* | (2006.01) | |
| *B62K 7/02* | (2006.01) | |
| *B62D 61/06* | (2006.01) | |
| *B62K 3/12* | (2006.01) | |

(56) References Cited

U.S. PATENT DOCUMENTS

| 7,516,998 B1* | 4/2009 | Berg | B60N 2/24 |
| | | | 180/210 |
| 2007/0251745 A1* | 11/2007 | Codere | B62K 5/027 |
| | | | 180/210 |
| 2009/0224497 A1* | 9/2009 | Seiter | B62D 21/183 |
| | | | 280/62 |

OTHER PUBLICATIONS

Ace Newsletter, Photograph from the Seattle International Auto Show, available http://cyclecar.com/newsletter.htm, dated Apr. 2010, 2 pages.
BBC Autos, "Top Mog: The improbable triumph of the Morgan 3 Wheeler," available at http://www.bbc.com/autos/story/20140706-top-mog-the-3-wheeler-triumphant, dated Jul. 6, 2014, 8 pages.
BBC Autos, "Top Mog: the improbable triumph of the Morgan 3 Wheeler," available at http://www.bbc.com/autos/story/20140706-top-mog-3-wheeler-triumphant, dated Jul. 25, 2014, 7 pages.
Black Jack Zero, "Zero Development," available at https://web.archive.org/web/20070802060638/http://www.blackjackzero.com/pages/zero_development.html, available at least as early as Aug. 2, 2007, 2 pages.
Black Jack Zero, "The Specification," available at http://www.blackjackzero.com/pages/specification.html, available at least as early as Aug. 28, 2008, 2 pages.
Car and Driver Online Magazine, "Morgan 3-Wheeler," available at http://www.caranddriver.com/photo-gallery/morgan-3-wheeler-debuts-at-geneva-auto-shownews, details of the Morgan vehicle shown were publicly available as of Mar. 2011, 2 pages.
Flickr Hive Mind, "The World's Best Photos by joncallas," available at http://flickrhivemind.net/flickr_hvmnd.cgi?method=GET&page=10&photo_number=50&tag_mode=all&originput=joncallas&search_type=User&sorting=Interestingness&photo_type=250&noform=t&search_domain=User&sort=Interestingness&textinput=joncallas Morgan vehicle photos dated Sep. 11, 2010, 10 pages.
Forum Miata, "Morgan Three Wheeler," available at http://forum.miata.net/vb/archive/index.php/t-410489.html, dated Feb. 24, 2011, 13 pages.
Hemmings Daily, "Morgan Will Once Again Build 'A Great Babe Magnet'," available at http://blog.hemmings.com/index.php/tag/liberty-ace/, dated Nov. 11, 2010, 23 pages.
Liberty Motors, "Specifications," available at https://web.archive.org/web/20070114191539/http://cycle-car.com/specifications.htm, available at least as early as Jan. 14, 2007, 2 pages.
Liberty Motors: Seattle, Washington, "ACE News Jul. 2007," available at http://morgan3wheeler.us/ace-newsjuly-2007, dated Jul. 2007, 2 pages.
Liberty Motors: Seattle, Washington, "ACE News Apr. 2010," available at http://morgan3wheeler.us/ace-newsapril-2010, dated Apr. 2010, 2 pages.
Morgan —the World's Leading 3-Wheelers: Handbook 1925, available at http://morgan3w.de/literature/handbook/handbook25.htm, available at least as early as Mar. 16, 2001, 6 pages.
Morgan 3, available at https://web.archive.org/web/20111119024116/http://morgan3wheeler.us/about/history, available least as early as Nov. 19, 2011, 3 pages.
Photograph of a rear end of a Morgan vehicle from Flickr's Joncallas Photos, available at https://flickr.com/photos/19745294@N06/4981045544, dated Sep. 11, 2010, 1 page.
Photograph of Morgan vehicle, available at https://web.archive.org/web/20100715000000*/http://1.bp.blogspot.com/_FoXyvaPSnVk/TLMgg0SgVdl/AAAAAAADaTg/32ODHZzb1dU/s1600/Morgan-Three-Wheeler-08.JPG, available at least as early as Oct. 12, 2010, 2 pages.
Popular Mechanics, Are Classic Three-Wheelers Back? Liberty Motors Ace and Blackjack Zero Test Drives, available at http://www.popularmechanics.com/cars/reviews/drives/4322992, dated Jun. 26, 2009, 4 pages.
PTV-1 Concept Car Build, "PTV-1 Vehicle Benchmarking Links," available at http://www.schultzengineering.us/ptv-rnd/research.htm, webpage available at least as early as Feb. 21, 2009, 5 pages.
Seattle PI, "Seattle designer puts 1930s flair on the road," Brad Wong, available at http://seattlepi.nwsource.com/business/321540_threewheels28.html, dated Jun. 27, 2007, 4 pages.
Spotlight Space Invader, available at http://www.blackjackzero.com/media/WhichKitApr06.pdf, dated Apr. 2006, 7 pages.
Talk Morgan Online Forum, available at http://www.talkmorgan.com/ubbthreads.php/topics/75889/New_M3W_photos, dated Jun. 12, 2011, 6 pages.
Talk Morgan Online Forum, available at http://www.morgan.com/ubbthreads.php/topics/81767/Mog3_Security, dated Feb. 15, 2012, 12 pages.
The Telegraph, "Liberty Ace review," available at http://www.telegraph.co.uk/motoring/firstdrives/4734497/Liberty-Acereview.html, dated Feb. 23, 2009, 3 pages.
The Telegraph, "Three-wheelers group test," available at http://www.telegraph.co.uk/motoringinews/9675884/Threewheelers-group-test.html, dated Nov. 14, 2012, 8 pages.
Yamaha R1 Forum, "Nitrotake's Reverse Trike—Page 6," available at http://www.r1-forum.com/forums/showthread.php?t=281670&page=6, dated Sep. 27, 2010, dated Jul. 6, 2014, 22 pages.
Wikipedia, "Morgan Motor Company," available at http://en.wikipedia.org/wiki/Morgan_Motor_Company, webpage available at least as early as Nov. 11, 2007, 11 pages.

\* cited by examiner

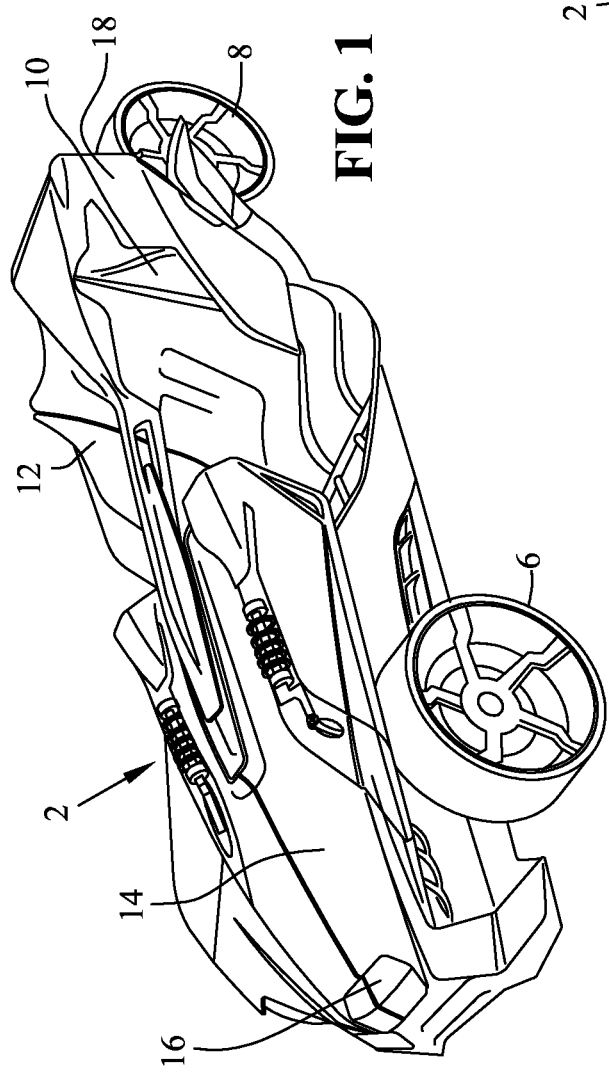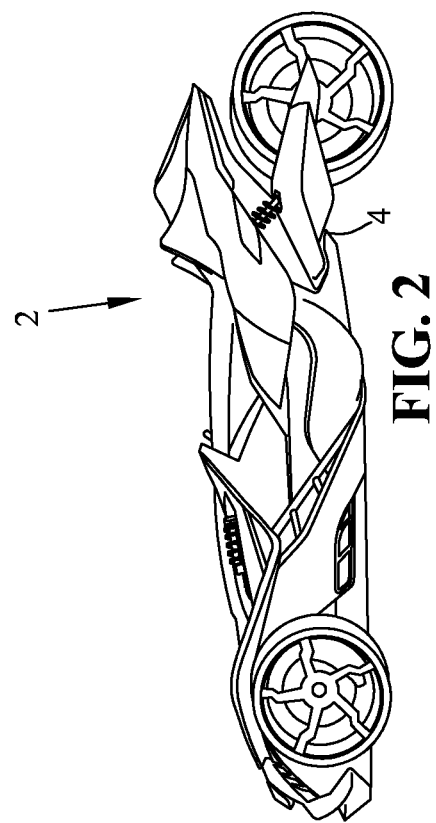

THREE WHEELED VEHICLE

The present application is a continuation of U.S. patent application Ser. No. 13/425,949, filed Mar. 21, 2012, which claims priority to U.S. provisional patent application Ser. No. 61/454,911, filed Mar. 21, 2011, the subject matter of both of which are incorporated herein by reference in their entirety.

BACKGROUND

The present disclosure relates to a three wheeled street worthy vehicle.

Three wheeled vehicles are known, for example see U.S. Pat. Nos. 7,648,148 and 7,464,781, the subject matter of which is incorporated herein by reference.

The vehicles depicted therein are straddle type vehicles. Side by side vehicles are also known; for example, see the Campagna T-Rex and V-13R vehicles. The subject matter of these vehicles is incorporated herein by reference.

SUMMARY

In a first embodiment, a vehicle comprises a vehicle frame comprising a frame sidewall providing a substantially flat surface, the surface having at least one pair of recesses therein. At least one alignment arm has inner ends and outer ends, with the inner ends mounted to the frame sidewall. The inner ends having couplings comprised of pivotal portions and fixed portions; the pivotal portions are at least partially positioned within the recesses, and the fixed portions are attached to the substantially flat surface.

In another embodiment, a vehicle comprises a vehicle frame comprising a front frame portion and a mid frame portion, and the front frame portion comprises upstanding frame supports. The upstanding frame supports define an inner engine receiving area intermediate the upstanding frame supports and engine mounts coupled to the upstanding frame supports within the engine receiving area, and suspension mounts on an outside of the upstanding frame supports. An engine is positioned within the engine receiving area and mounted to the engine mounts. A front suspension is coupled to the suspension mounts. Front wheels are coupled to the front suspension. Side by side seats are mounted on the mid frame portion, rearward of the engine. The vehicle also includes at least one rear wheel.

In yet another embodiment, a three wheeled vehicle comprises a vehicle frame comprising a front frame portion and a mid frame portion. An engine is mounted to the front frame portion. A front suspension is coupled to the front frame portion, defined by left and right side suspension assemblies. Front wheels are defined by a front left wheel coupled to the left side suspension assembly, and a right wheel coupled to the right side suspension assembly. A steering assembly is coupled to the front wheels. Side by side seats are mounted on the mid frame portion, rearward of the engine. A single rear wheel is coupled to the frame rearward of the mid frame portion, and is drivingly coupled to the engine.

In another embodiment, a three wheeled vehicle comprises a vehicle frame; a front suspension coupled to the frame and comprising a left front suspension assembly, and a right front suspension assembly. Front wheels are defined by a front left wheel coupled to the left front suspension assembly, and a right wheel coupled to the right front suspension assembly. An engine is supported by the frame. At least one seat is positioned rearward of the engine, and a single rear wheel is coupled to the frame rearward of the at least one seat. A first sprocket is coupled to the single rear wheel, and a final drive member is drivingly coupled to the engine, and supported by the frame. The final drive member has a second sprocket coupled to the first sprocket, the final drive member having an unlocked positioned to the frame where the final drive member is movable longitudinally relative to the frame and the real wheel, and a locked position where the final drive member is longitudinally fixed relative to the frame.

In another embodiment, a three wheeled vehicle comprises a vehicle frame including a final drive mount adjacent a rear of the frame, a front suspension coupled to the frame comprising a left front suspension assembly, and a right front suspension assembly. A front left wheel is coupled to the left front suspension assembly, and a right wheel is coupled to the right front suspension assembly. An engine is supported by the frame and at least one seat is positioned rearward of the engine. A single rear wheel is coupled to the frame rearward of the at least one seat. A first sprocket is coupled to the single rear wheel. A final drive member is drivingly coupled to the engine, and is supported by the final drive mount, the final drive member having a second sprocket coupled to the first sprocket; and a rear swing arm coupled to the final drive mount and supporting the rear wheel.

In another embodiment, a three wheeled vehicle comprises a vehicle frame; an engine mounted to the frame; a front suspension; right and left front wheels; a steering assembly coupled to the front wheels; a front brake assembly for applying the brakes to at least one of the right and left front wheels; and side by side seats supported by the frame, rearward of the engine. A single rear wheel is coupled to the frame rearward of the mid frame portion and is drivingly coupled to the engine. An engine control management system, includes throttle control; and a stability control system comprising a plurality of sensors selected from the group of yaw rate, wheel speed, lateral acceleration, longitudinal acceleration, and steering angle; wherein the stability control system senses over steer and corrects the vehicle dynamics by applying the brakes to one or more of the brakes and/or by controlling the throttle position.

In another embodiment a three wheeled vehicle comprises a vehicle frame having lower frame rails extending generally longitudinally and an engine mount area adjacent a front of the frame. A cross tube is positioned generally rearward of the engine mount area, extending transversely to the lower frame rails and supported above and by the lower frame rails. Frame tubes extend downwardly from the cross tube and rearwardly to a position adjacent a rear of the frame, the frame tubes defining a driver compartment on one side of the frame tubes and a passenger compartment on the other side of the frame tubes. The frame tubes define a tunnel beneath the frame tubes. An engine is mounted to the engine mount area and front wheels are coupled to the frame. A steering assembly is coupled to the front wheels. Side by side seats are mounted in the driver and passenger compartments. A single rear wheel is coupled to the frame rearward of the driver and passenger compartments; and a drive shaft extends through the tunnel and is coupled at a first end to the engine and at a second end to the single rear wheel.

In another embodiment, a three wheeled vehicle comprises a vehicle frame; an engine mounted to the frame adjacent a front end of the frame; front wheels having an axis of rotation; side by side seats supported by the frame, rearward of the engine; and a single rear wheel having an axis of rotation and coupled to the frame rearward of the side by side seats, and drivingly coupled to the engine. A longitudinal distance between the axis of rotation of the front and single rear wheels defines a wheel base, and wherein the vehicle center of gravity is rearward of the axis of rotation of the front wheels and within a range of between 30-40% of the wheel base.

BRIEF DESCRIPTION OF THE DRAWINGS

FIG. 1 is a perspective view of the three-wheeled vehicle of the present disclosure;
FIG. 2 is a side view of the vehicle of FIG. 1.

DETAILED DESCRIPTION

Figure 3:
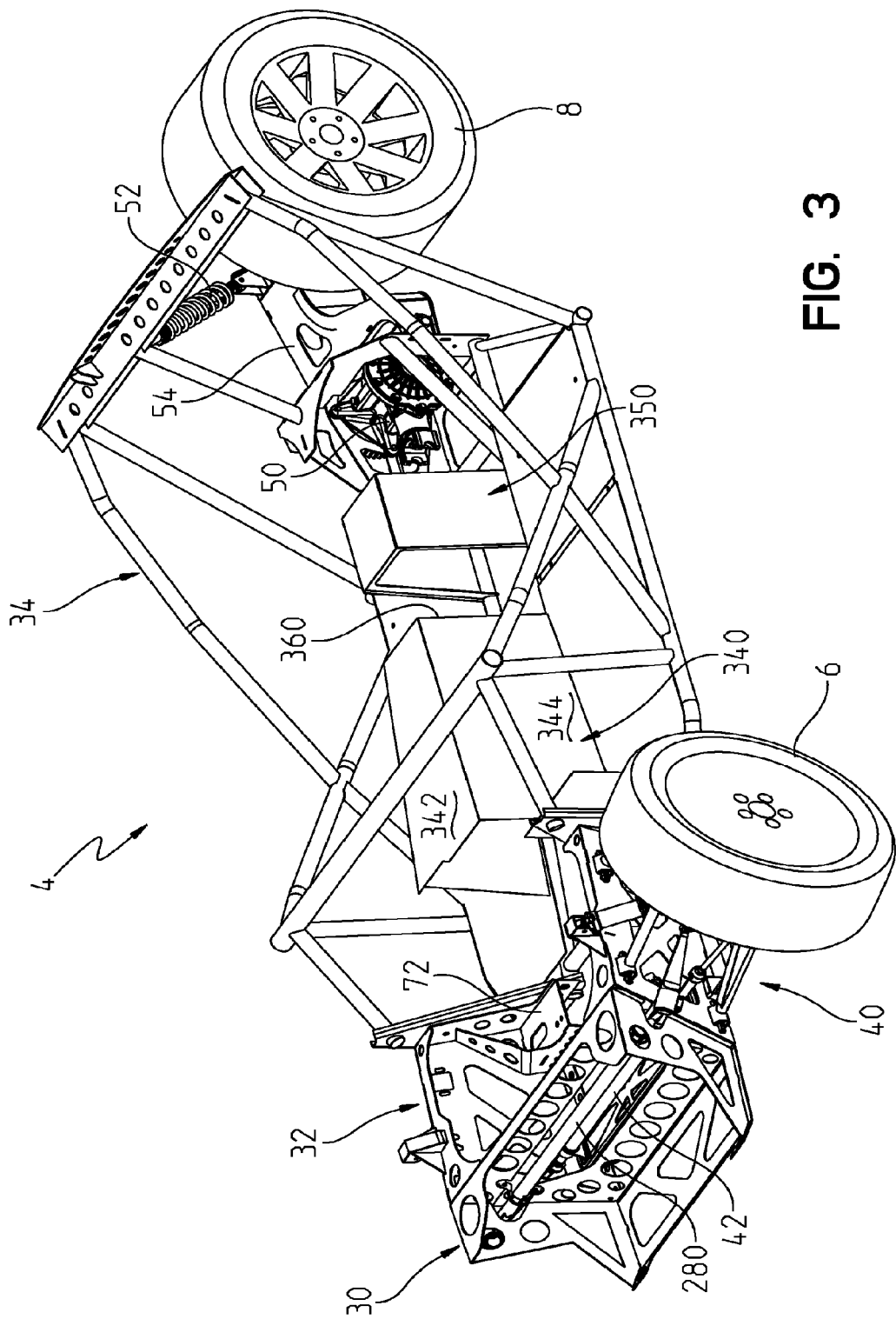
FIG. 3 is a perspective view of the frame of the vehicle of FIGS. 1 and 2.

With reference first to FIGS. 1 and 2, a three-wheeled vehicle is shown generally at 2. Vehicle 2 is comprised of a frame 4 supported by front wheels 6 and a single rear-wheel 8. Vehicle 2 is classified as a motorcycle that has side-by-side seating including a driver's seat 10 and a passenger's seat 12. Vehicle 2 also includes a front body portion 14 including an air intake 16 for cooling purposes, as described herein.

Figure 4:
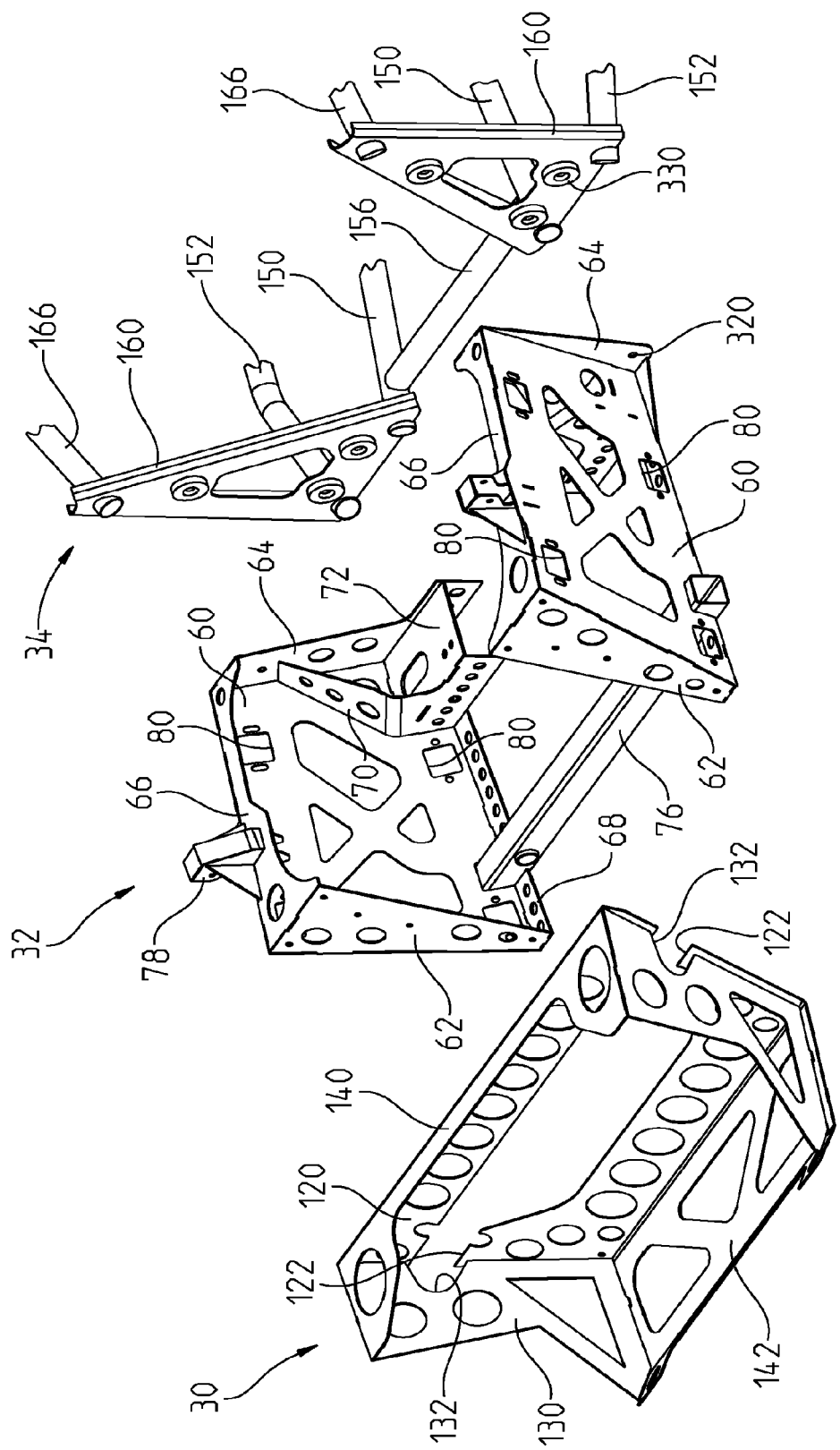
FIG. 4 is an exploded view of a portion of the frame.

With reference now to FIG. 3, the vehicle is shown without the outer body portion 14 and rear body portion 18 such that skeletal frame 4 is shown in greater detail. Frame 4 is generally comprised of a front radiator frame portion 30, a front frame portion or bulkhead 32 and a tubular frame portion 34. As shown in FIG. 3, the vehicle 2 further includes a front suspension system 40, front steering system 42, rear final drive system 50, rear suspension 52 and rear swing arm 54. With reference now to FIG. 4, front frame portion 32 will be described in greater detail.

Figure 5:
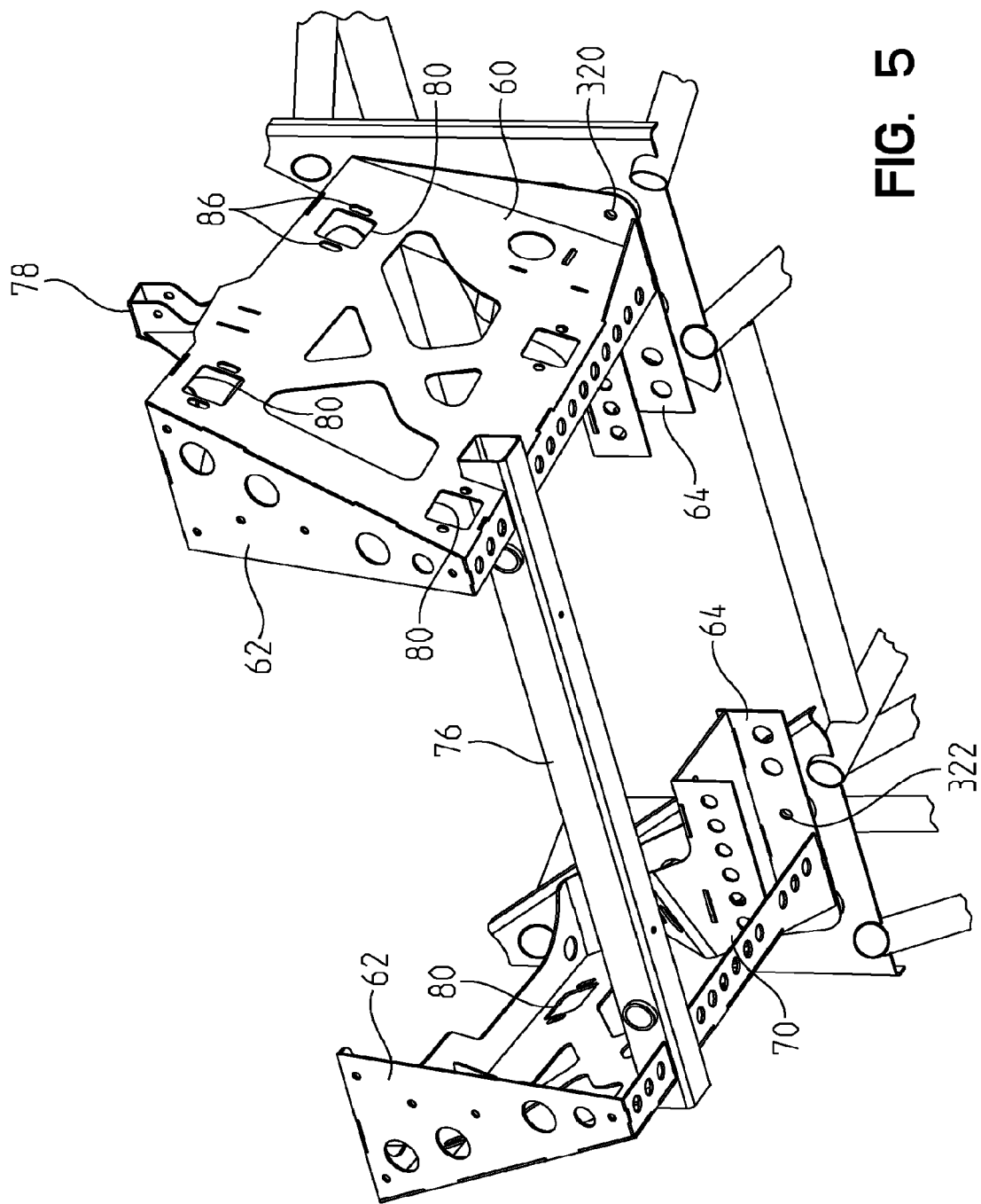
FIG. 5 is an underside perspective view of the front frame portion.

As shown in FIG. 4, front frame portion 32 is comprised of sidewalls 60 attached to front brackets or plates 62, rear brackets or plates 64, top plates 66, lower plates 68, gussets 70 and mounting platforms 72. The two sidewalls are connected together by way of cross tube 76. As also shown, a shock mount 78 is provided on top plates 66 for mounting shocks as described herein. As also shown, sidewalls 60 are in the form of steel plates and have a plurality of openings 80 for mounting alignment arms or A-arms as described herein. As shown in FIGS. 4 and 5, openings 80 are defined by a cut-out through the sidewalls 60 and further include mounting apertures 86 on opposite sides of the opening 80, as further described herein.

Figure 6:
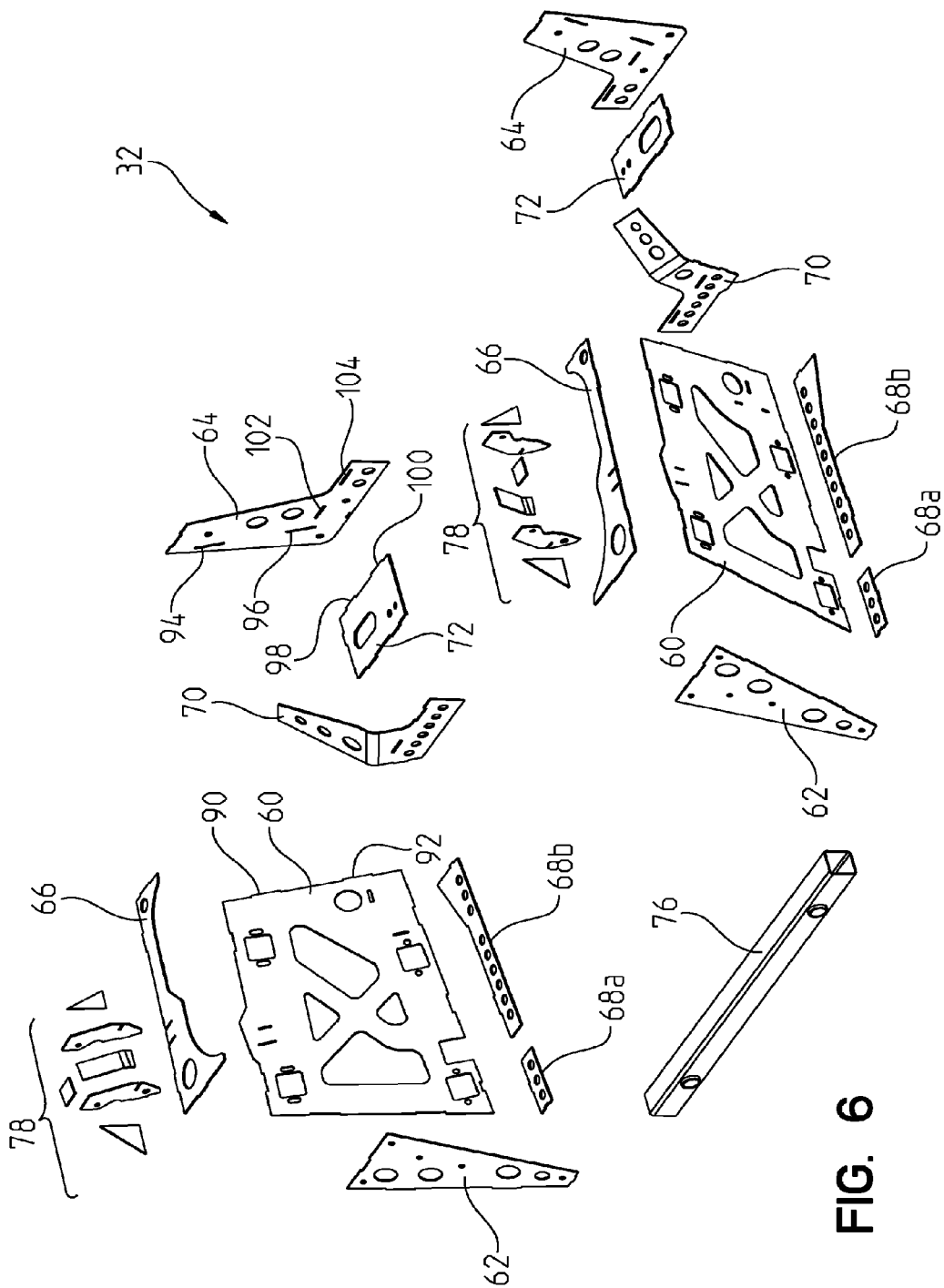
FIG. 6 is an exploded view of the front frame portion.

With respect now to FIG. 6, front frame portion 32 is shown in its individual components. It should be understood that front frame portion 32 is comprised of individual component parts assembled into a unitary weldment. Each of the individual parts include tabs or slots for assembly of the components and for ease of weldment. Just by way of example, sidewall 60 includes tabs 90, 92 which cooperate with slots 94, 96 in rear plate 64 and mounting plate 72 includes tabs 98, 100 which cooperate with slots 102, 104 respectively. As shown in FIG. 4, radiator frame portion 30 is constructed in a similar manner to that described in respect to front frame portion 32 and includes front plate 120 providing slots 122; side plates 130 defining cut-outs 132; top plate 140; and bottom plate 142.

With respect now to FIGS. 4, 7 and 8, tubular frame portion 34 will be described in greater detail. With respect first to FIG. 8, tubular frame 34 is comprised of inner longitudinal tubes 150 and outer longitudinal tubes 152. The inner longitudinal tubes 150 are coupled together through a cross tube 156 as shown best in FIG. 4 or 8. Longitudinal tubes 150 and 152 are coupled together by way of a triangular brace 160 (FIG. 4) where tubes 150 and 152 are connected to brace 160, for example by way of a weldment. As shown best in FIGS. 4 and 7, tubular frame 34 further includes tubes 166 attached to triangular brace 160 at a front end thereof and to a cross tube 170 at a rear end thereof. Cross tube 170 is connected to lower tubes 152 by way of an upright brace 174.

Figure 7:
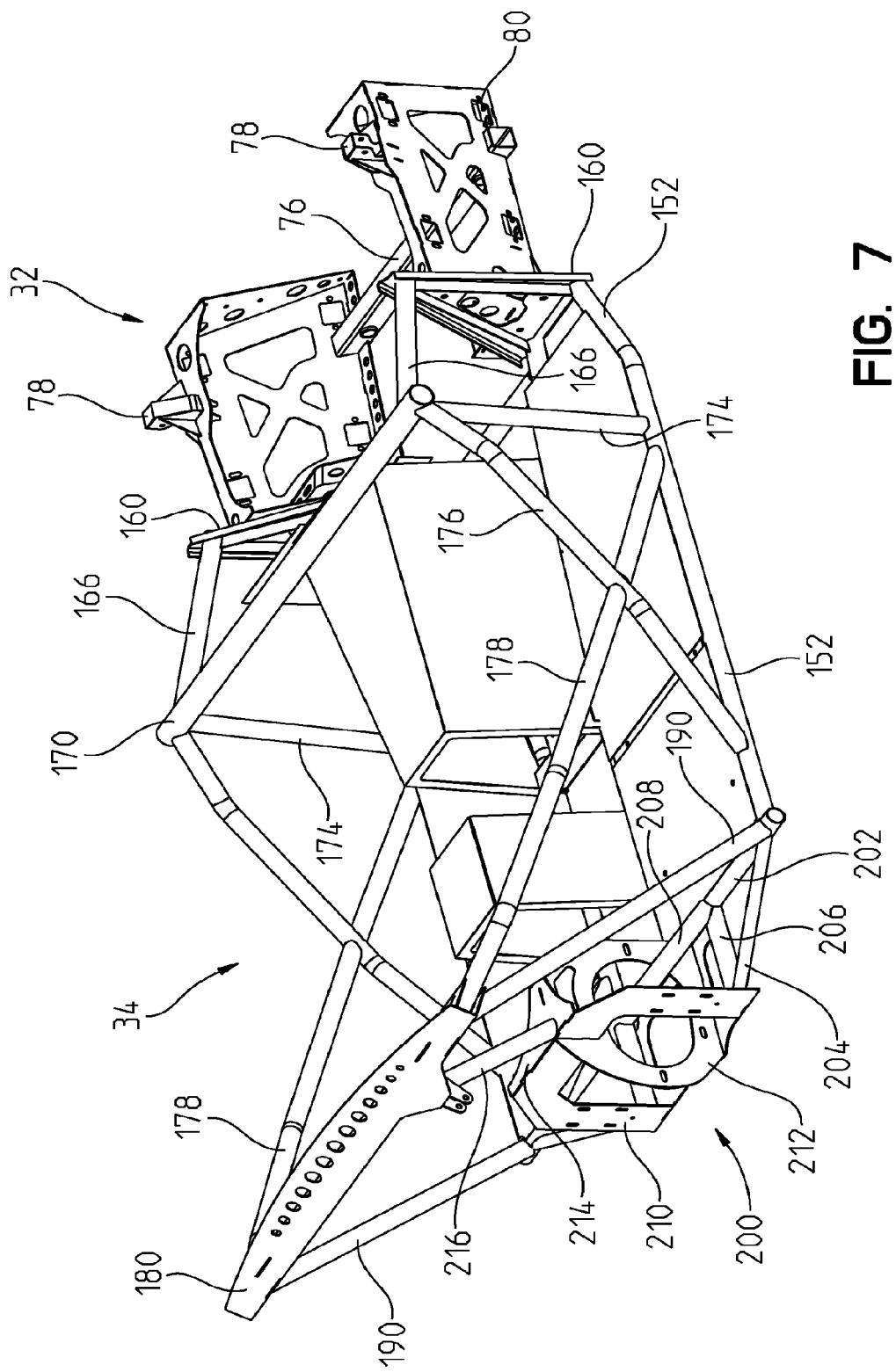
FIG. 7 is a right rear perspective view of the frame.
Figure 8:
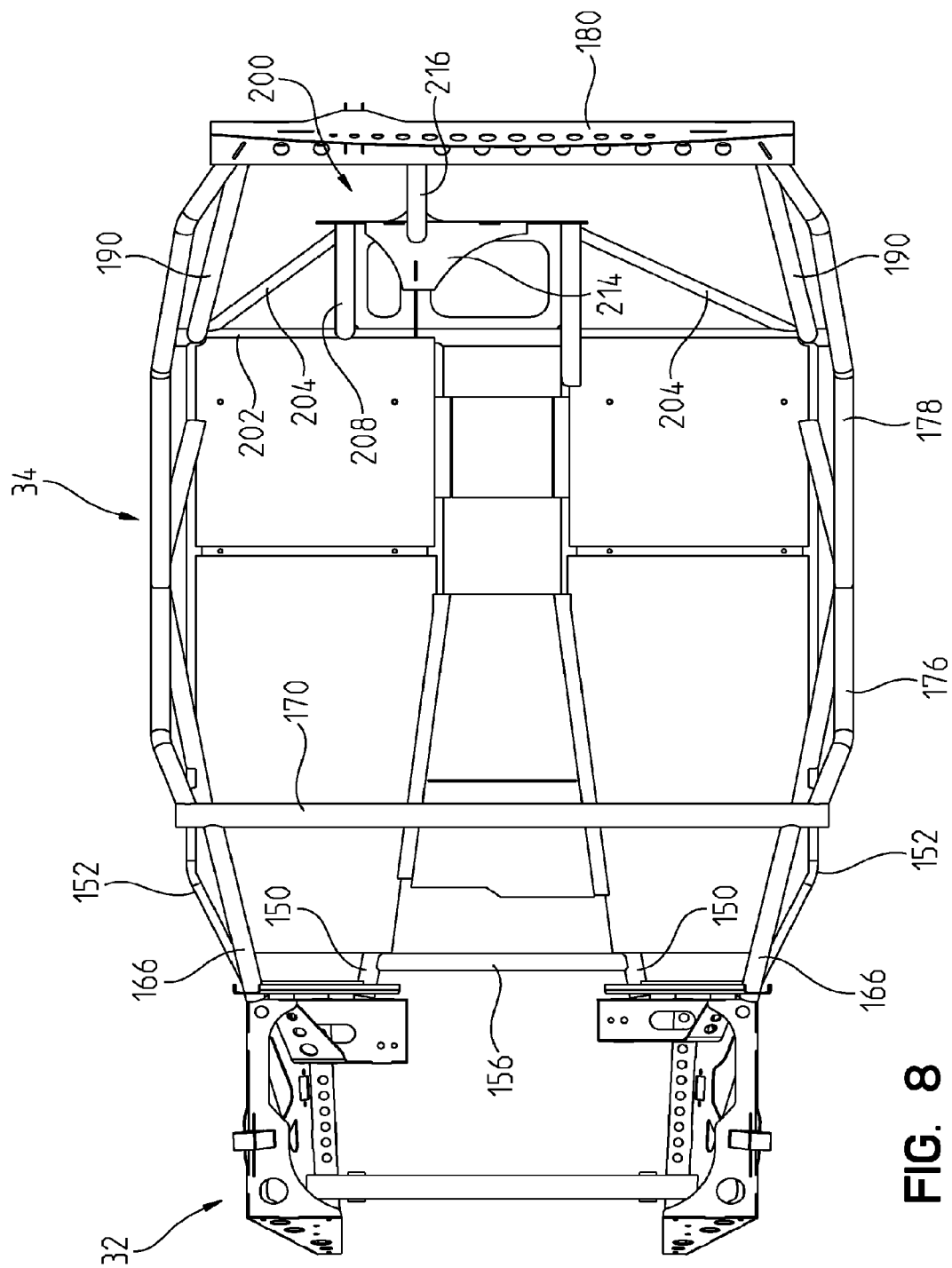
FIG. 8 is a top view of the vehicle frame.

As shown best in FIG. 7, tubular frame 34 further comprises intersecting cross tubes 176 and 178 where cross tube 176 is attached to cross tube 170 and to longitudinal tube 152 and cross tube 178 is attached at a lower end to longitudinal tube 152 and extends rearwardly to a rear cross brace 180. Rear uprights 190 extend upwardly from longitudinal tubes 152 to cross brace 180. With respect now to FIGS. 7 and 8, a rear mount portion 200 will be described in greater detail. Mount 200 includes a cross tube 202 and diagonal tube 204 forming a triangular frame with tube 206. Tubes 208 extend diagonally rearwardly to a rear plate 210, and a transverse plate 212 is mounted relative to plate 210 for mounting of final drive as described herein. A top plate 214 is provided with a rear diagonal tube 216 extending from top plate 214 to cross brace 180.

Figure 9:
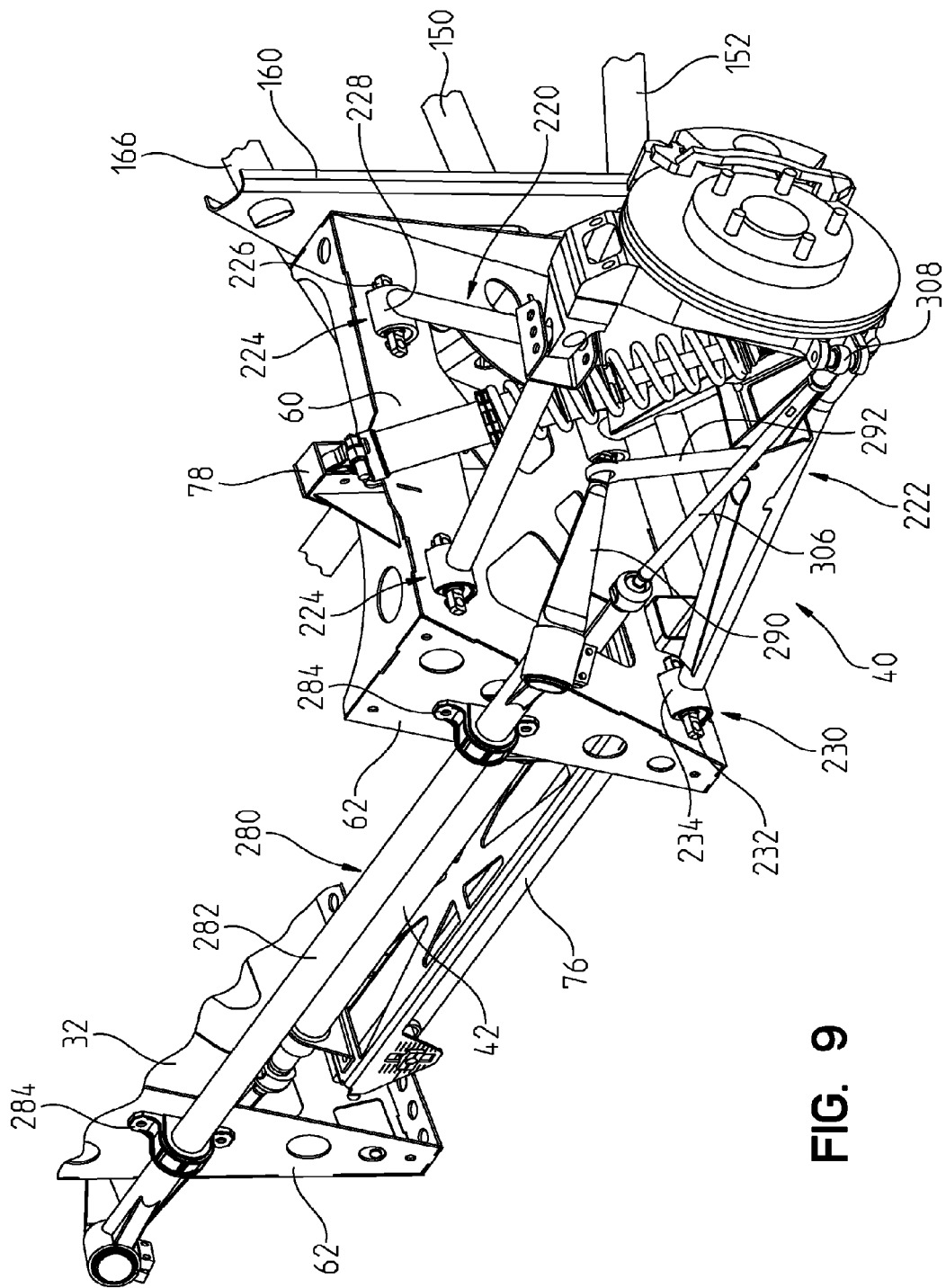
FIG. 9 is a left perspective view of the front left suspension assembly.
Figure 10:
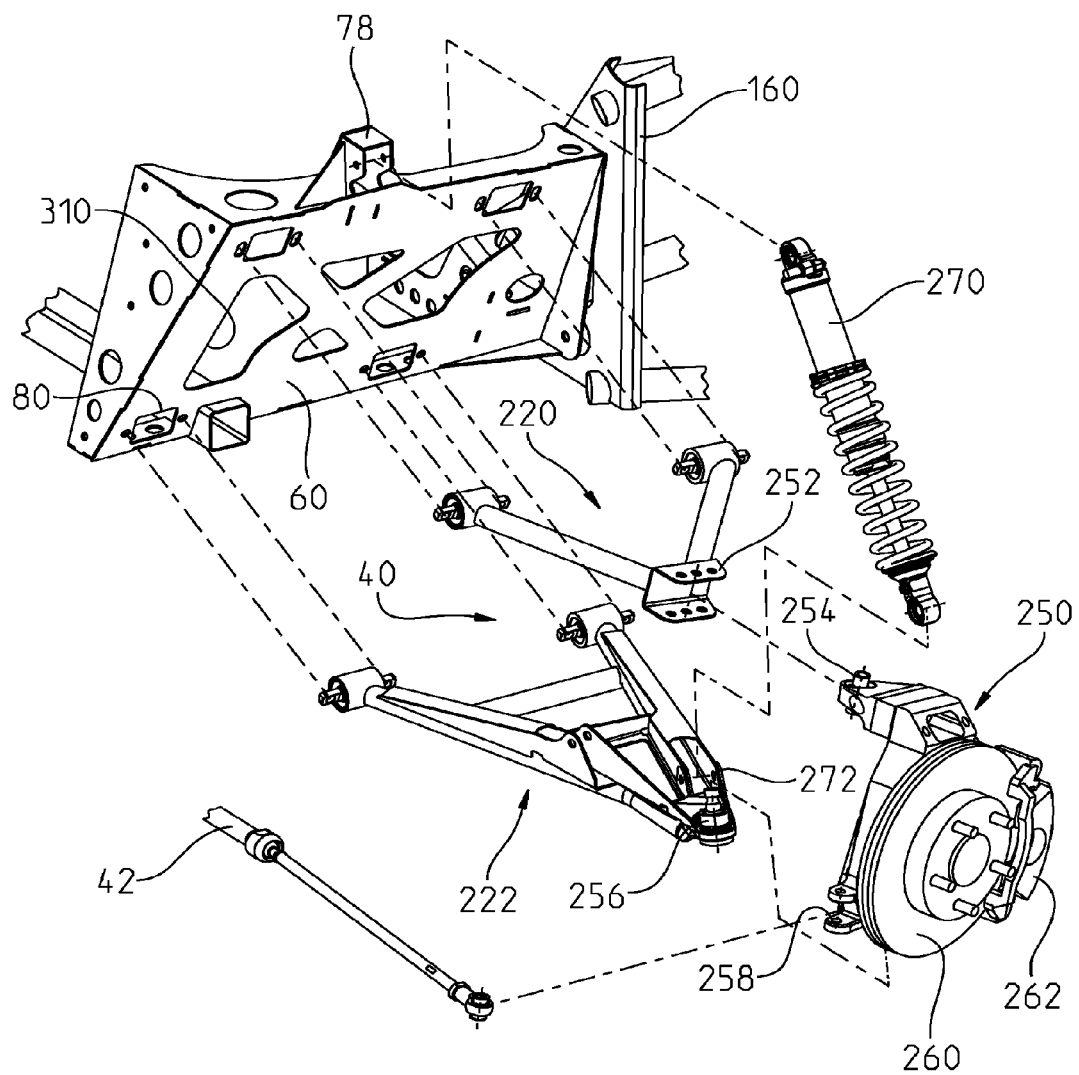
FIG. 10 is an exploded view of the front left suspension assembly of FIG. 9.

As shown best in FIGS. 9 and 10, suspension 40 will be described in greater detail. As shown, suspension 40 is comprised of upper alignment arm 220 and lower alignment arm 222. Each of the alignment arms 220 has inner ends attached to the sidewall 60; and to that end upper alignment arm 220 includes couplings 224 comprised of a fixed portion 226 for attachment to the sidewall 60 and pivotal portions 228 allowing alignment arm 220 to pivot relative to sidewall 60. Lower alignment arm 222 includes couplings 230 having fixed portions 232 attached to sidewall 60 and pivotal portions 234 allowing alignment arm 222 to pivot relative to sidewall 60. It should be apparent that pivotal portions 228 of couplings 224 and pivotal portions 234 of couplings 230 are cylindrical in shape and are received within openings 80. Meanwhile fixed portions 226 and 232 of the couplings may be fixed to the sidewall by way of a fastener through the fixed portion and through openings 86 (See FIG. 5).

Upper alignment arm 220 and lower alignment arm 222 further include outer ends for connection to a wheel hub 250. With respect to FIG. 10, upper alignment arm 220 includes a bracket 252 for attachment to an upper joint 254, and lower alignment arm 222 includes a ball joint 256 for attachment to a lower bracket 258 of wheel hub 250. As shown, wheel hub 250 also includes brake disc 260 and caliper 262 as in known in the art. With reference still to FIGS. 9 and 10, a shock absorber 270 is positioned at an upper end connected to shock mount 78 and at a lower end connected to mount portion 272 (FIG. 10) of lower alignment arm 222. The installed position of shock 270 is shown in FIG. 9. Suspension system 40 further includes a torsion bar 280, as best shown in FIG. 9 including a transverse bar portion 282 spanning front frame portion 32 and pivotally connected to front plate portions 62 by way of brackets 284. Torsion bar 280 further includes torsion arms 290 which are attached to lower alignment arms 222 by way of a link 292.

Figure 11:
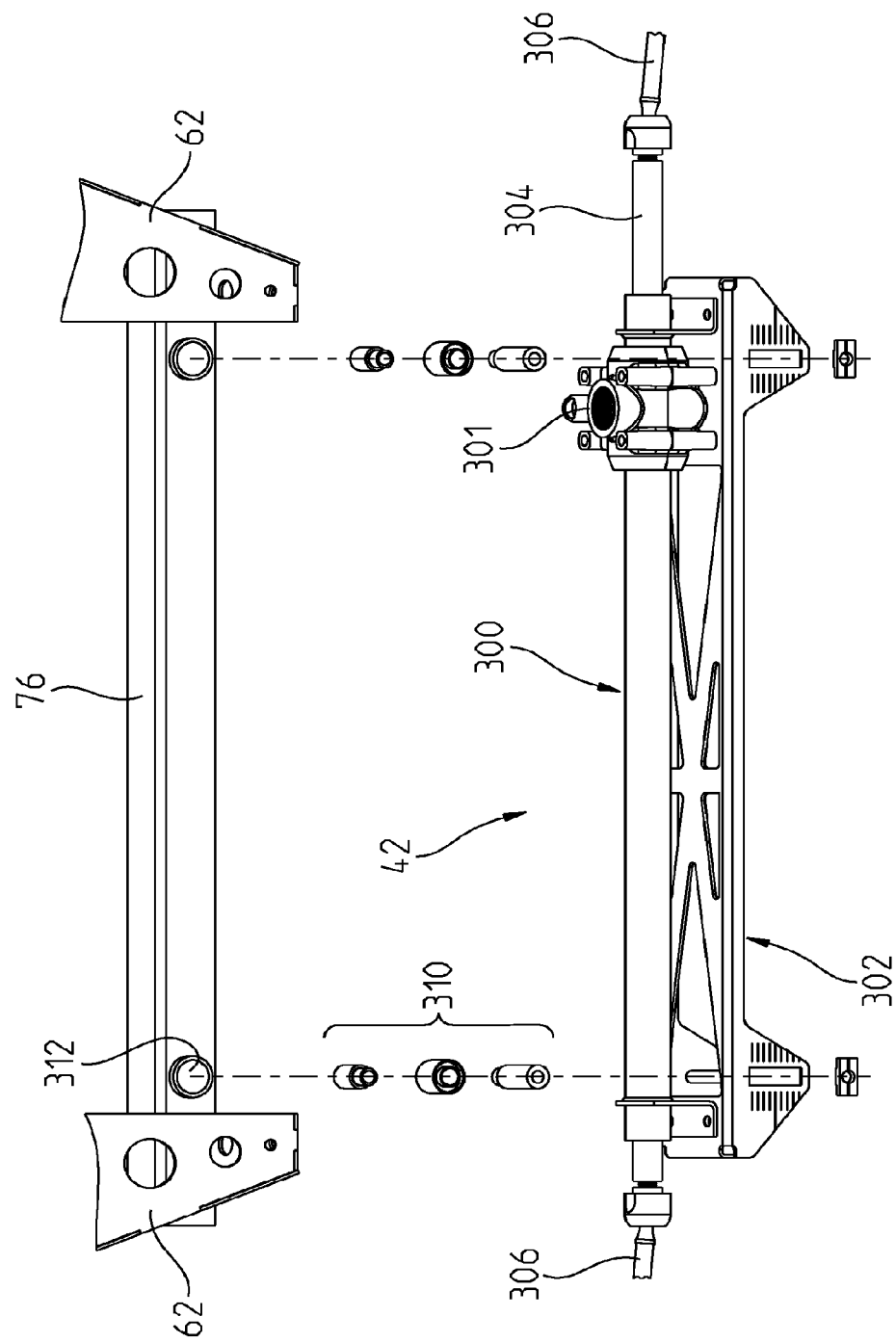
FIG. 11 is an exploded view of the steering system of the vehicle.

With respect now to FIGS. 9 and 11, steering system 42 will be described in greater detail. As shown, steering system 42 includes a rack and pinion system 300 secured to a bracket 302 which in turn is securable to cross tube 76. As shown, rack and pinion steering system 300 includes an input 301 from a steering rod (not shown) which operates steering rack 304, which in turn is connected to steering rods 306. It should be appreciated that the rack and pinion steering system includes a pinion portion which would move the rack 304 either rightwardly or leftwardly as viewed in FIG. 11 to move steering rods 306, which ultimately turns front wheels 6. As shown best in FIG. 9, steering rods 306 are attached to wheel hubs by way of ball joint 308. As shown, bracket 302 includes mounting hardware 310 insertable into aperture 312 of cross tube 76 for mounting bracket 302 thereto. As shown, rack and pinion steering system 300 is mountable to cross tube 76 with the rack and steering rods 306 extending through sidewall 60, that is, through openings such as 310, see FIG. 10. Although the steering system disclosed is a rack and pinion, an electronic power steering system could be incorporated herein. An exemplary power steering system is disclosed in U.S. patent application Ser. No. 12/135,107 (U.S. Publication 20090302590 and corresponding PCT application PCT/US09/42985), the disclosures of which are expressly incorporated by reference herein.

Although not specifically shown, vehicle 2 anticipates having an engine in the form of an automotive style engine, for example a GM 2.4 L Ecotec LE5 (P/N 12619532) or equivalent, with a complementary manual transmission, such as an Aisin AR5 MA5 (P/N 24240205), where engine and transmission are directly coupled to each other. It is also anticipated that engine is directly attached by way of engine mounts to mounting plates 72 (FIG. 4). Thus as shown in FIG. 4, the upstanding sidewalls 60 define an engine receiving area intermediate to sidewalls 60 and the sidewalls 60 also define suspension mounts on the outside of the sidewalls 60. The engine is placed in the vehicle at a position where the vehicle is the widest.

With respect again to FIGS. 3 and 4, it should be appreciated that frame sub assemblies 30, 32 and 34 may be assembled together to provide support for the engine, transmission, suspension and steering assembly. As shown in FIG. 4, frame portion 30 may be coupled directly to front plates 62 by way of fastener members which allows for the clearance of torsion bar 280 by way of slots 122 and cut out portions 132. It also should be clear that the frame portion 30, once attached to the front plate 62, rigidifies the sidewalls 60 for the overall assembly. Meanwhile front frame portion 32 may be attached to the tubular frame 34 by way of fasteners through apertures such as 320 or 322 (see FIGS. 4 and 5) and through bushings such as 330 (FIG. 4) on the front face of plate 160. Bushings 330 could be standoffs directly applied to the front face 160 such as steel washers providing a tight face-to-face engagement between the front frame portion 32 and the bushings 330 and bushings 330 and the triangular plate 160.

With respect to FIG. 3, frame 4 includes a tunnel portion 340 flanking longitudinal tubes 150 and which transitions from front to back to include a top plate 342 and sidewalls 344. Tunnel 340 is positioned rearward of engine mounts 72 and would partially receive a transmission which is attached to the engine referred to above. Frame 4 includes a rear tunnel portion 350 rearward of tunnel portion 340 and forward of final drive 50. It should be appreciated that tunnel portions 340 and 350 provide an access tunnel for a driveshaft between the transmission and final drive 50, and tunnel portions 340 and 350 are somewhat spaced apart to provide an opening 360 for a transmission shift lever.

Figure 12:
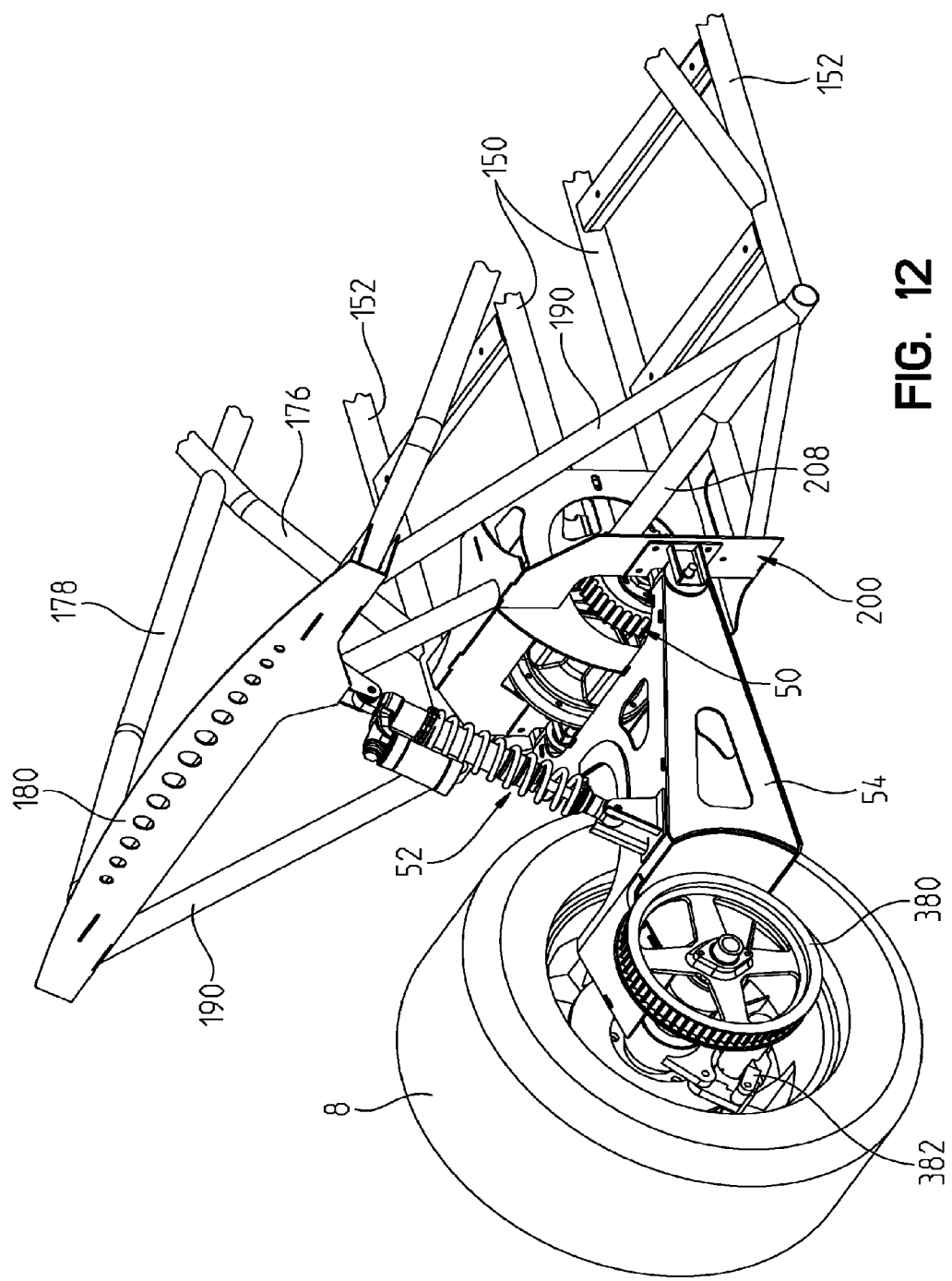
FIG. 12 is a right rear perspective view of the rear wheel assembled to the vehicle frame.
Figure 13:
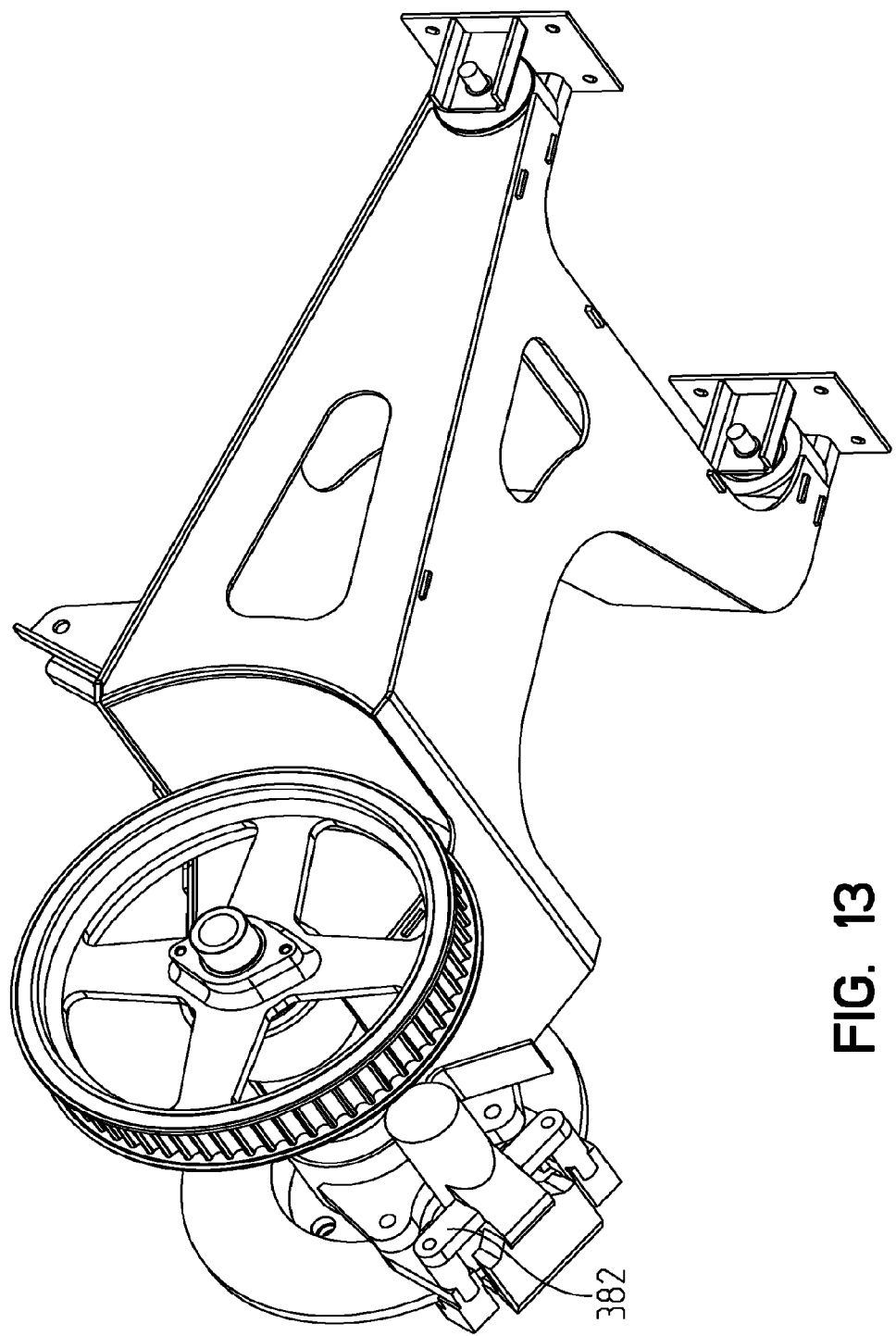
FIG. 13 is an underside perspective view showing the rear caliper.
Figure 14:
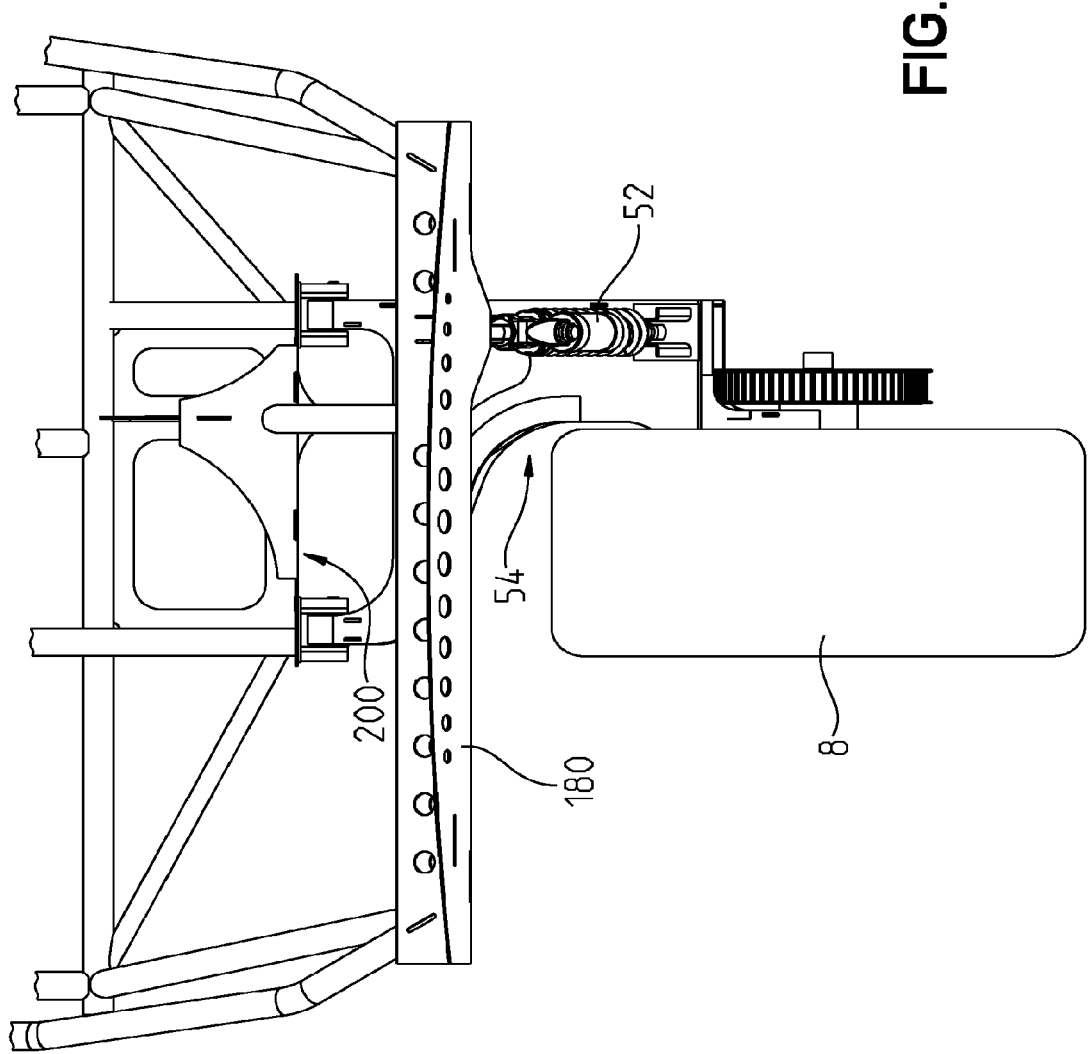
FIG. 14 is a top view of the rear wheel of FIG. 12.

With reference now to FIGS. 12-14, rear wheel 8 is generally shown rotatively mounted to swingarm 54. As shown, swingarm 54 is pivotally mounted to rear mounting portion 200, final drive 50 is poised for driving wheel 8 through sprocket 380 and shock absorber 52 is shown in position between cross brace 180 and rear swingarm 54. As shown best in FIGS. 12 and 13, caliper 382 is directly attached to the swingarm 54.

Figure 15:
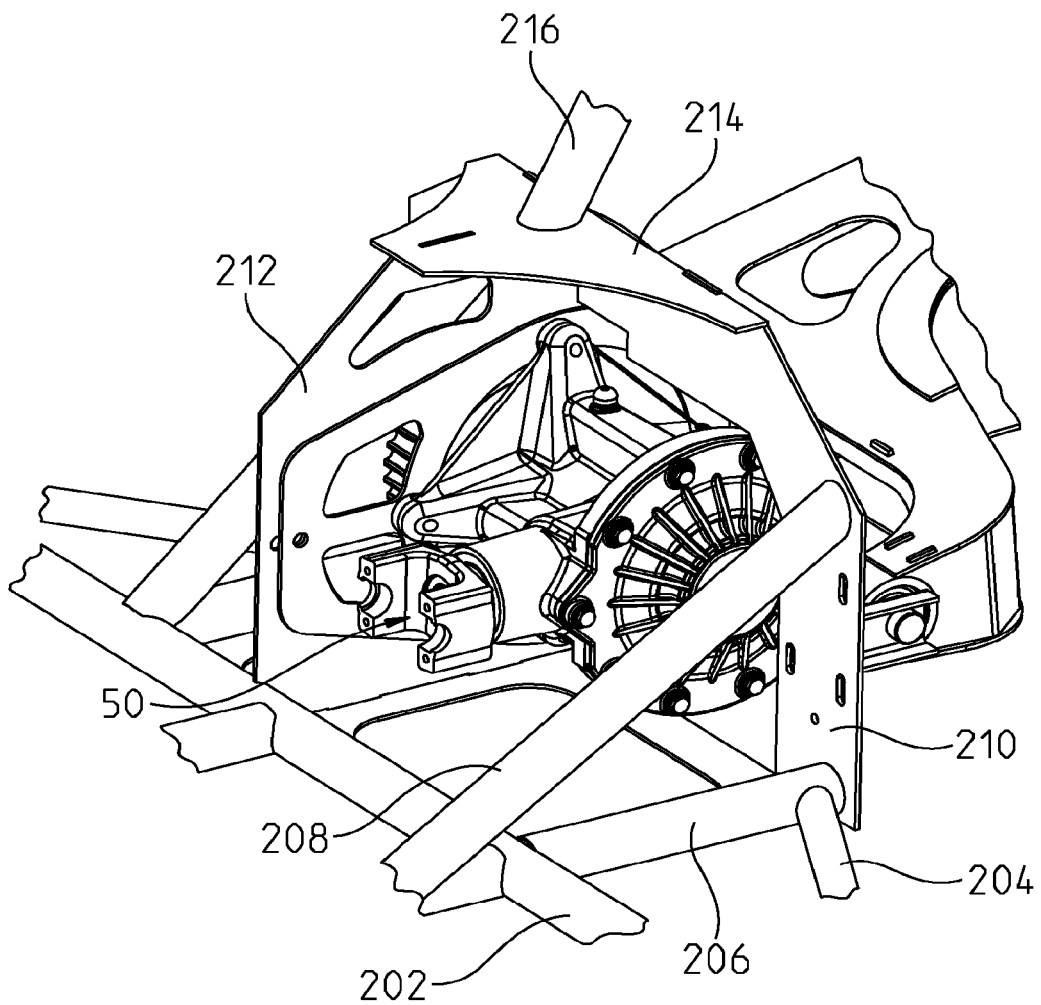
FIG. 15 is a partially fragmented, front perspective view of the vehicle final drive.
Figure 16:
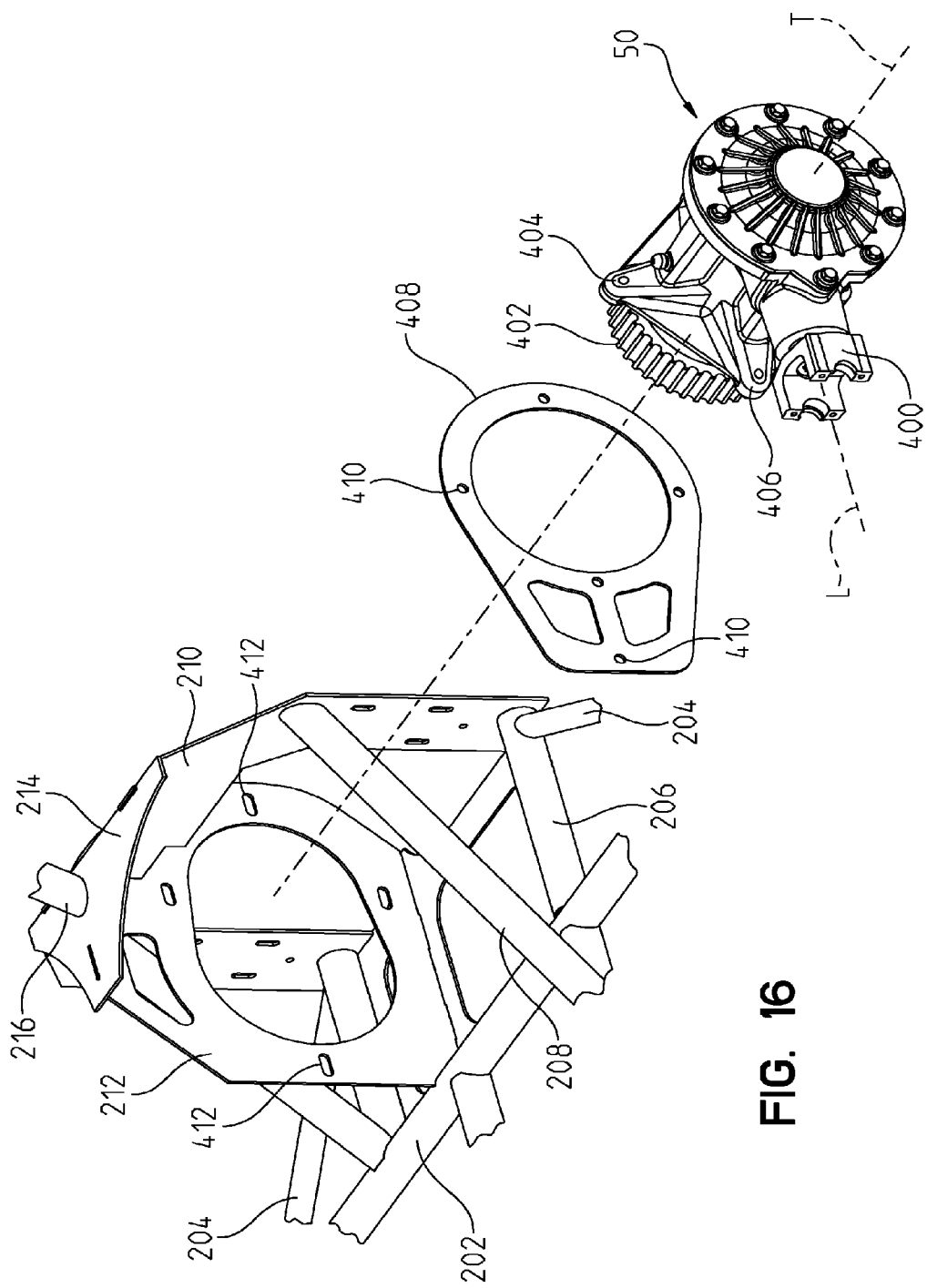
FIG. 16 is an exploded view of the final drive of FIG. 15.

With reference now to FIGS. 15 and 16, final drive 50 will be described in greater detail. As shown final drive 50 includes an input universal joint 400 operating an input shaft 401 which transitions rotatable motion about longitudinal axis L into an output rotation to sprocket 402 about transverse axis T. As shown, final drive 50 includes an outer housing 404 having mounting portions 406 which mount to intermediate plate 408 through apertures such as 410. Meanwhile mounting plate 408 mounts to transverse plate 212 (FIG. 16) with apertures 410 aligning with apertures 412 in transverse plate 212. Universal coupling 400 is also splined such that coupling 400 is movable relative to shaft 401. This allows the coupling 400 to be fixedly attached to a driveshaft (that is a drive shaft between transmission and final drive unit 50), and final drive 50 may be moved forward and rearward, moving sprocket 402 forward and rearwardly. A belt (not shown) will be positioned about sprockets 380 and 402 to drive wheel 8. Thus, as final drive is movable, the belt may be tightened by moving the final drive 50 forwardly.

Figure 17:
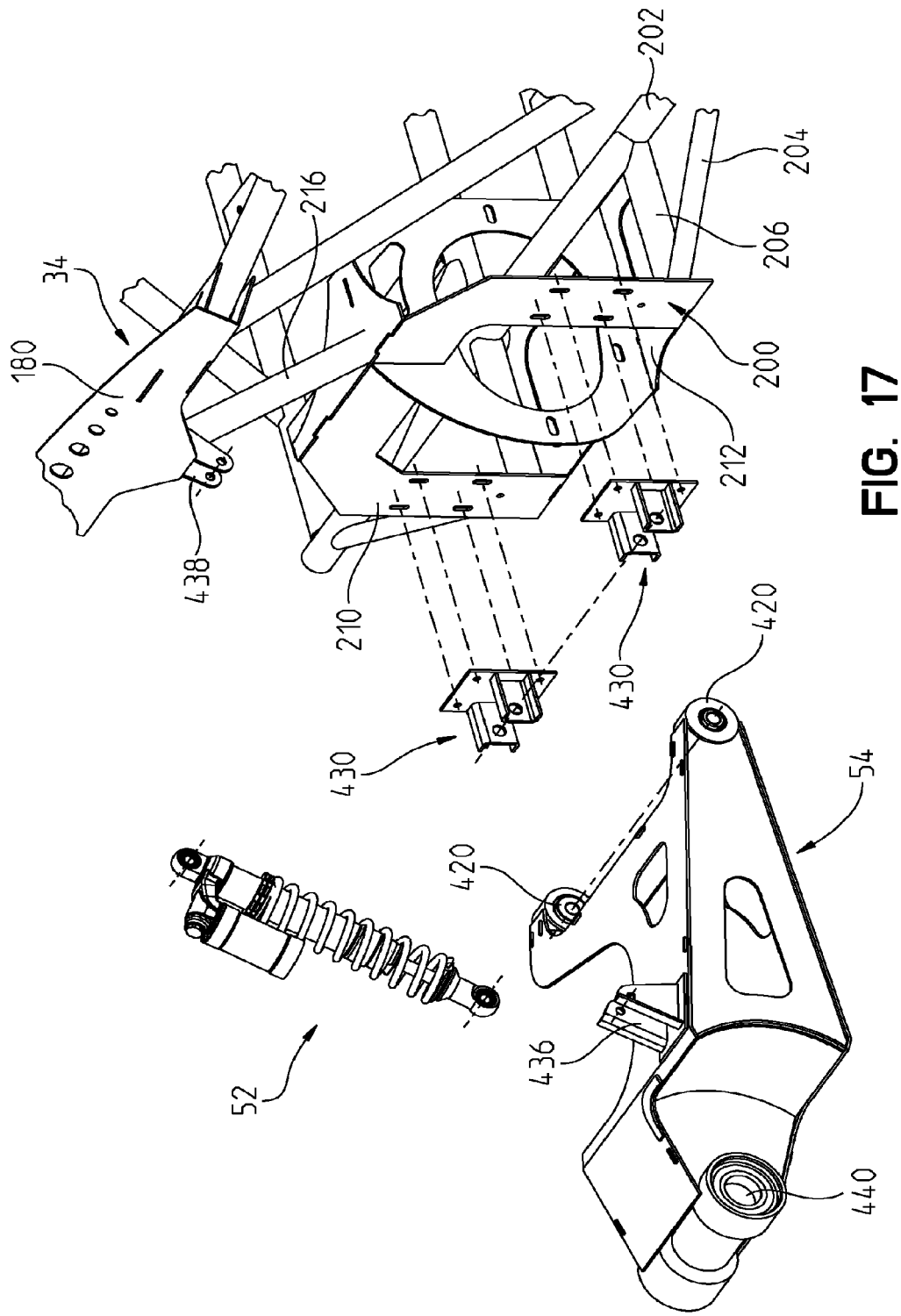
FIG. 17 is an exploded view showing the rear swing arm exploded from the frame.

With respect now to FIG. 17, rear swing arm 54 includes front pivot joints 420 which are pivotally attached to brackets 430 which in turn mount to mounting plate 210 by way of fasteners through the apertures as shown. This allows swing arm 54 to be pivotally mounted relative to the tubular frame 34. Swing arm 54 further includes a mounting bracket 436 and cross brace 180 includes a bracket 438 for mounting the ends of shock absorber 52 thereto. Finally, swing arm 54 includes a mounting aperture at 440 for mounting rear wheel 8 as is known in the art.

Figure 18:
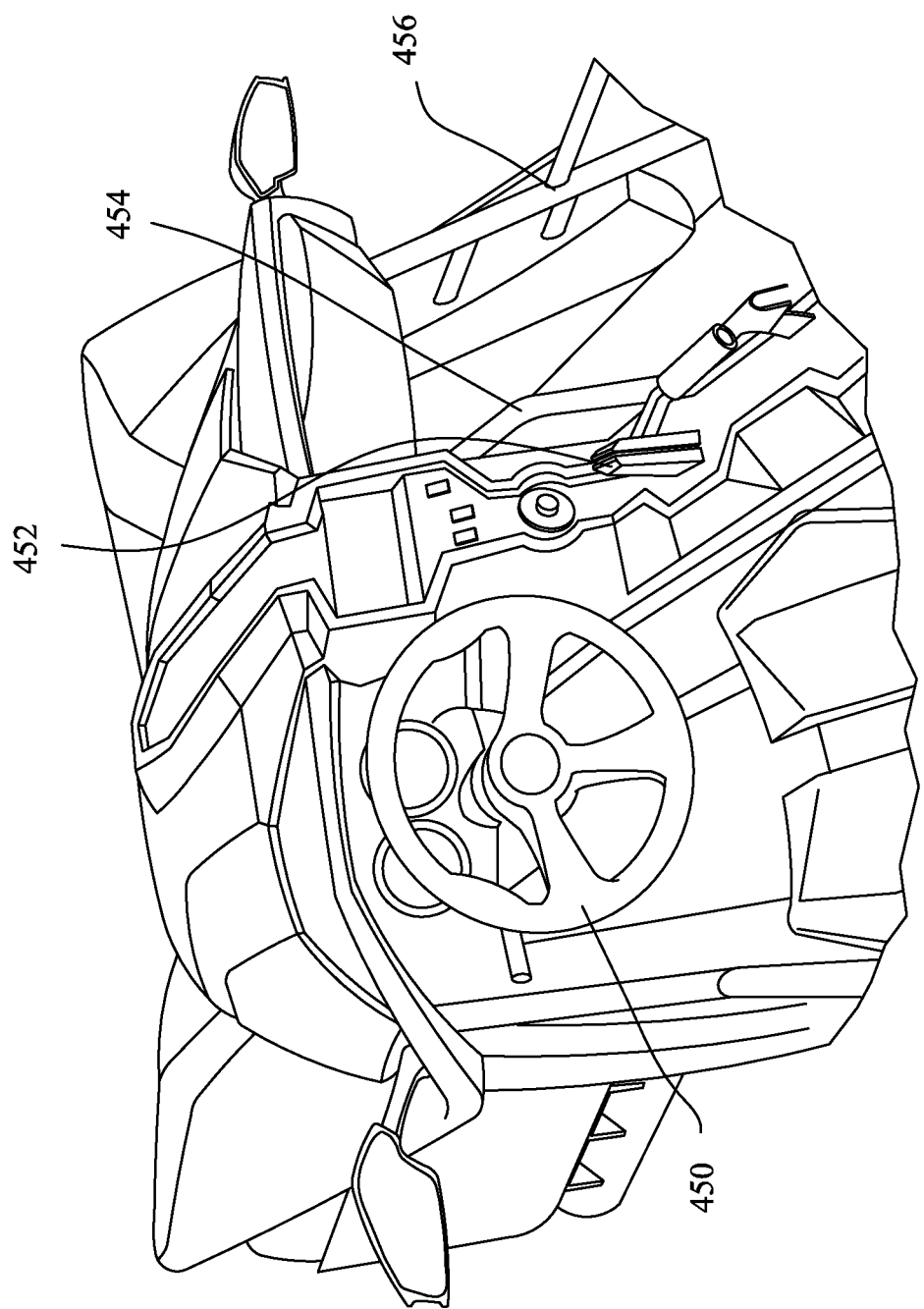
FIG. 18 is a view in the driver side seating compartment.
Figure 19:
FIG. 19 shows the area behind the driver's seat.
Figure 20:
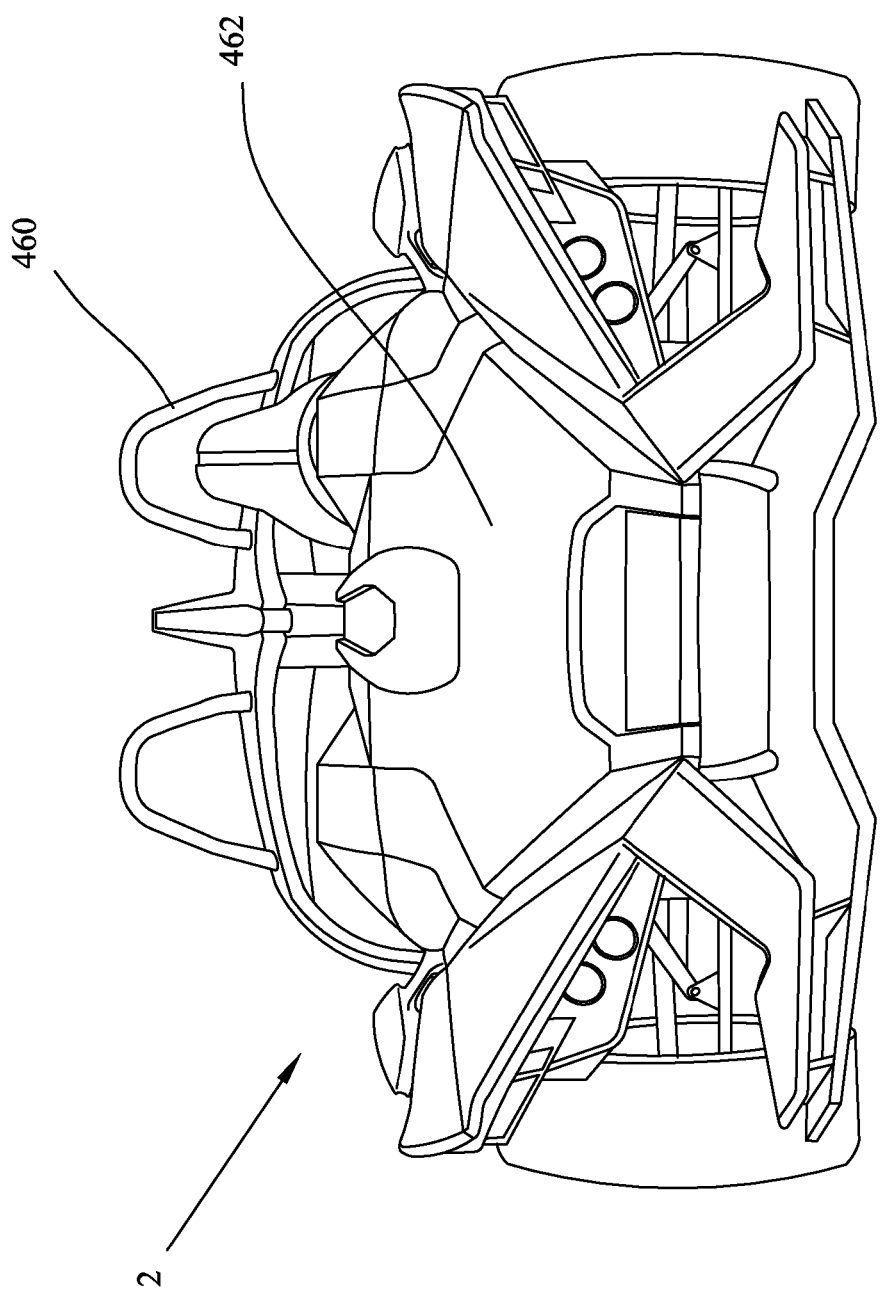
FIG. 20 is a front view of the vehicle.

With respect to ergonomics, and with reference to FIG. 18, the driver's compartment is shown. As designed the steering wheel 450 and the shifter 452 are positioned in the same plane to prevent excess hand movement. Also a passenger grab bar 454 is provided. Furthermore, the intersecting cross tubes 176, 178 (see FIG. 7) creates a low point 456, which is conveniently positioned at a longitudinal location for the driver and passenger to step into the vehicle. From a storage standpoint, the driver's seat will pivot forward to allow storage behind the seat in the area shown as 458 in FIG. 19. As shown in FIG. 20, the vehicle 2 will also have roll bars 460 over the driver's and passenger's seats, and a hood 462 which opens for engine access.

Figure 21:
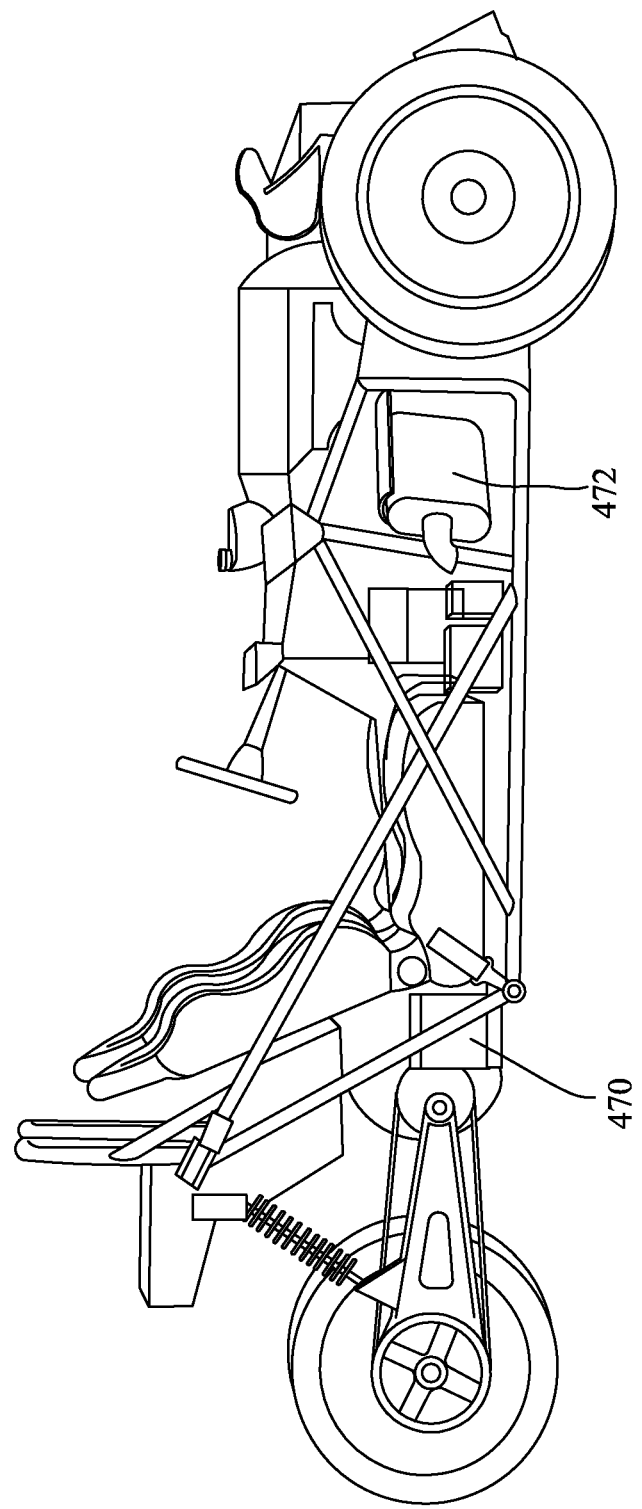
FIG. 21 shows a side view of the vehicle.

Other features of the vehicle are shown in FIG. 21. For example, the battery 470 is shown behind the passenger's seat to account for a heavier driver, or the absence of a passenger, to equalize the center of gravity. Also the muffler 472 is positioned in the front of the vehicle, but projected rearwardly and downwardly.

Figure 22:
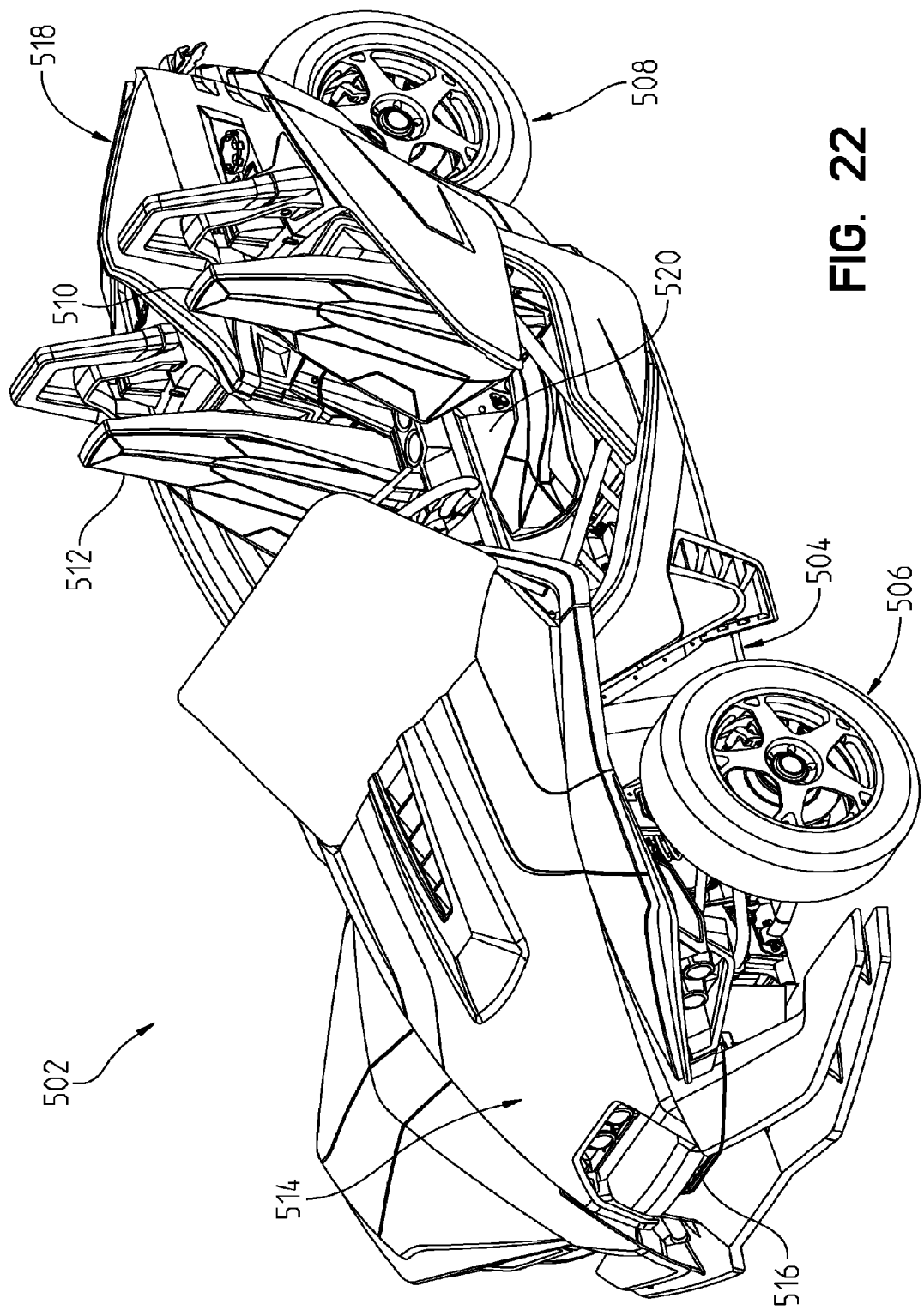
FIG. 22 is a perspective view of a three-wheeled vehicle of a second embodiment according to the present disclosure.
Figure 23:
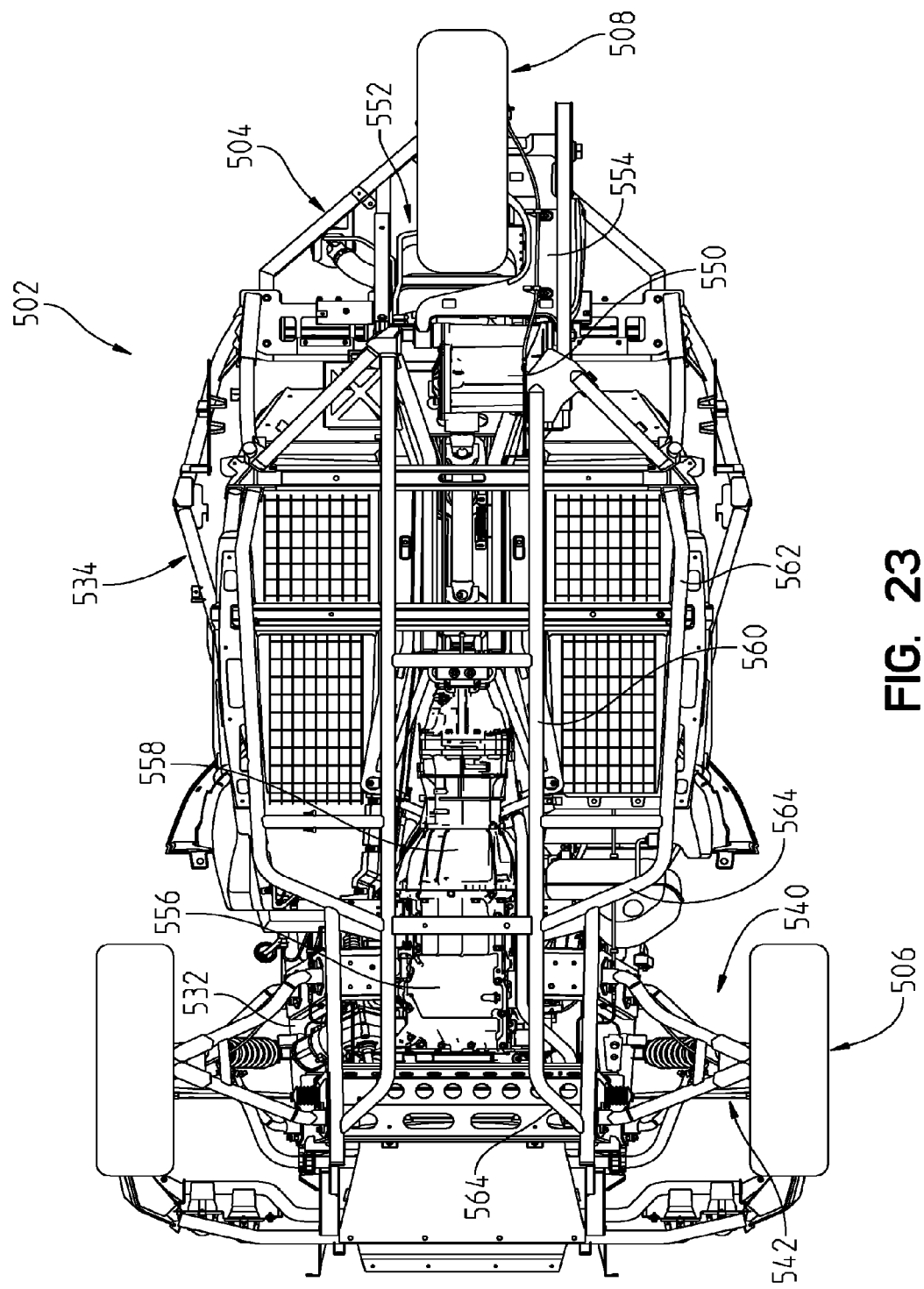
FIG. 23 is an underside view of the vehicle of FIG. 22.

With reference now to FIGS. 22 through 62 second embodiment of the vehicle is shown. With reference first to FIGS. 22 and 23, a three-wheeled vehicle is shown generally at 502. Vehicle 502 is comprised of a frame 504 supported by front wheels 506 and a single rear-wheel 508. Vehicle 502 is classified as a motorcycle that has side-by-side seating including a driver's seat 510 and a passenger's seat 512. Vehicle 502 also includes a front body portion 514 including an air intake 516 for cooling purposes, as described herein. Vehicle 502 further includes a rear body portion 518, a center body portion 520 and a windshield 522.

Figure 24:
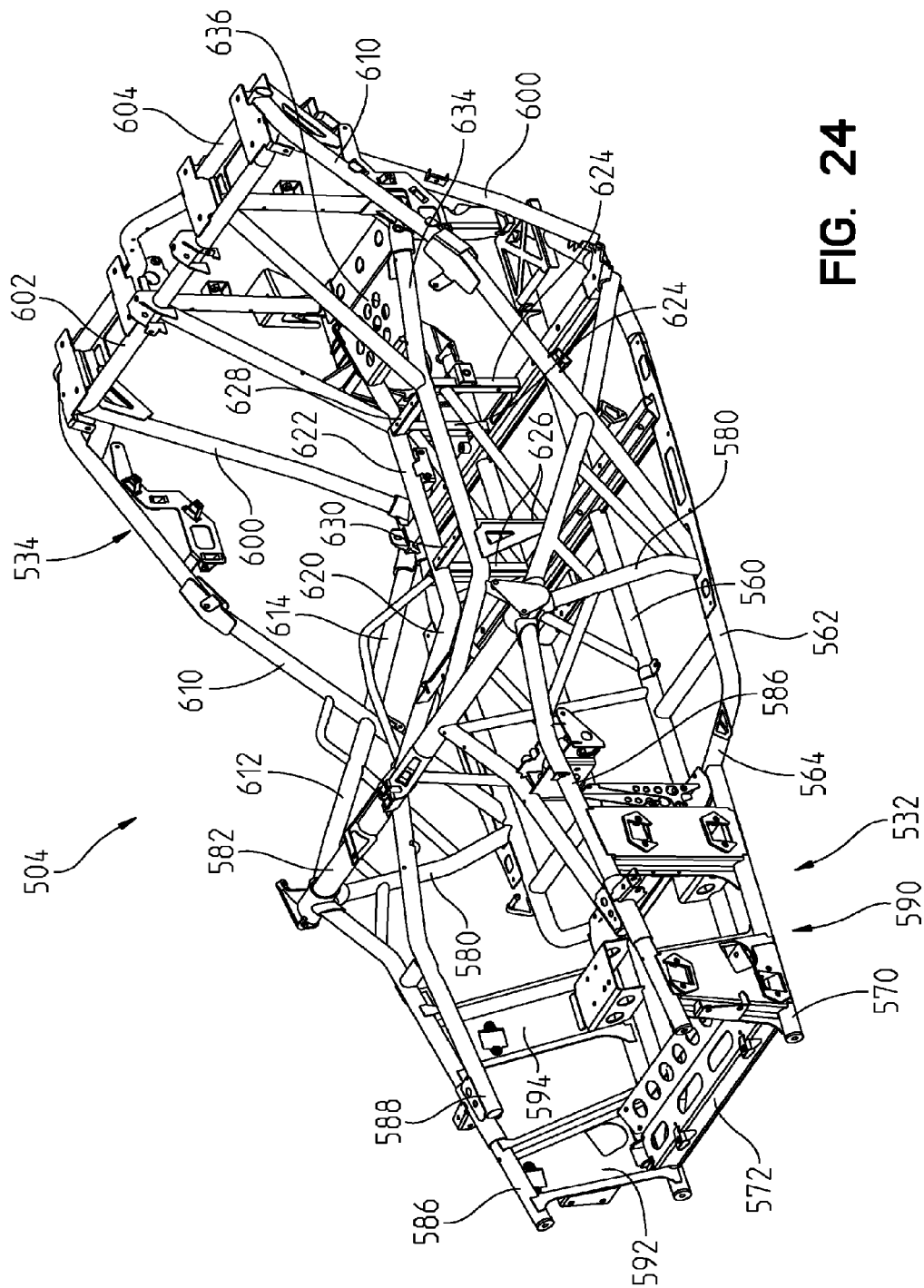
FIG. 24 is a left front perspective view of the frame for the vehicle of FIG. 22.

With reference now to FIGS. 23 and 24, frame 504 is generally comprised of a front frame portion or bulkhead 532 and a tubular frame portion 534. Vehicle 502 further includes a front suspension system 540, front steering system 542, rear final drive system 550, rear suspension 552 and rear swing arm 554. As shown, vehicle 502 includes a powertrain comprised of an engine 556 and a transmission 558. With reference now to FIG. 24, frame 504 will be described in greater detail.

Figure 25:
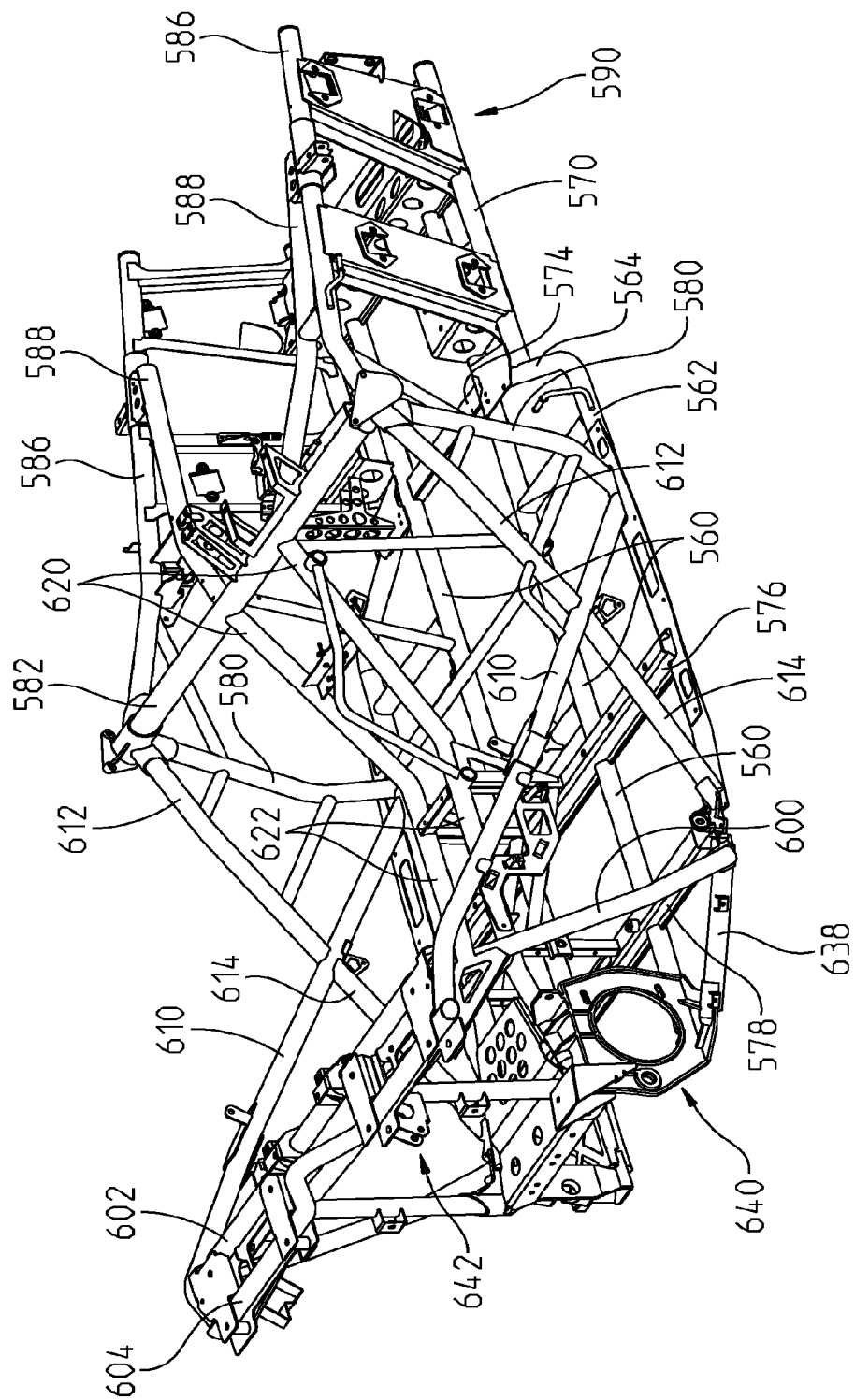
FIG. 25 is a right rear perspective view of the frame of FIG. 24.

As shown in FIGS. 23-25, frame portion 504 is comprised of main frame tubes 560 which extend a substantial length of frame 504. Outer tubes 562 extend generally longitudinally relative to tubes 560 and connect to tubes 560 by way of tube portions 564. Front tubes 570 extend rearwardly and connect to tube portions 564. Cross braces 572 (FIG. 24), 574 (FIG. 25), 576 (FIG. 25), and 578 (FIG. 25) extend between and structurally interconnect tubes 560 and 562. Upstanding tube portions 580 extend upwardly from tubes 562 and support an upper cross tube 582. Tubes 586 and 588 extend forwardly from cross tube 582. A frame front side wall 590 is defined by plate members 592 and 594 positioned in a substantially co-planer manner and coupled to frame tubes 570 and 586. Plate members 592 and 594 define a mounting structure for front suspension as described further herein.

Rear upstanding frame tubes 600 (FIG. 24) support rear cross tubes 602, 604. Frame tubes 610 (FIG. 25) extend from cross tubes 602, 604 and extend forwardly and downwardly to frame tube 562. Frame tubes 612, 614 extend in an intersecting manner between cross tube 582 and frame tube 562. Rearwardly extending tubes 620 extend from cross tube 582 to a mid-section of the vehicle where tubes 620 transition into portions 622 (FIG. 26) which extend generally parallel in both a horizontal and longitudinal direction. Tube portions 622 and uprights 624, 626, together with channel portions 628, 630 define a tunnel 632 for a driveshaft as further described herein. Tube portions 622 thereafter extend rearwardly and outwardly at portions 634 and support a fuel tank platform portion at 636 as described further herein.

Figure 26:
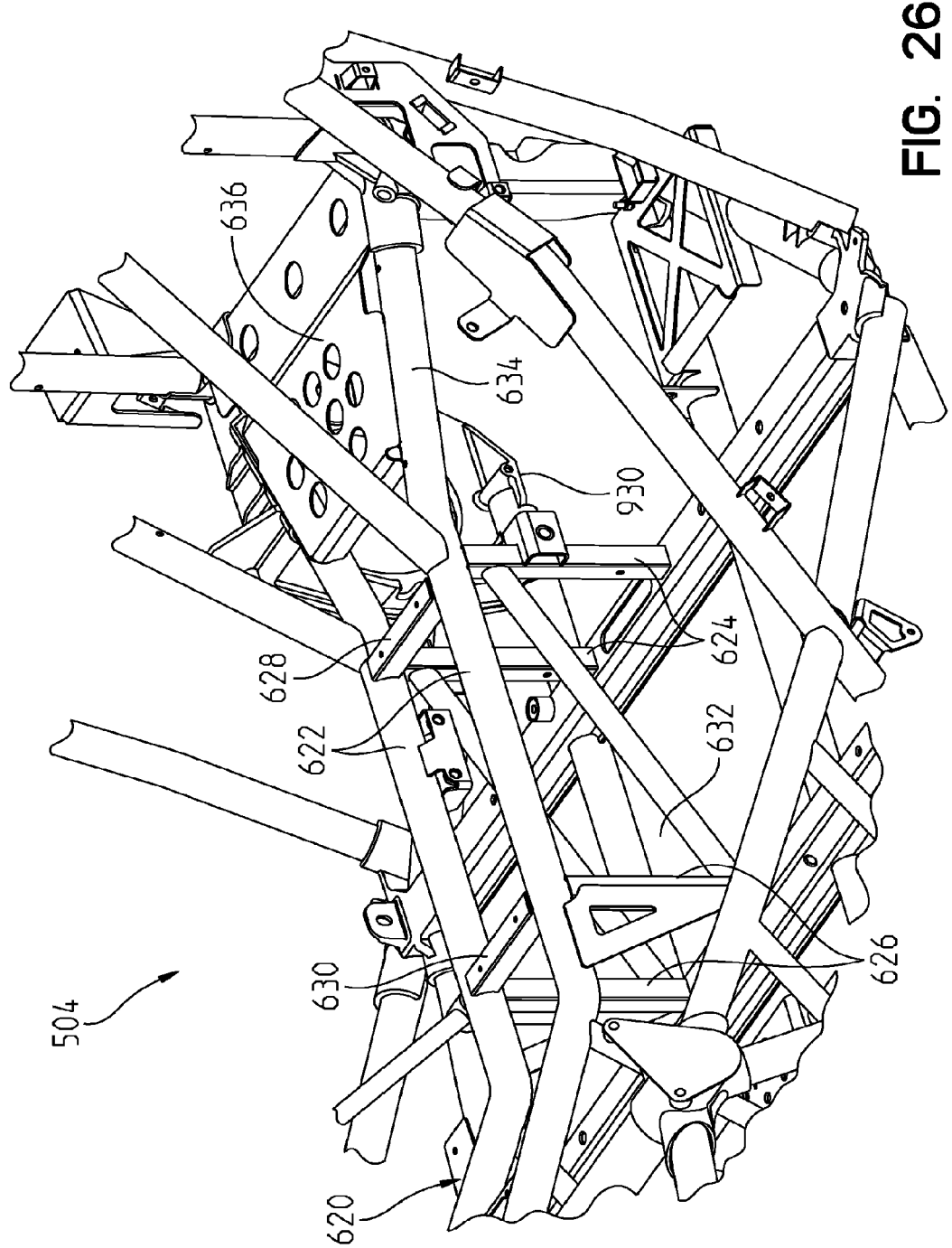
FIG. 26 is an exploded view of a portion of the frame depicted in FIG. 24.
Figure 27:
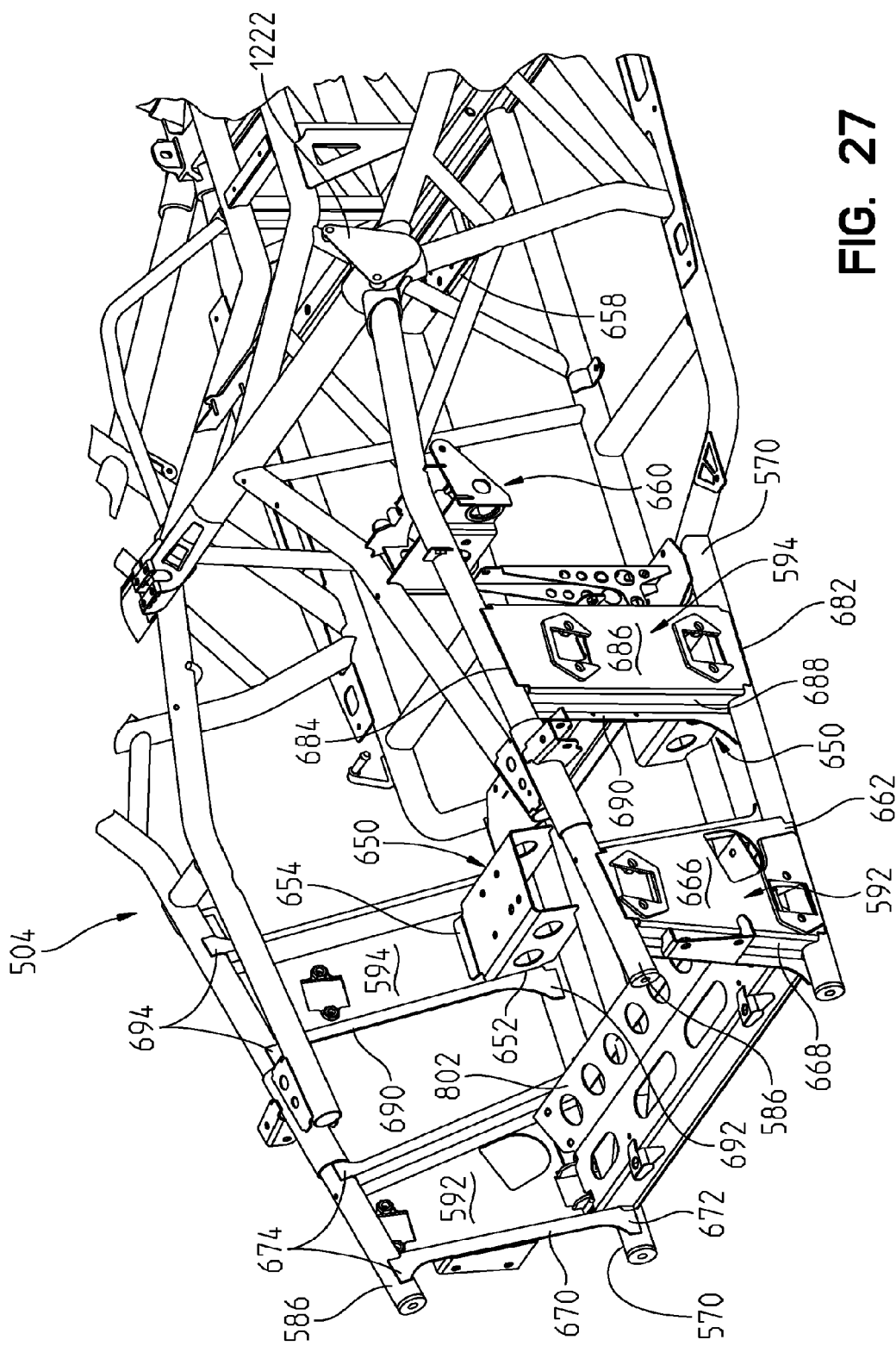
FIG. 27 is an exploded view of a portion of the front frame depicted in FIG. 24.

With reference to FIGS. 25-27, other components of the frame 504 are shown. Frame tubes 638 attach a final drive mount generally shown at 640 to channel 578, and a shock mount is shown at 642; both of which are described in greater detail herein. A battery support platform 644 is positioned behind the driver's seat, as best shown in FIG. 26. Engine mounts 650 (FIG. 27) back up to and are coupled to the plates 594 alongside edges 652 and top edge 654. Frame 504 further includes transmission mount 658 and clutch pedal mount 660.

With reference to FIG. 27, plate members 592 and 594 are coupled to lower tubes 570 and upper tubes 586. Plate member 592 includes lower edge 662 and upper edge 664 that are coplanar with planar portions 666. Plate member 592 further includes side edges 668 and side flap 670. Side flap 670 defines a lower edge 672 positioned behind tube 570 and an upper edge 674 positioned behind tube 586. In a like manner, plate member 594 includes lower edge 682 and upper edge 684 that are coplanar with planar portions 686. Plate member 594 further includes side edge 688 and side flap 690. Side flap 690 defines a lower edge 692 positioned behind tube 570 and an upper edge 694 positioned behind tube 586. Other aspects of the frame components will be described in further detail herein. In addition, other features of the frame will be described as it relates to other vehicle components. With the frame as described above, the front suspension 540 will be described in greater detail.

As shown best in FIGS. 28-30, suspension 540 will be described in greater detail. As shown in FIG. 29, front frame portion 532 has openings 700, 702 for mounting alignment arms or A-arms as described herein. As shown, openings 700 are defined by a cut-out through the plates 666 and 686 and further include mounting apertures 704 on opposite sides of the openings 700, as further described herein. Openings 702 are defined by a cut-out through the plates 666 and 686 and further include mounting apertures 706 on opposite sides of the openings 702, as further described herein.

As shown, suspension 540 is also comprised of upper alignment arms 720 and lower alignment arms 722. Each of the alignment arms 720 has inner ends attached to the sidewall 590; and to that end, and with respect to FIG. 30, upper alignment arm 720 includes couplings 724 comprised of a fixed portion 726 for attachment to the sidewall 590 and pivotal portions 728 allowing alignment arms 720 to pivot relative to sidewall 590. Lower alignment arm 722 includes couplings 730 having fixed portions 732 attached to sidewall 590 and pivotal portions 734 allowing alignment arms 722 to pivot relative to sidewall 590. It should be apparent that pivotal portions 728 of couplings 724 are cylindrical in shape and are received within openings 700, and that pivotal portions 734 of couplings 730 are received within openings 702. Meanwhile fixed portions 726 and 732 of the couplings may be fixed to the sidewall 590 by way of a fastener through the fixed portions 726 and 732 and through apertures 704 and 706. As shown best in FIGS. 23, 29 and 30, lower alignment arm 722 includes a defined buckle point 736, which collapses before damaging the sidewalls 590, in the event of a significant impact to one of the front wheels 506.

Upper alignment arm 720 and lower alignment arm 722 further include outer ends for connection to a wheel hub 750. With respect to FIG. 30, upper alignment arm 720 includes a coupling 752 for attachment to an upper joint 754, and lower alignment arm 722 includes a coupling 756 for attachment to a lower joint 758 of wheel hub 750. As shown, wheel hub 750 also includes brake disc 760 and caliper 762 as in known in the art. With reference to FIG. 29, a shock absorber 770 is positioned at an upper end connected to shock mount 778 and at a lower end connected to mount portion 772 of lower alignment arm 722.

Figure 28:
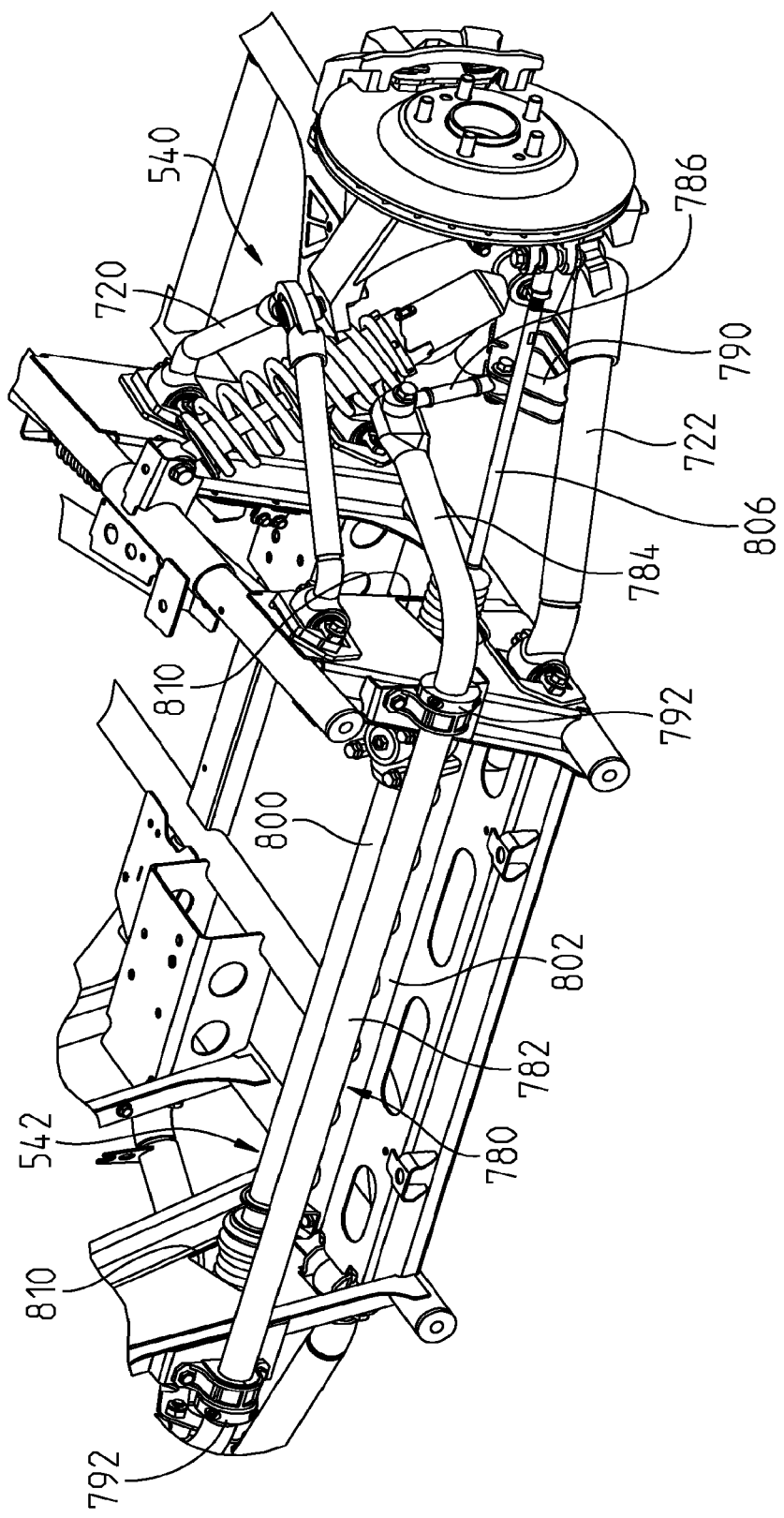
FIG. 28 is a front perspective view, partially fragmented, of the front, left suspension attached to the frame of FIG. 24.
Figure 29:
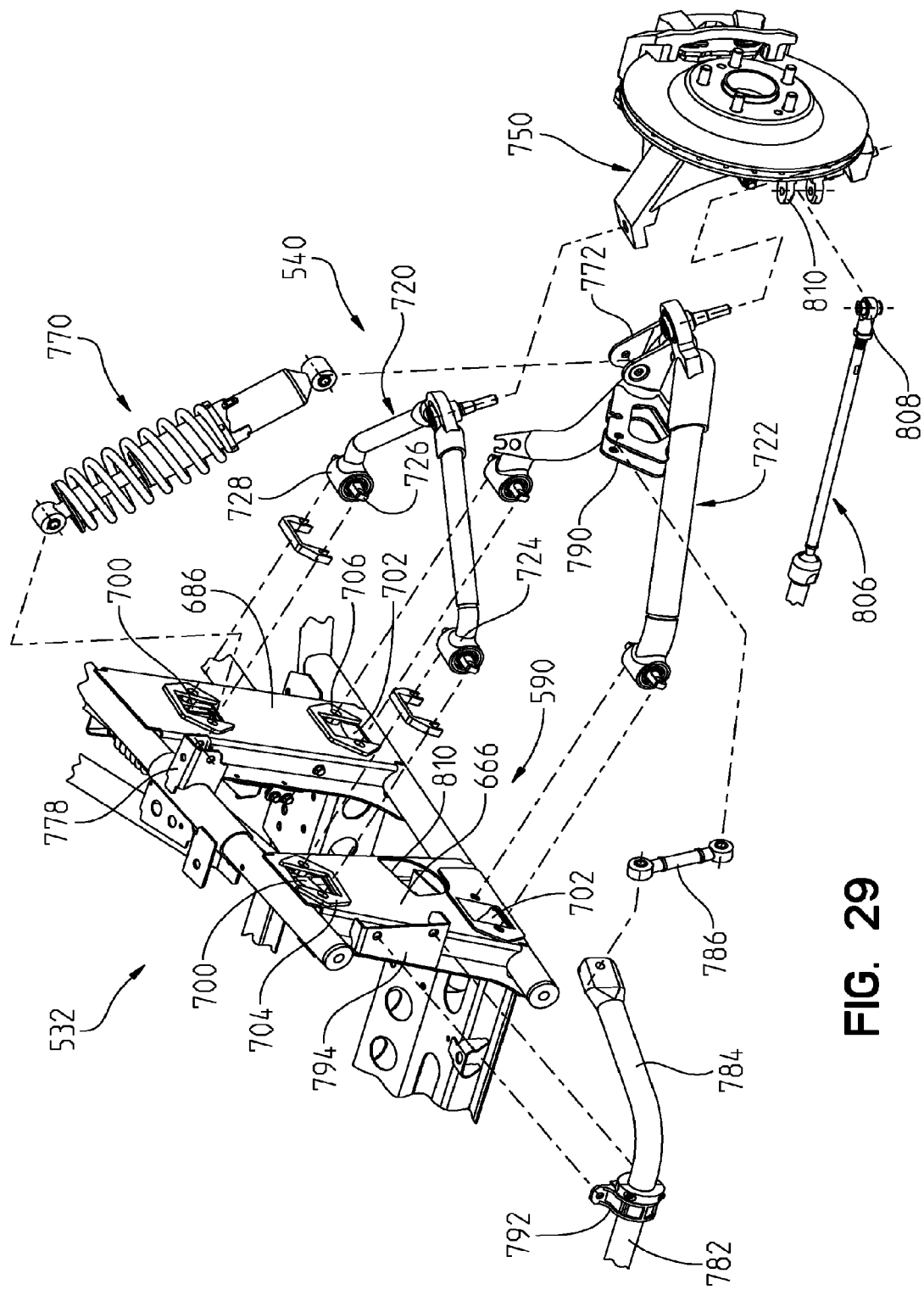
FIG. 29 is an exploded view of the suspension of FIG. 28.
Figure 30:
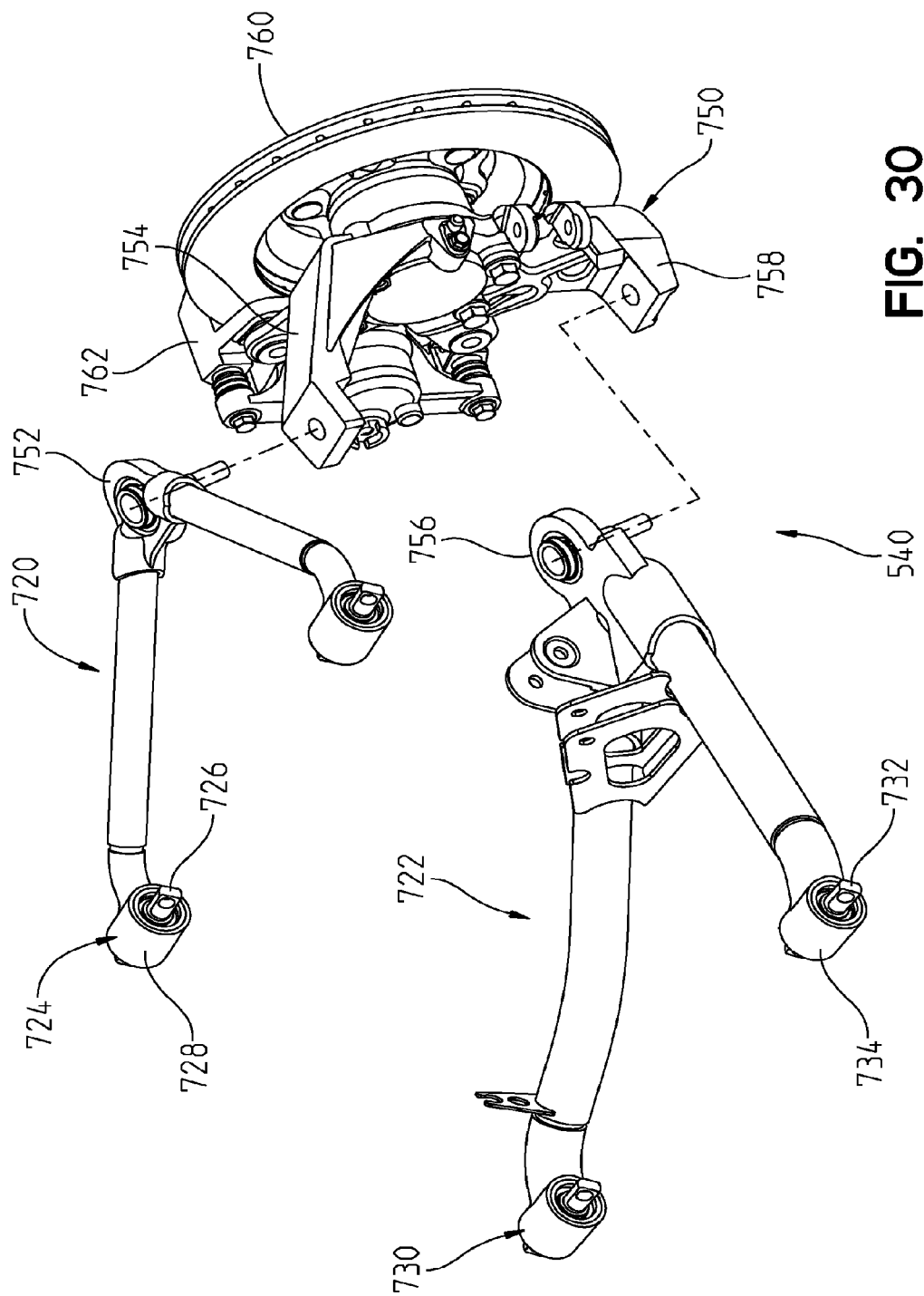
FIG. 30 is an enlarged and exploded view of the alignment arms of the suspension of FIG. 29.

Suspension system 540 further includes a torsion bar 780, as best shown in FIGS. 28 and 29, having a transverse bar portion 782 and rearwardly extending arms 784. Arms 784 are coupled to brackets 790 by way of link arms 786, which couples the torsion bar 780 to the lower alignment arm 722. Torsion bar 780 is coupled to frame 504 by way of clips 792, which in turn are coupled to brackets 794 of frame 504 (FIG. 29). Arms 784 may move upwardly and downwardly with lower alignment arm 722 and the transverse bar portion may rotate within the clips 792.

With respect now to FIGS. 28 and 29, steering system 542 will be described in greater detail. As shown, steering system 542 includes a rack and pinion system 800 secured to a bracket 802 (FIGS. 27 and 28). As shown, rack and pinion steering system 800 includes an input from a steering post (not shown) which in turn is connected to steering rods 806. It should be appreciated that the rack and pinion steering system includes a pinion portion which would move the rack either rightwardly or leftwardly as viewed in FIG. 29 to move steering rods 806, which ultimately turns front wheels 506. As shown best in FIG. 29, steering rods 806 are attached to wheel hubs 750 by way of a ball joint 808 coupled to joint 810. As shown, rack and pinion system 800 is mountable to frame 504 with the steering rods 806 extending through sidewall 590, that is, through openings such as 810, see FIG. 28. Although the steering system disclosed is a rack and pinion, an electronic power steering system could be incorporated herein. An exemplary power steering system is disclosed in U.S. patent application Ser. No. 12/135,107 (US Publication 20090302590 and corresponding PCT application PCT/US09/42985), the disclosures of which are expressly incorporated by reference herein.

Figure 31:
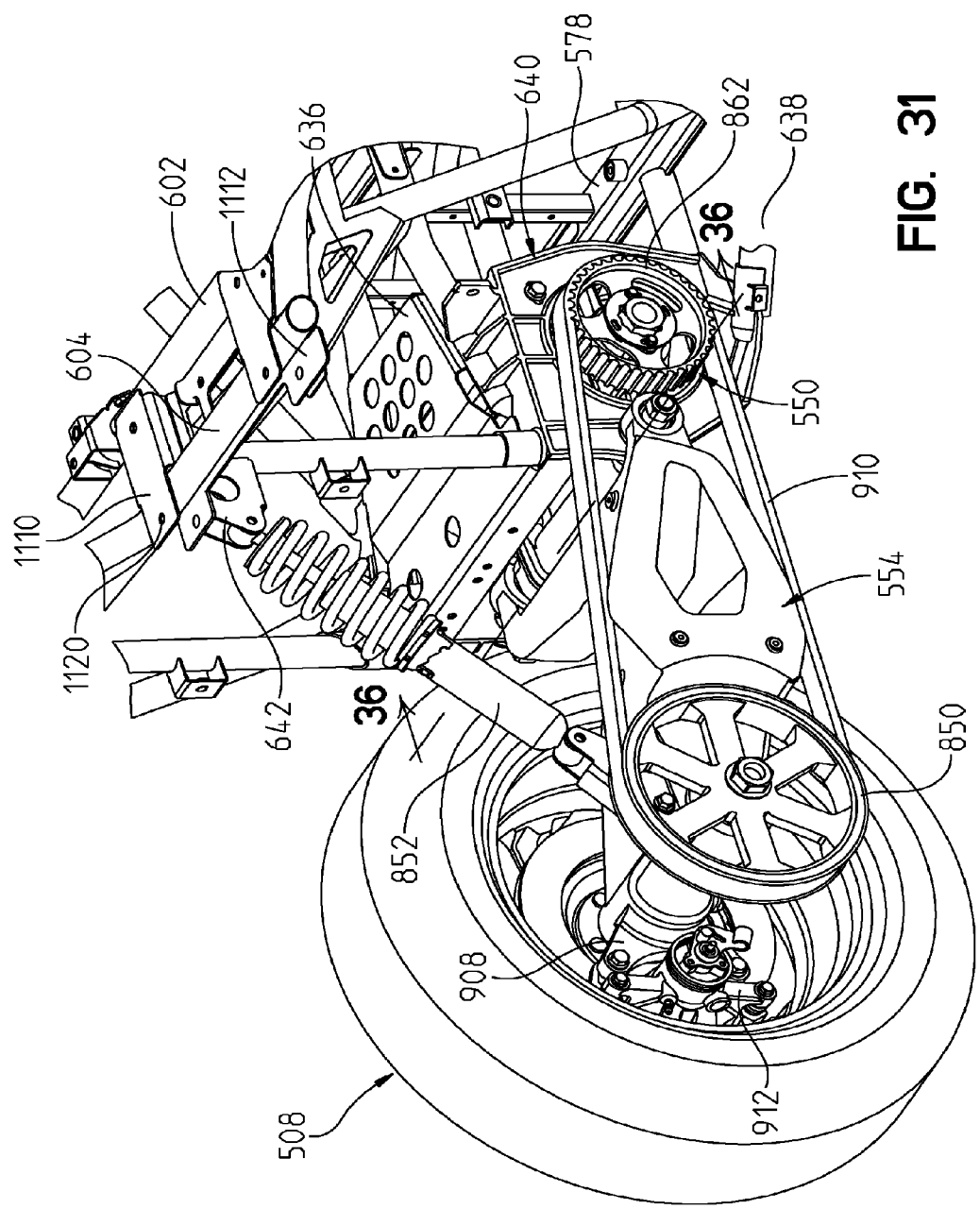
FIG. 31 shows an enlarged view of the rear swing arm of the present vehicle.
Figure 32:
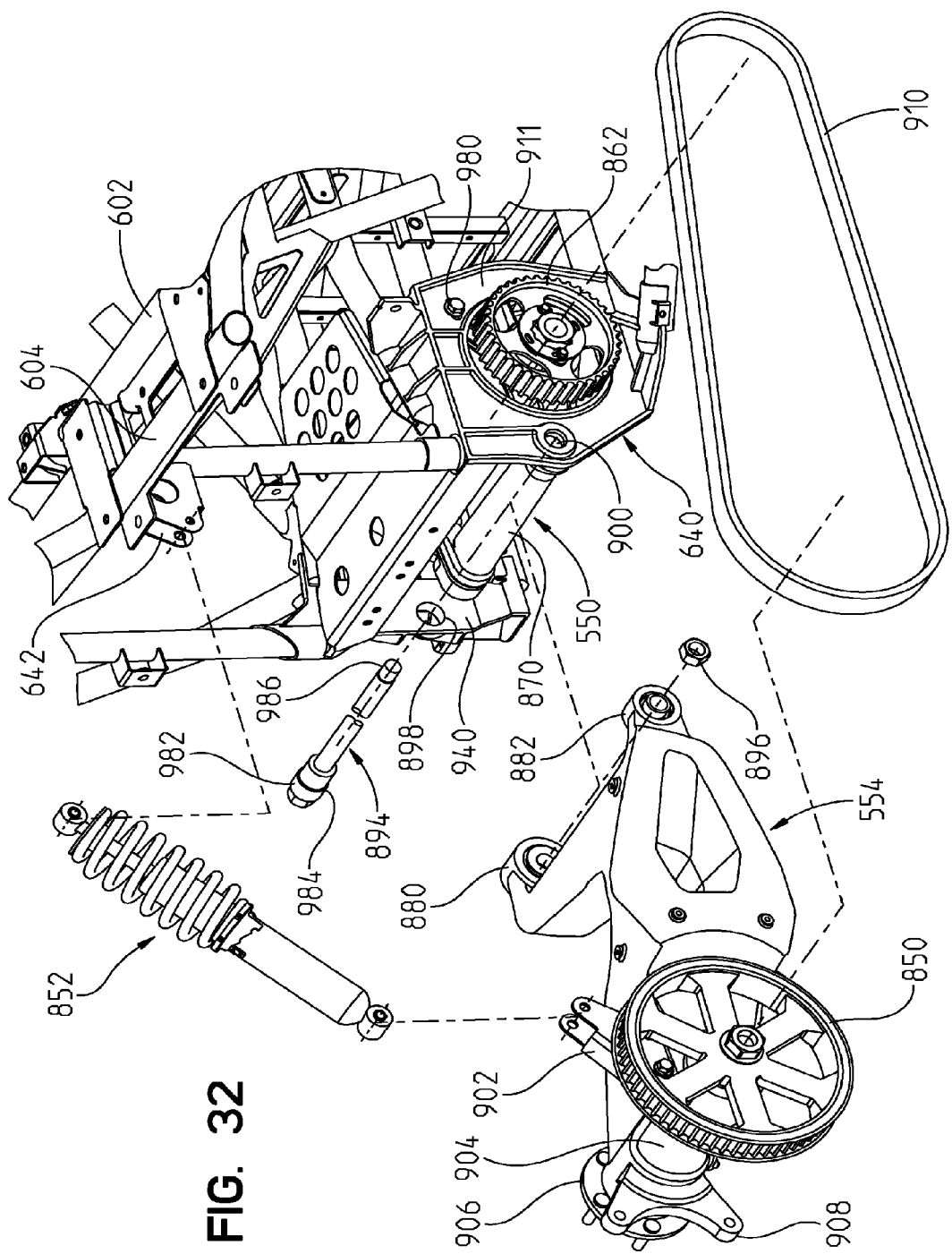
FIG. 32 is an exploded view of the swing arm assembly of FIG. 31.
Figure 33:
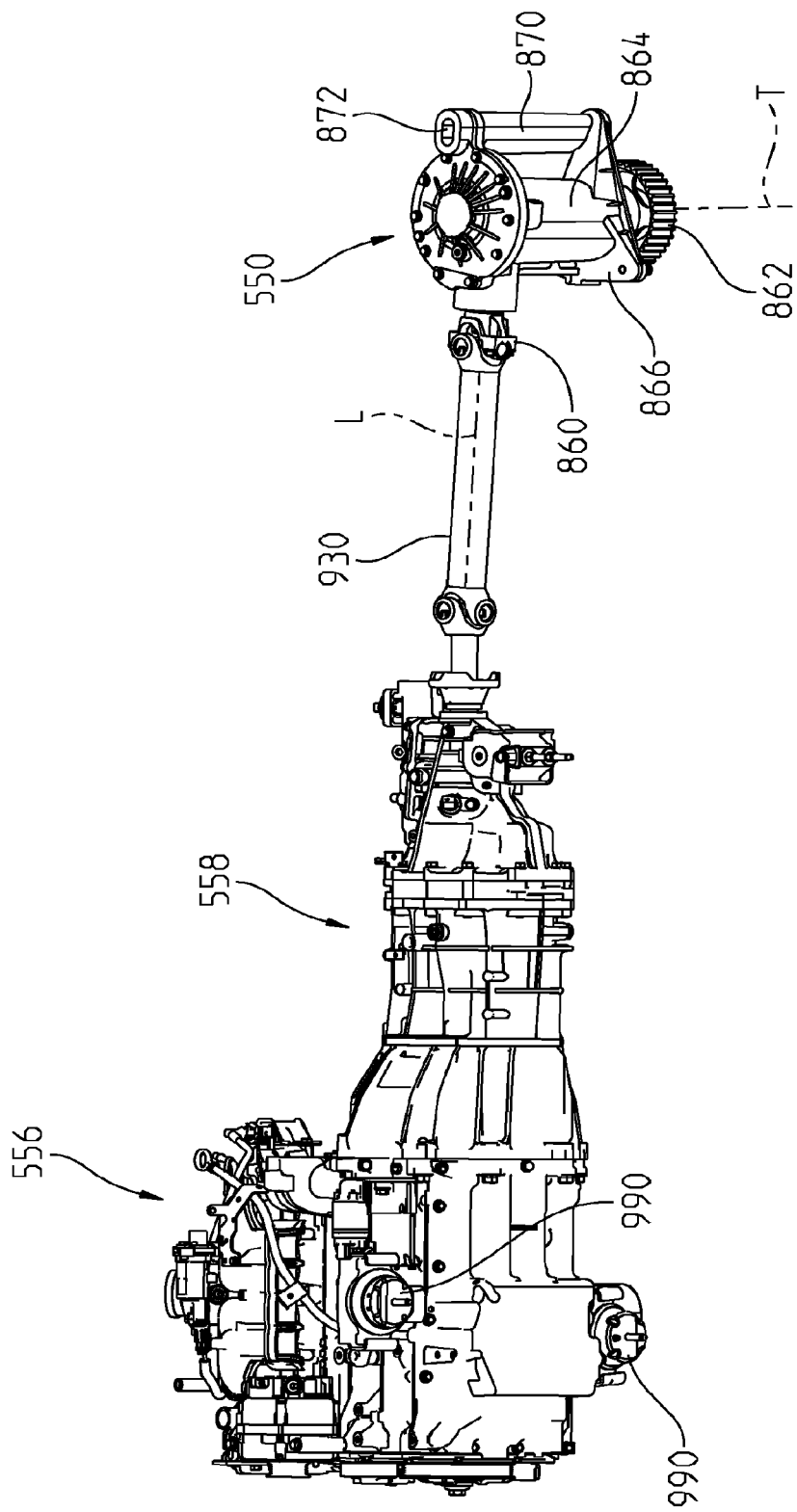
FIG. 33 is an underside perspective view of the drive train of the vehicle of FIG. 22.

With reference now to FIGS. 31-33, rear wheel 508 is generally shown rotatively mounted to swing arm 554. As shown, swing arm 554 is pivotally mounted to final drive mount 640, final drive 550 is poised for driving wheel 508 through sprocket 850 and shock absorber 852 as shown in position between cross brace 604 and rear swing arm 554.

With reference now to FIG. 33, final drive 550 will be described in greater detail. As shown, final drive 550 includes an input universal joint 860 operating an input shaft on final drive 550. The universal joint 860 is splined with the input shaft to allow longitudinal movement of the final drive 550 relative to the universal joint 860, as further described herein. Thus rotational input to universal joint 860 about axis L causes an output rotation to sprocket 862 about axis T. As shown, final drive 550 includes an outer housing 864 having mounting portions 866 which mount to final drive mount 640 as shown in FIG. 32.

With respect now to FIG. 32, rear swing arm 554 includes front pivot joints 880 and 882 which are pivotally attached to extension 870 and to final drive mount 640 by way of fasteners 894, 896 through the apertures 898, 900 as shown. As shown fastener 894 is a shaft in the form of an elongate stud and fastener 896 is a nut. This allows swing arm 554 to be pivotally mounted relative to the tubular frame 534. Swing arm 554 further includes a mounting bracket 902 for mounting the end of shock absorber 852 thereto. Finally, swing arm 554 includes a rear axle housing 904 having an axle therein which is attached to wheel hub 906 for mounting rear wheel 508 at one end, and sprocket 850 at the opposite end. Mounting ears 908 extend from the axle housing.

As assembled, and as shown in FIG. 31, brake caliper 912 is directly attached to the swing arm 554 by attachment to mounting ears 908. A belt 910 is entrained about sprockets 850 and 862 to transfer torque from the engine to the wheel 508. Thus swing arm 554 may pivot about pivot joints 880 and 882 but through the rear suspension system of shock absorber 852.

Figure 34:
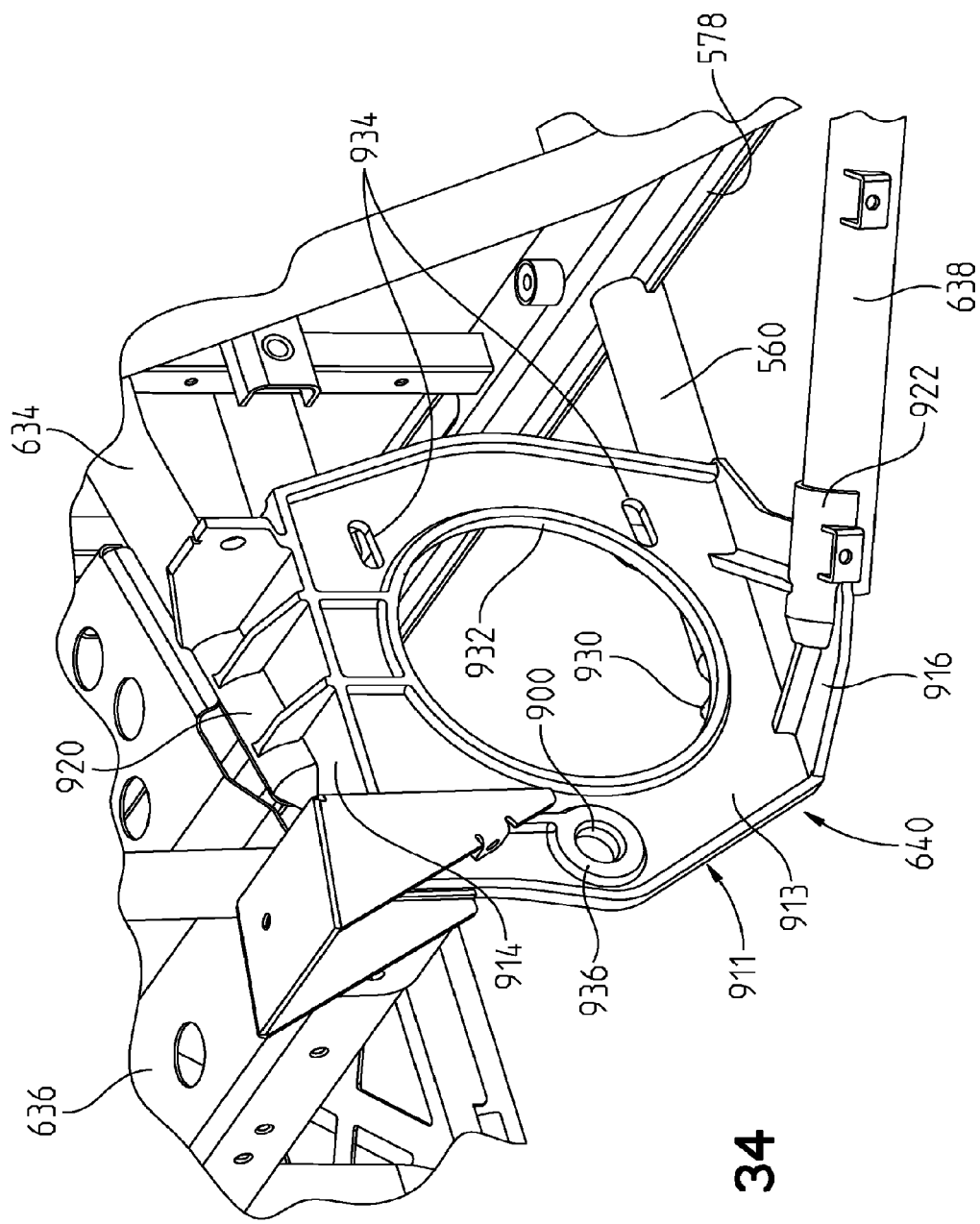
FIG. 34 is an enlarged view of a portion of the final drive mount.

With reference now to FIG. 34, final drive mount 640 is partially comprised of a casting 911 having a plate portion 913 with an upper triangular extension 914 extending from a top edge of plate 913 and a lower triangular plate 916 extending from a lower edge of plate 913. Upper extension 914 includes a semi-cylindrical receiving member 920 whereas extension 916 includes a semi-cylindrical receiving portion 922. As shown, semi-cylindrical receiving portion 920 receives the rear portion of frame tube 634 and semi-cylindrical receiving portion 922 receives a rear end of frame tube 638. As also shown, casting 911 includes a semi-cylindrical receiving portion 930 on an inner side thereof to receive a rear end of frame tube 560. It should be appreciated that the connection of frame tubes 560, 634 and 638 could be by way of fasteners, adhesives, rivets, welding or a combination thereof. It should also be appreciated that the connection of the frame tubes in triangulation with the casting 911 increases the rigidity of casting 911 and the frame 504 in general. Casting 911 further includes an aperture at 932 to receive sprocket 862 (FIG. 32) therethrough and slotted apertures at 934. An annular raised section 936 surrounds aperture 900. As shown in FIG. 32, final drive mount 640 further includes wall 940 opposed to wall 913.

Figure 35:
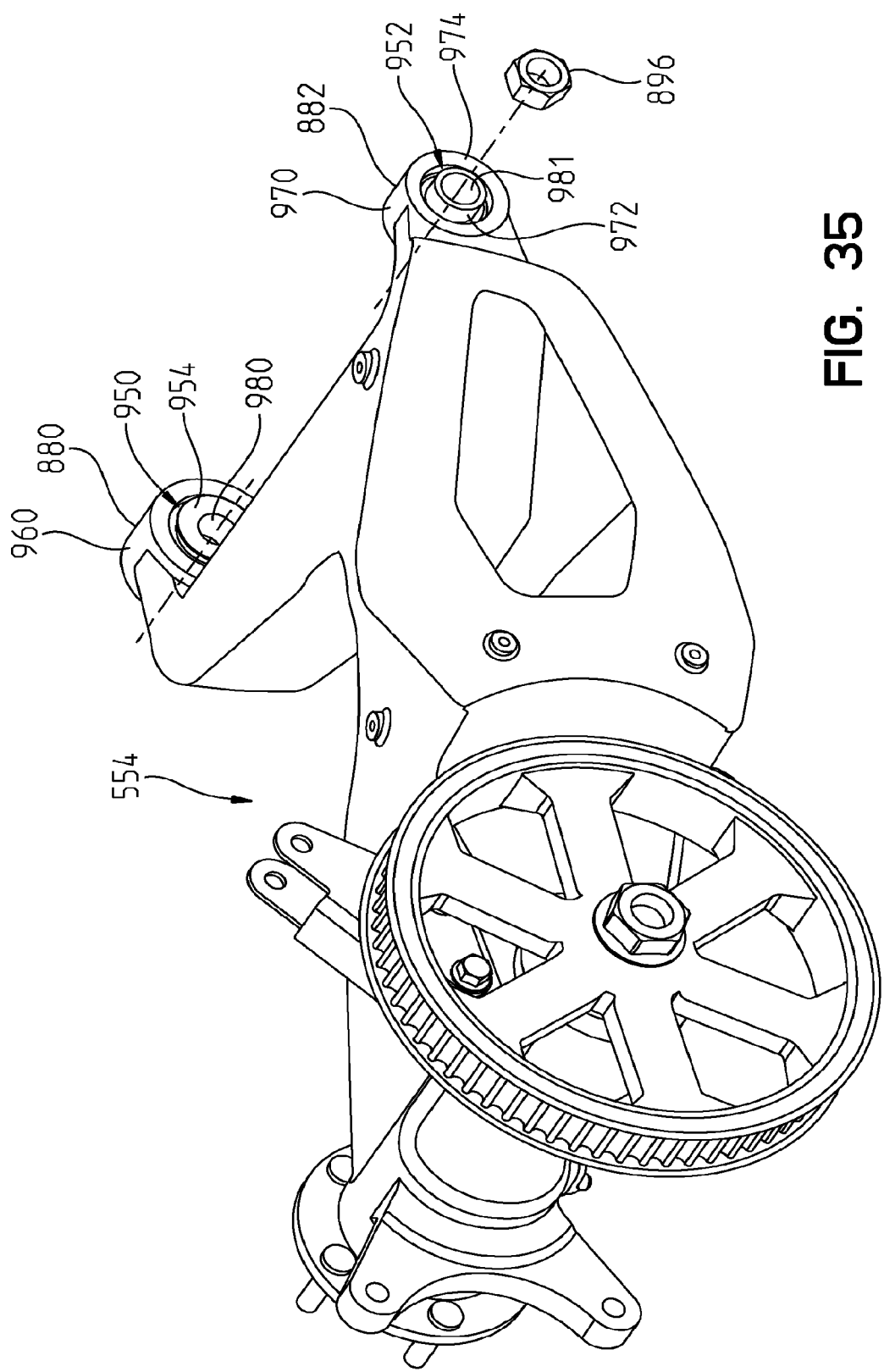
FIG. 35 is an enlarged view of the rear swing arm.
Figure 36:
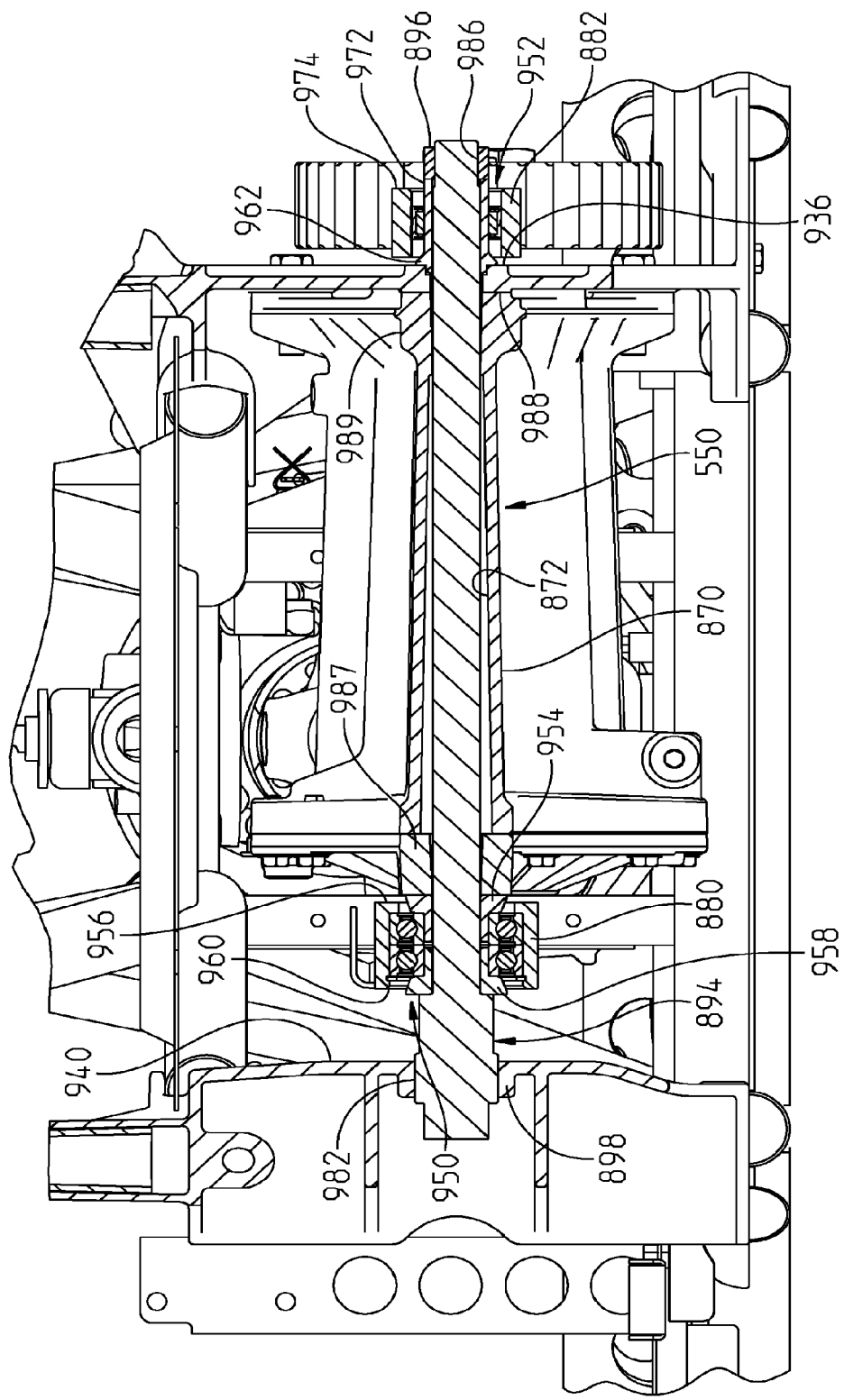
FIG. 36 is a cross-sectional view through lines 36-36 of FIG. 31.

With reference now to FIGS. 35 and 36, swing arm 554 is shown in greater detail. In particular, front couplings 880 and 882 are shown in greater detail as including inner bearings 950 and 952, respectively. Bearing 950 includes a bearing portion 954 which extends beyond end face 956 and a bearing portion 958 which extends beyond end face 960 (FIG. 36). Meanwhile, bearing 952 includes an inner face 962 extending inwardly beyond end face 970 of coupling 882 and includes a tubular portion 972 extending beyond outer end face 974. Meanwhile, bearing 950 includes a through opening 980 and bearing 952 includes a through opening 981. Stud 894 includes threaded portion 982, shoulder 984 and threaded portion 986 (FIG. 32). Thus as described below, the combination of swing arm 554, final drive 550 and final drive mount 640 combine together to both rigidify the final drive and its connection to the frame as well as allow for the easy adjustment and tightening of belt 910.

More particularly, and with reference to FIG. 36, coupling 880 is positionable such that bearing portion 958 of bearing 950 abuts shoulder 984 on stud 894 and portion 954 of bearing 950 abuts an end 987 of the extension 870 of final drive housing. On the opposite end, extension 870 of final drive housing has an end 989 in abutment with an inner annular portion 988. Bearing inner face 962 abuts outer annular portion 936. To assemble the swing arm 554 to the final drive mount 640, the swing arm 554 is positioned with apertures 980 and 981 (FIG. 35) in alignment with the slotted opening 872, and stud 894 is inserted from the left hand side as viewed in FIG. 36 to position stud through aperture 898. Stud 894 is inserted through the final drive housing and the end of stud 894 protrudes through tubular portion 972 of bearing 952. Portion 982 of stud 894 is threaded and threadably engages with threads of aperture 898. Fastener 896 is then threaded on to the threaded end 986 of stud 894.

Thus in the partially assembled position, fastener 896 is received and partially tightened to hold the swing arm in position. At the same time, fasteners such as 980 (FIG. 32) may be received through slotted apertures 934 (FIG. 34) and received in the final drive housing 864 as shown best in FIG. 32. Thus with fasteners 896 and 980 partially tightened, final drive 550 may be moved relative to final drive mount 640 forwardly and rearwardly in a longitudinal direction due to both the slotted apertures 934 and elongate aperture 872, and the splined universal joint 860. Thus to position belt 910 over sprockets 850 and 862, final drive 550 is moved to a position furthest rearwardly, shortening the center distance between sprockets 850, 862 and belt 910 is positioned over sprockets 850 and 862. Thereafter final drive is moved forwardly to a position where belt 910 is taught and the fasteners 896 and 980 are tightened, to position final drive in a fixed position relative to final drive mount 640.

Also, given the structure as defined above, the clamp load in the axle helps to stiffen the final drive mount 640 for the final drive 550 and the stiffness of the final drive 550 is used to stiffen the mounting of the swing arm. The final drive mount 640 is stiffened because as the fastener 896 is torqued, a clamp load is created in the stud 894. This loads bearing sleeve 972 into cast wall 913, which in turn contacts the extension section 870 of final drive 550. The extension section 870 loads the bearing portions 954, 958 of bearing 950, which are trapped against shoulder 984 (FIG. 32) of stud 894. Stud 894 is threaded into wall 940 which stiffens the walls 913, 940.

Figure 37:
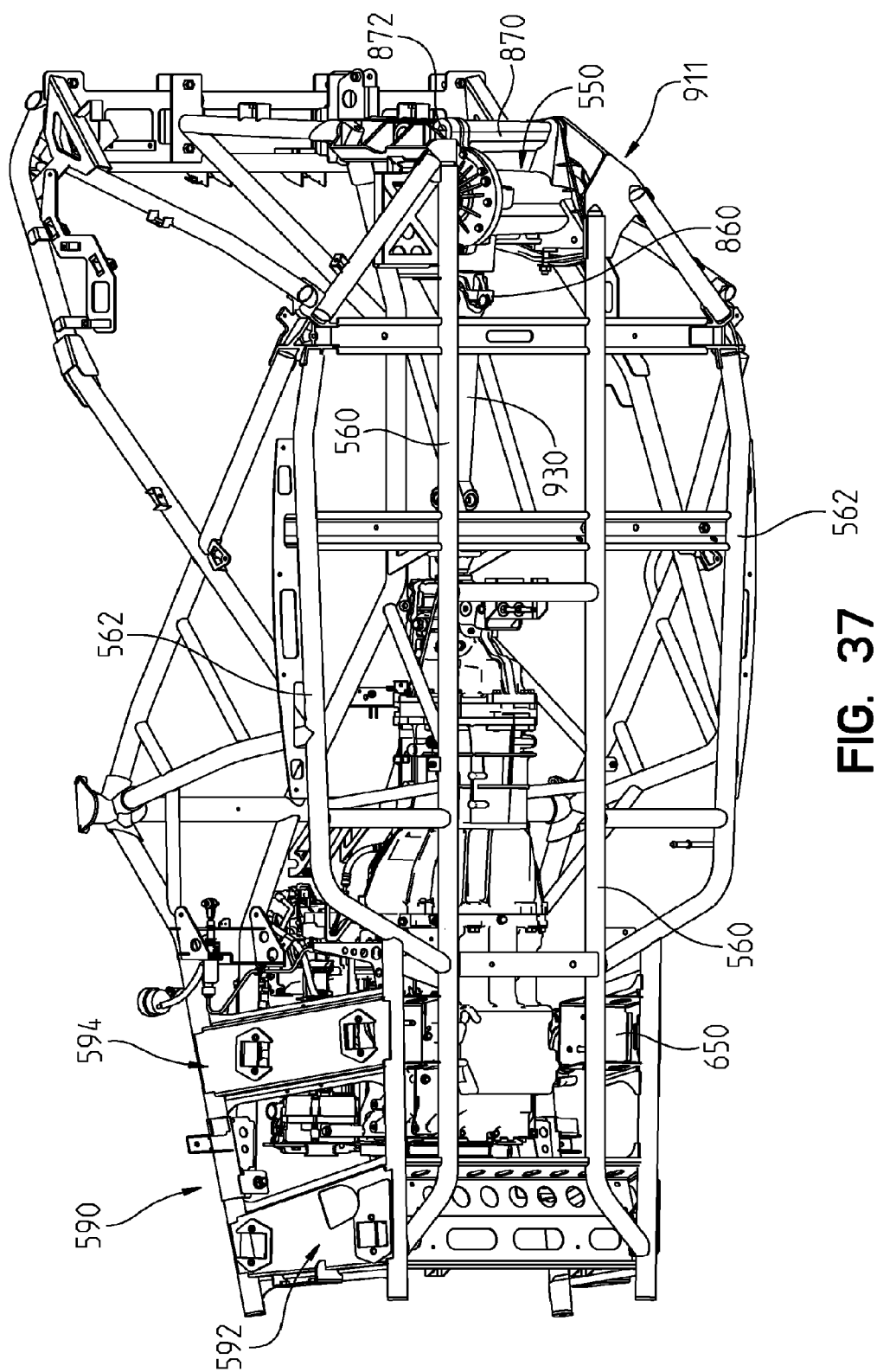
FIG. 37 is an underside perspective view of the drive train as assembled to the frame.

As mentioned above, vehicle 502 has an engine 556 in the form of an automotive style engine, for example a GM 2.4 L Ecotec LE5 (P/N 12619532) or equivalent, with a complementary manual transmission 558, such as an Aisin AR5 MA5 (P/N 24240205), where engine 556 and transmission 558 are directly coupled to each other, as shown in FIG. 33. It is also anticipated that engine 556 is directly attached by way of resilient mounts 990 (FIG. 33) to engine mounts 650 (FIG. 37). Thus as shown in FIG. 37, the upstanding sidewalls 590 define an engine receiving area intermediate the sidewalls 590 and the sidewalls 590 also define suspension mounts on the outside of the sidewalls 590. The engine is placed in the vehicle at a position where the vehicle is the widest.

Figure 38:
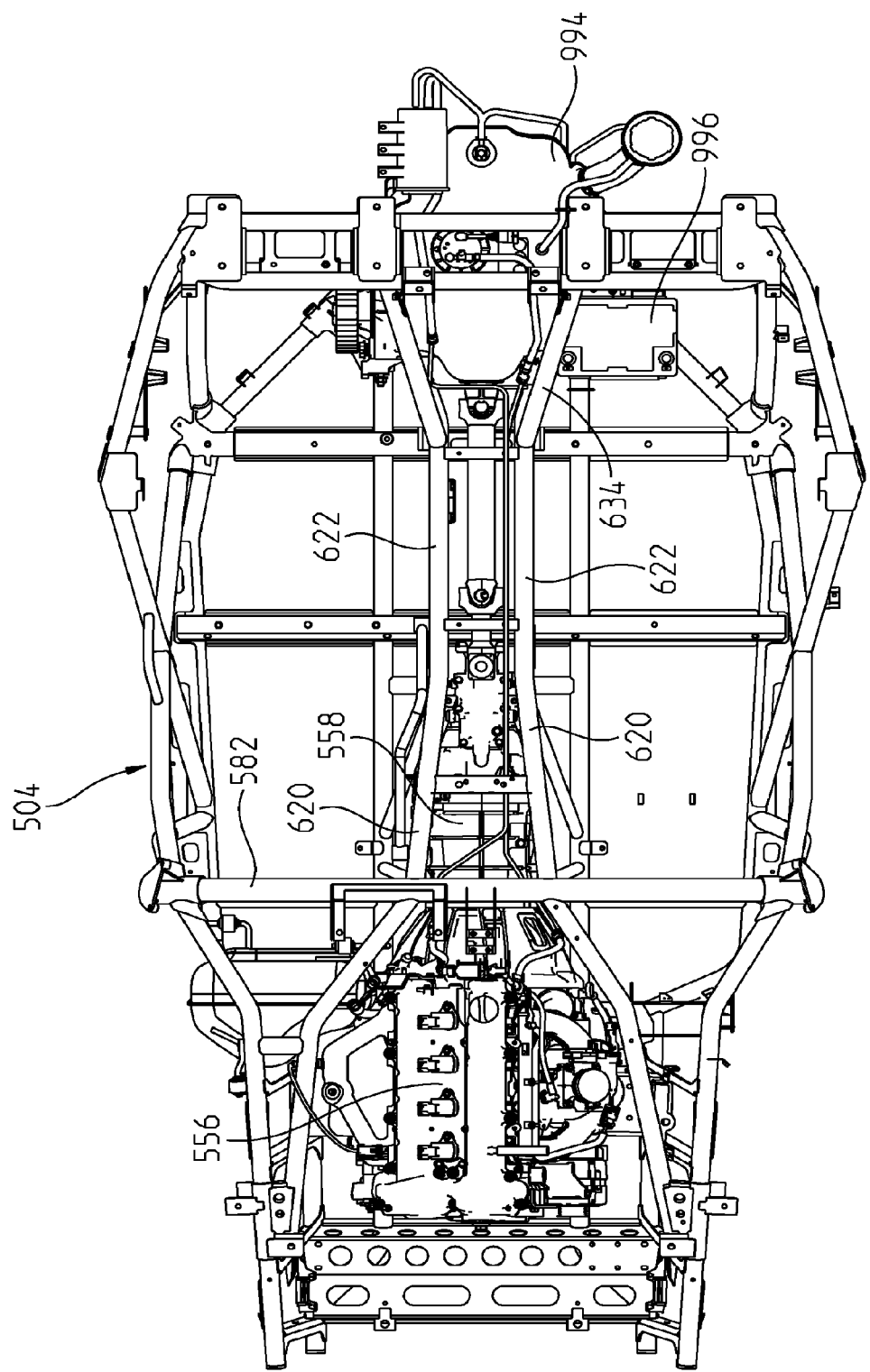
FIG. 38 is a plan view of the power train installed in the frame.
Figure 39:
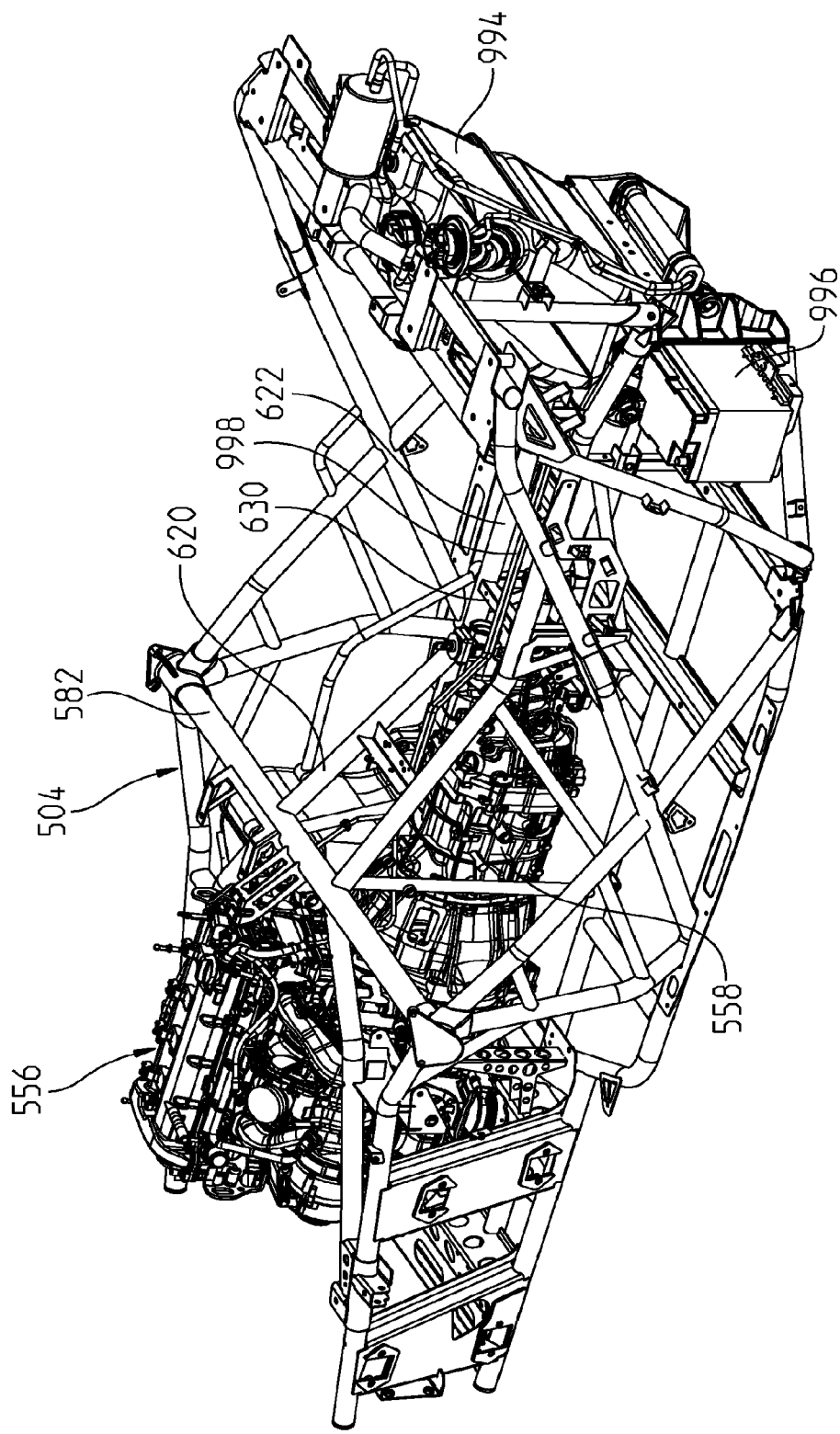
FIG. 39 is a rear perspective view of the frame and power train of FIG. 38.
Figure 40:
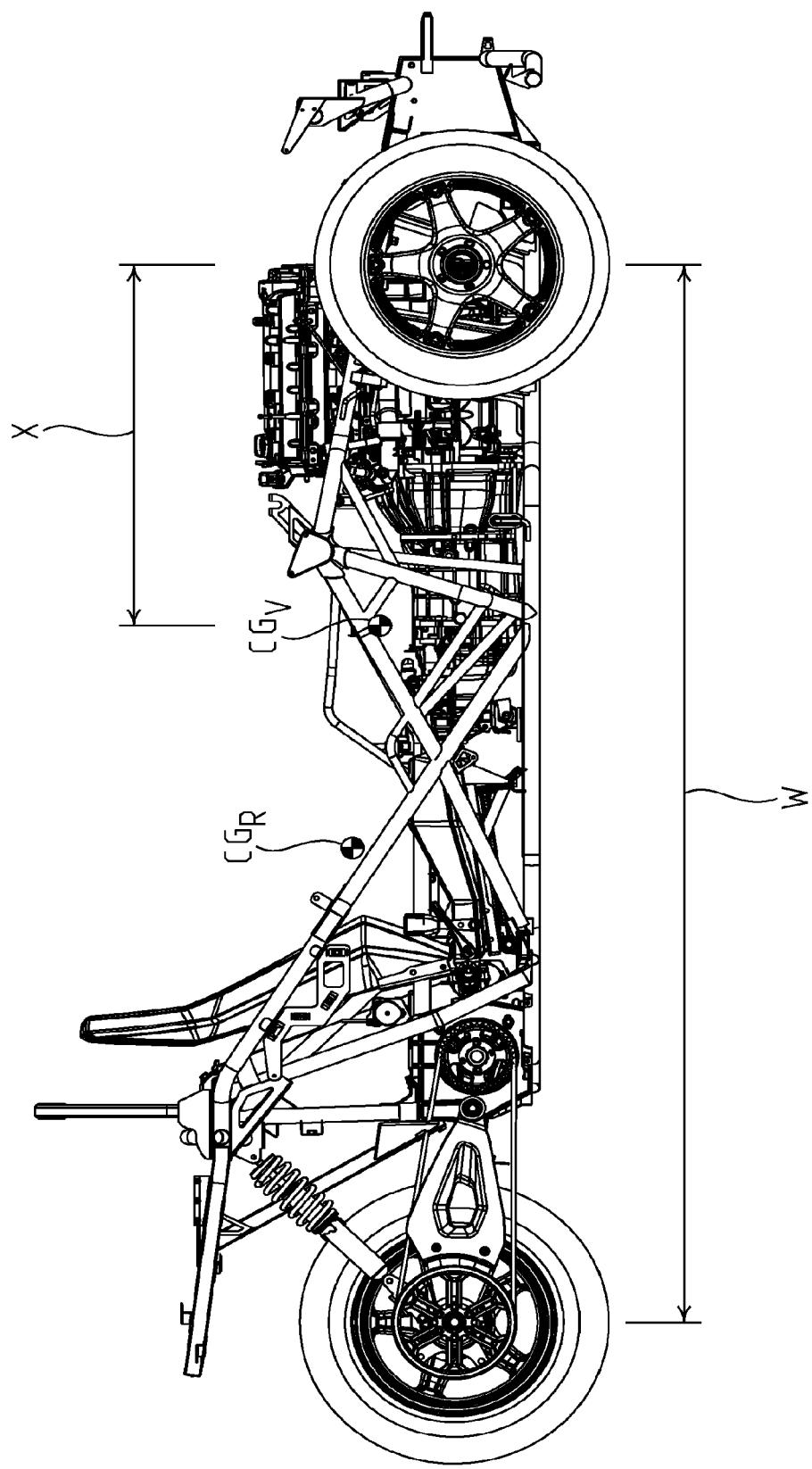
FIG. 40 is a side view of the frame and power train of FIG. 38.
Figure 41:
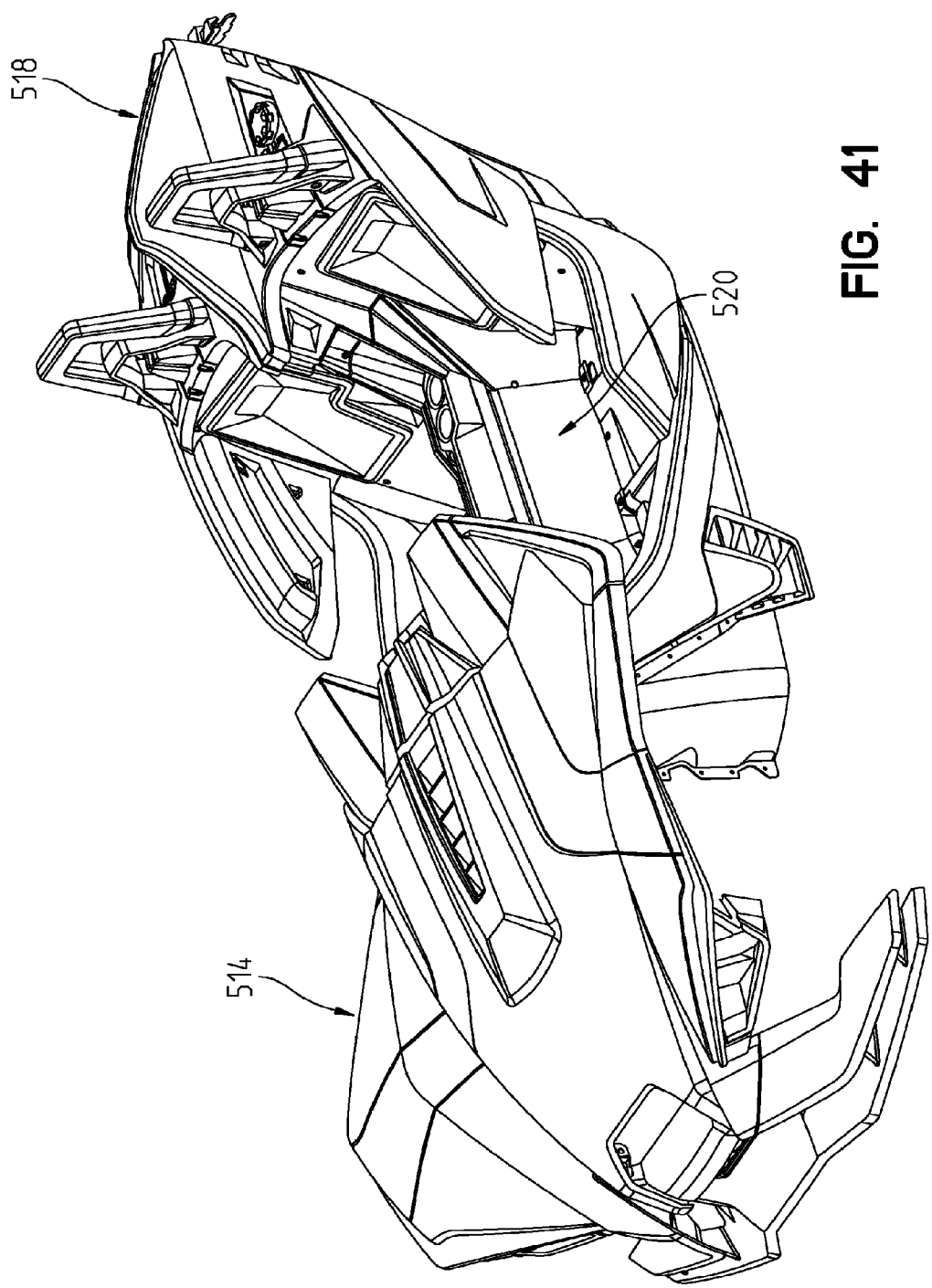
FIG. 41 shows a left front perspective view of the full body portion of the vehicle of FIG. 1.
Figure 42:
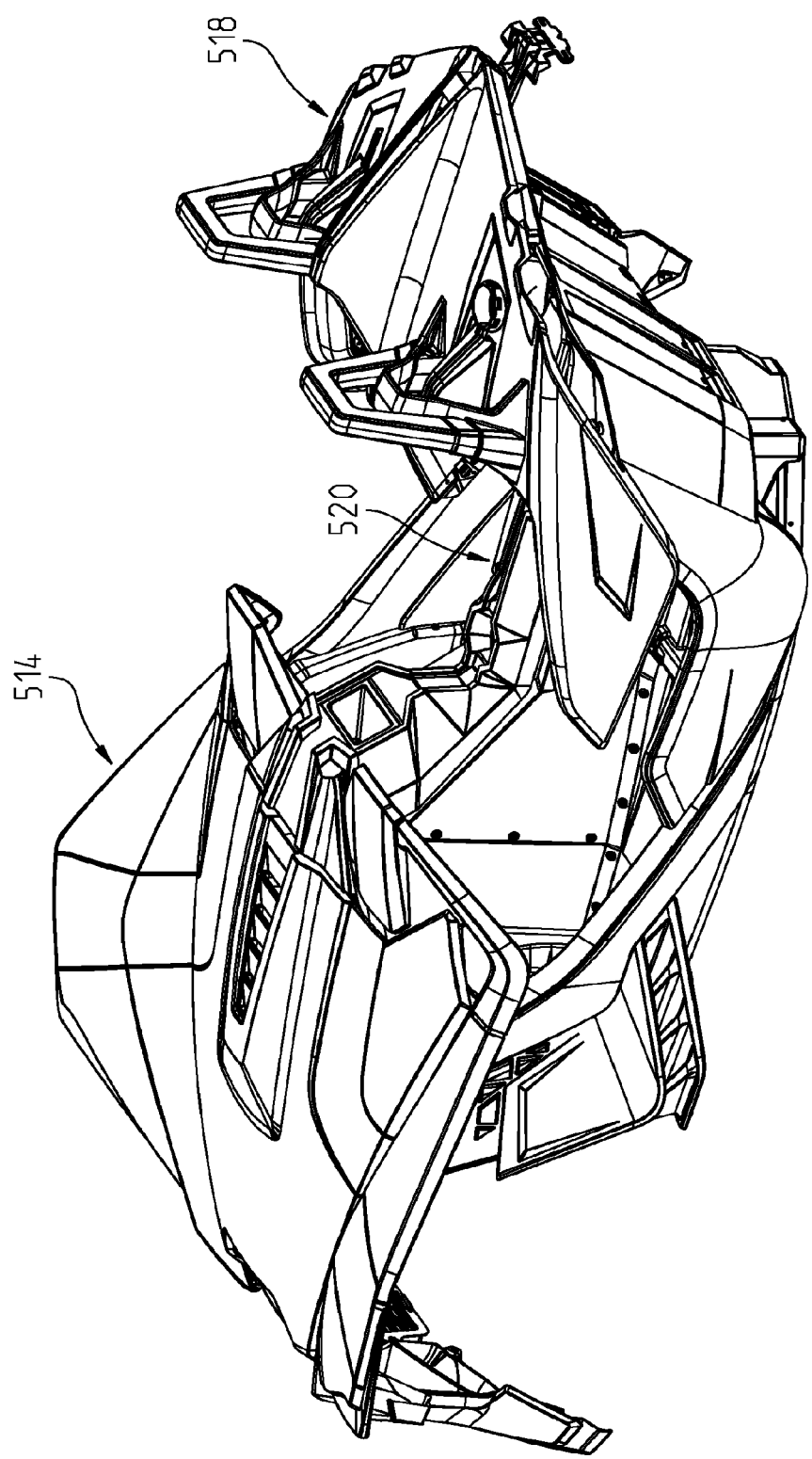
FIG. 42 shows a left rear perspective view similar to that of FIG. 41.
Figure 43:
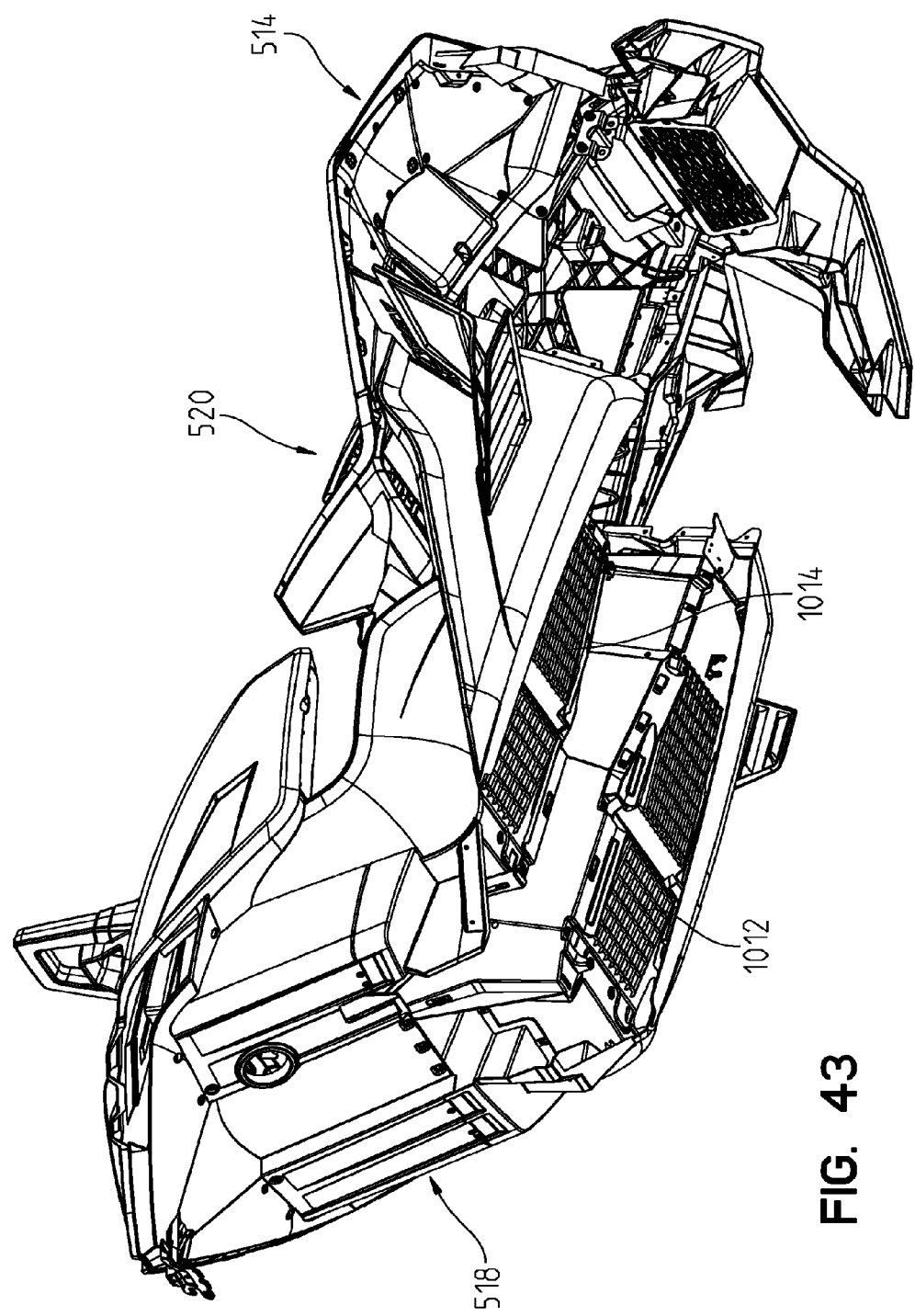
FIG. 43 shows a right rear underside perspective view of the body of FIGS. 41 and 42.

With reference now to FIGS. 38-40, the engine and transmission 556, 558 are shown in an installed position in frame 504. As shown, engine 556 and transmission 558 are positioned rearwardly to the extent possible to centralize the center of gravity of the vehicle. In order to further centralize the center of gravity, fuel tank 994 and battery 996 are positioned behind the driver's position and outside of the operator's compartment as shown in FIG. 39. Fuel lines 998 are positioned on top of channel portions 628 (FIG. 26) and 630.

Thus as shown in FIG. 40, the center of gravity of the vehicle represented as $CG_v$ is shown relative to the center of gravity of the rider's $CG_R$ where $CG_v$ is at a position X where X is a range of approximately 30-40% of the vehicle wheelbase W. In the embodiment shown, W equals 105 inches. As shown, $CG_r$ is rearwardly of $CG_v$ as well as slightly above $CG_v$.

Figure 44:
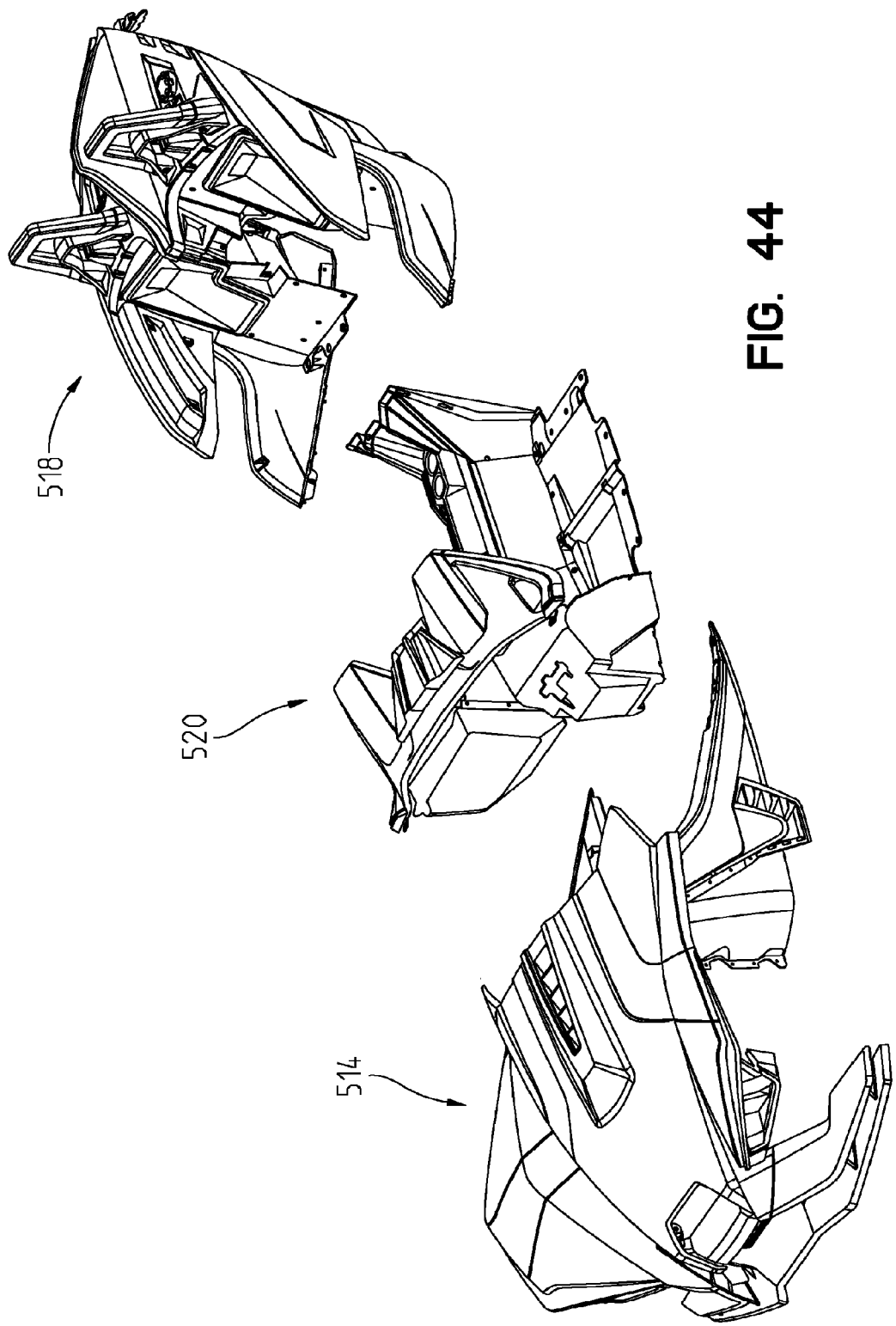
FIG. 44 shows the full body separated into front, rear and center sections.
Figure 45:
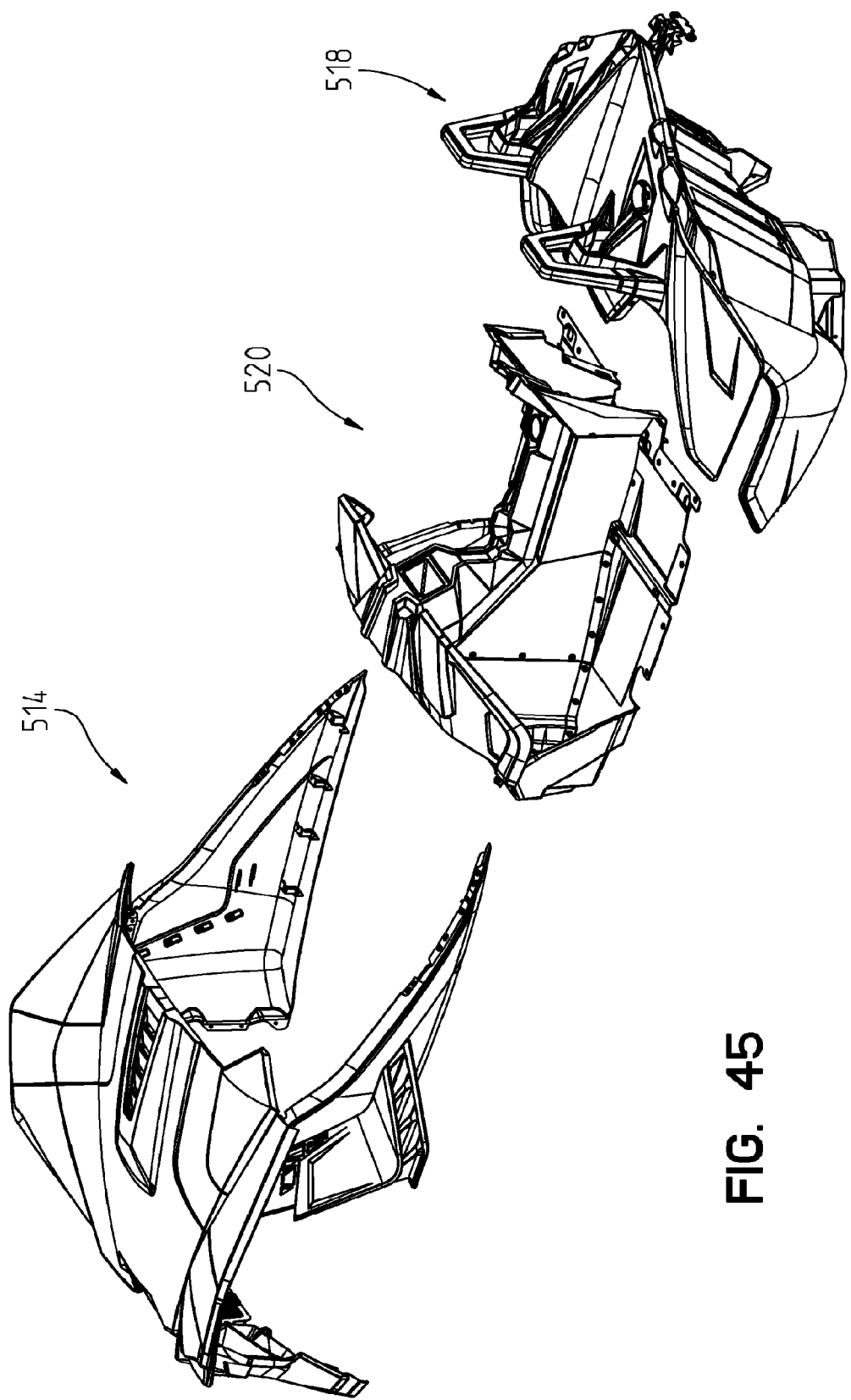
FIG. 45 is a left rear perspective view similar to that of FIG. 44.
Figure 46:
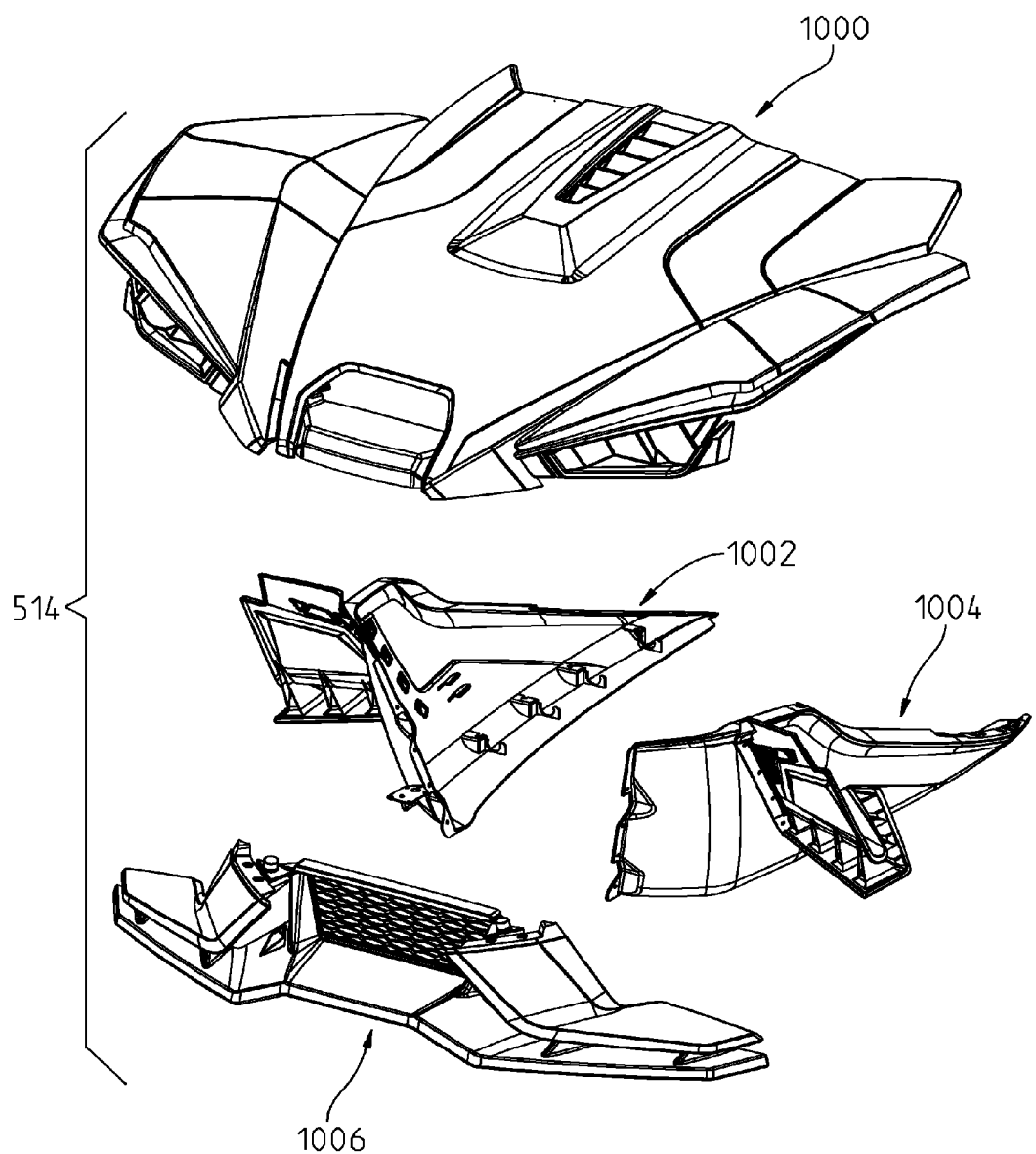
FIG. 46 shows an exploded view of the front body portion.

With respect now to FIGS. 41-51, the body of the vehicle will be described in greater detail. As shown in FIGS. 41-46, the entirety of the body is shown including the front portion 514, rear portion 518 and center portion 520. As shown in FIG. 44, these components separate into the three general sections yet each of these sections includes plural parts. For example, as shown in FIG. 46, front body portion 514 is comprised of a hood 1000, right and left side wings 1002, 1004 and a front lower spoiler 1006.

Figure 47:
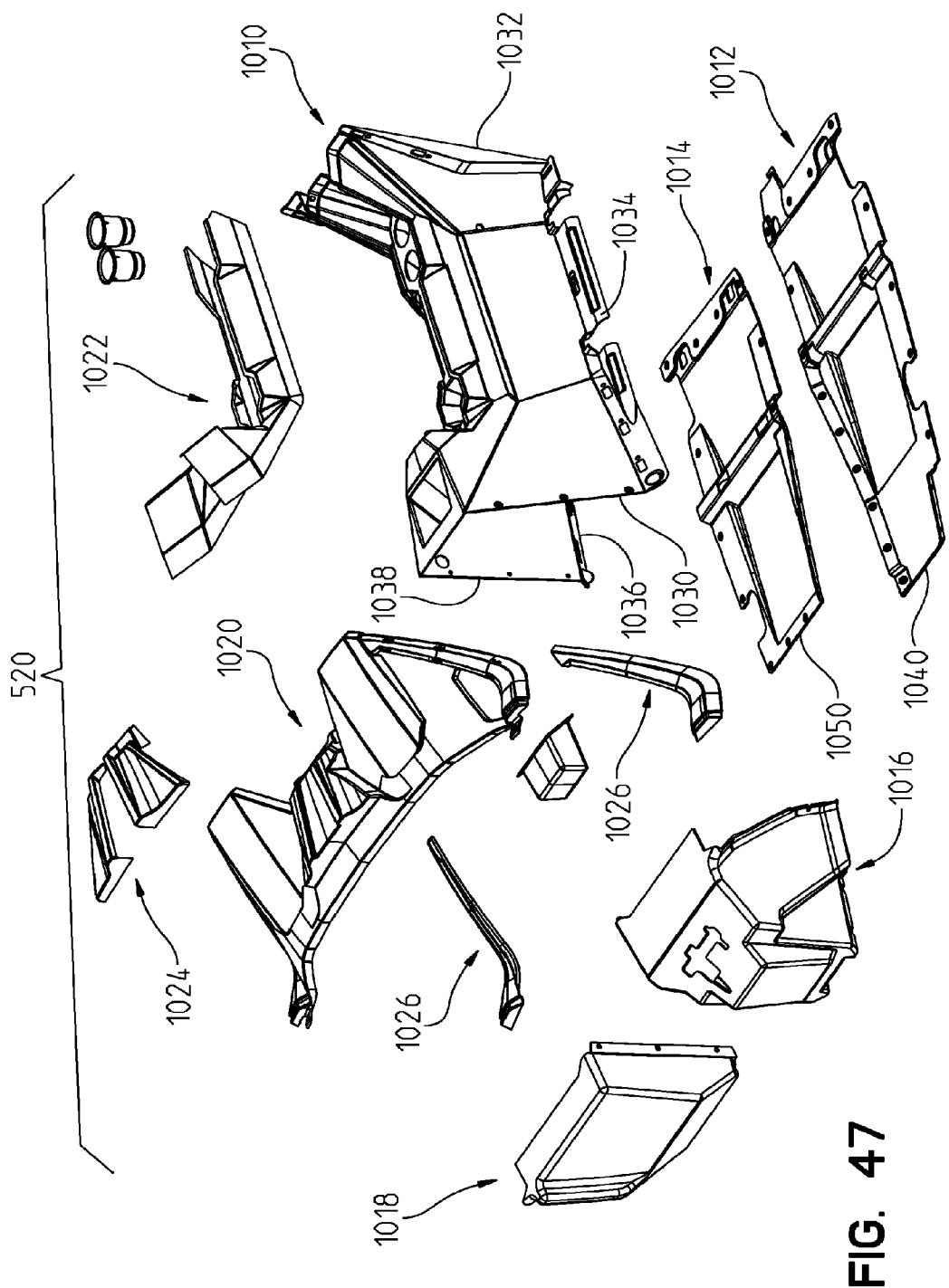
FIG. 47 is a front left perspective view shown in an exploded manner.
Figure 48:
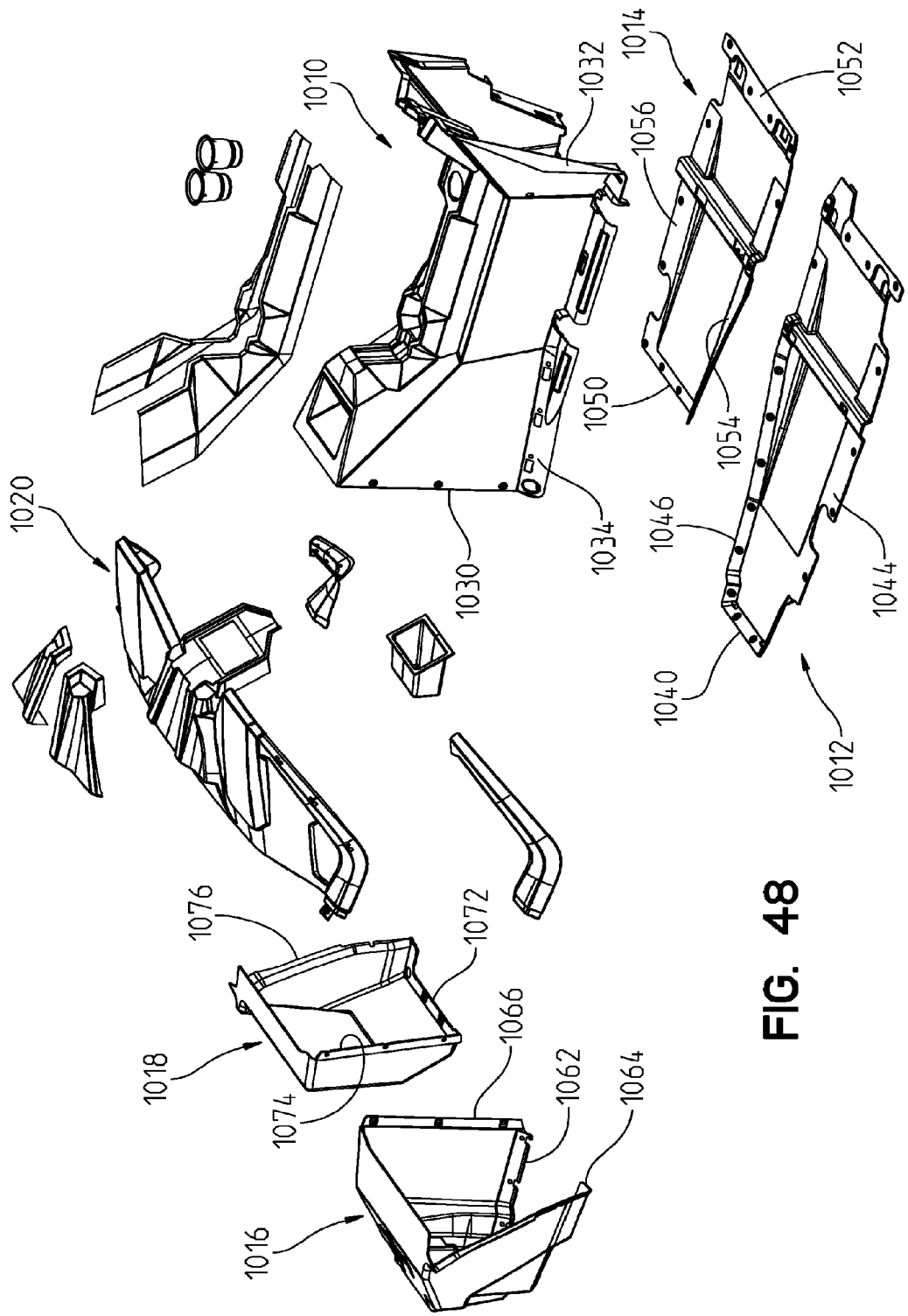
FIG. 48 is a left rear perspective view similar to that of FIG. 47.

With reference now to FIGS. 47 and 48, the mid-body portion 520 is shown which generally includes a center console 1010, floor board portions 1012, 1014, driver's foot compartment 1016, passenger's foot compartment 1018 and dashboard 1020. Accent pieces 1022, 1024 and 1026 are also provided. As shown, center console section 1010 includes a front left edge 1030, a trailing edge 1032, lower edges 1034 and 1036 and a front right edge 1038. Floor board portion 1012 includes a front edge 1040, rear edge 1042, left edge 1044 and right edge 1046. Right floor board 1014 includes front edge 1050, rear edge 1052, left edge 1054 and right edge 1056. It should be appreciated then that console section 1010 is received over frame tubes 620 (FIG. 24) including tube portions 622. Moreover, it should be appreciated that floor board portions 1012 and 1014 align with the center console section 1010 such that left edge 1034 corresponds with right edge 1046 of floorboard 1012, and that right edge 1036 corresponds with left edge 1054 of floorboard 1014.

Console 1010 also corresponds with foot compartments 1016, 1018. Driver foot compartment 1016 includes lower right edge 1062, lower left edge 1064 and rear edge 1066. Passenger foot compartment 1018 includes lower edge 1072, left rear edge 1074 and right rear edge 1076. Thus it should be appreciated that the front edges 1030, 1038 correspond with rear edges 1066, 1074, respectively while front edge 1040 of floor board 1012 extends into driver foot compartment 1016 with edges 1062, 1064 overlapping with edges 1046, 1044, respectively. In a similar manner, edge 1072 of foot compartment 1018 aligns with front edge 1050 of floorboard 1014 such that all the overlapping seams between the engine compartment and the driver compartment are sealed.

Figure 49:
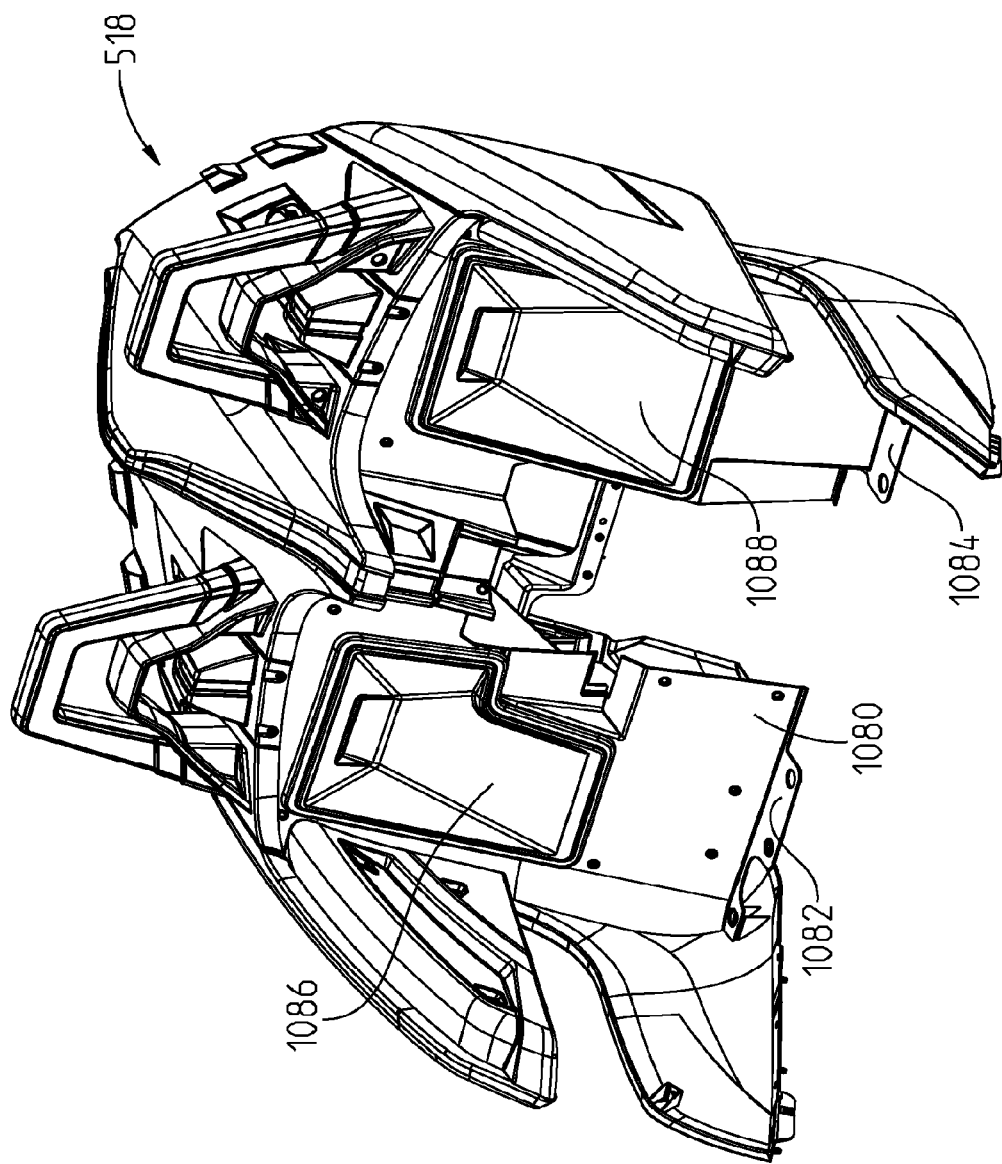
FIG. 49 is a front left perspective view of the rear body portion.
Figure 50:
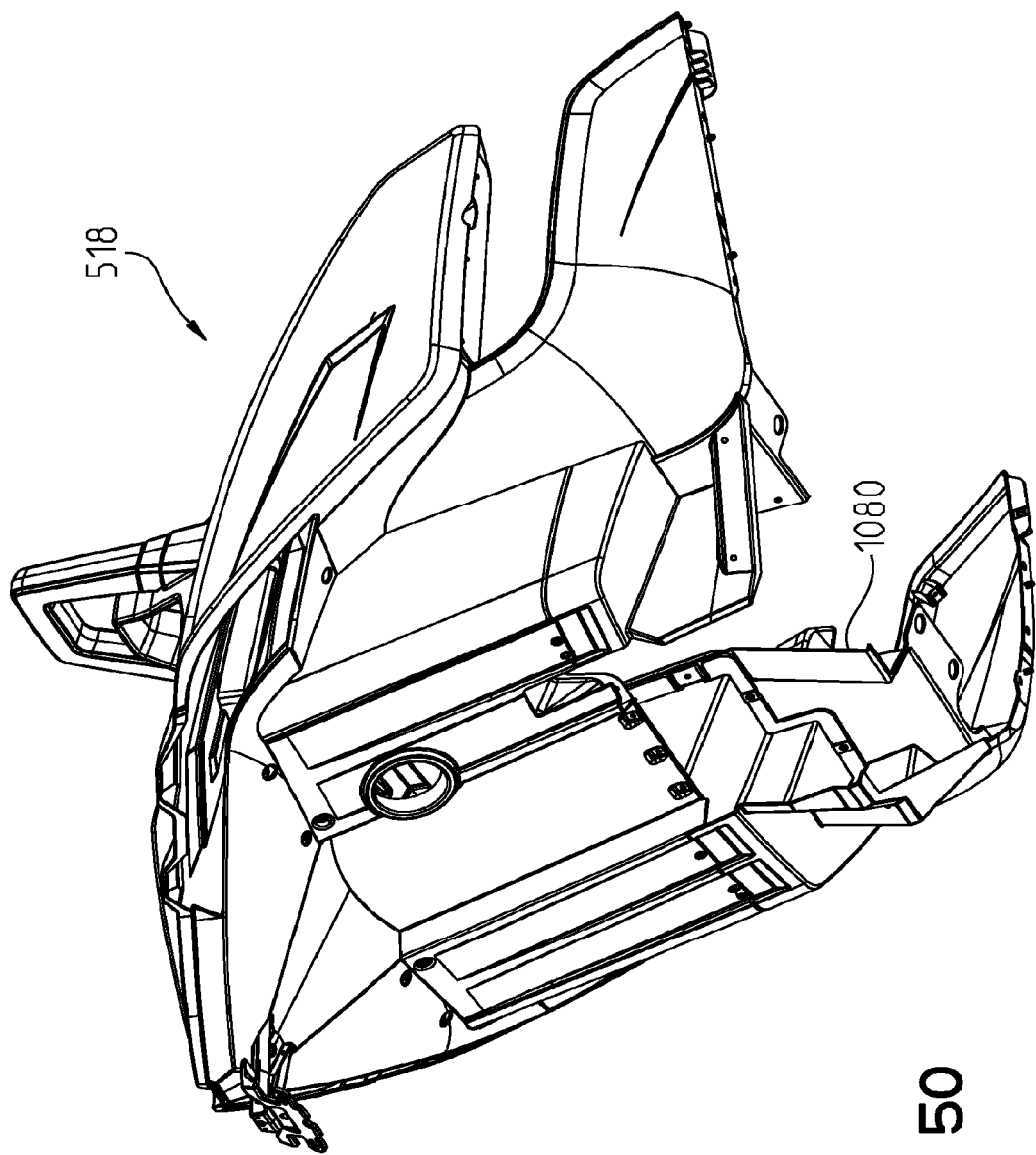
FIG. 50 is a right rear perspective view of the rear body portion.
Figure 51:
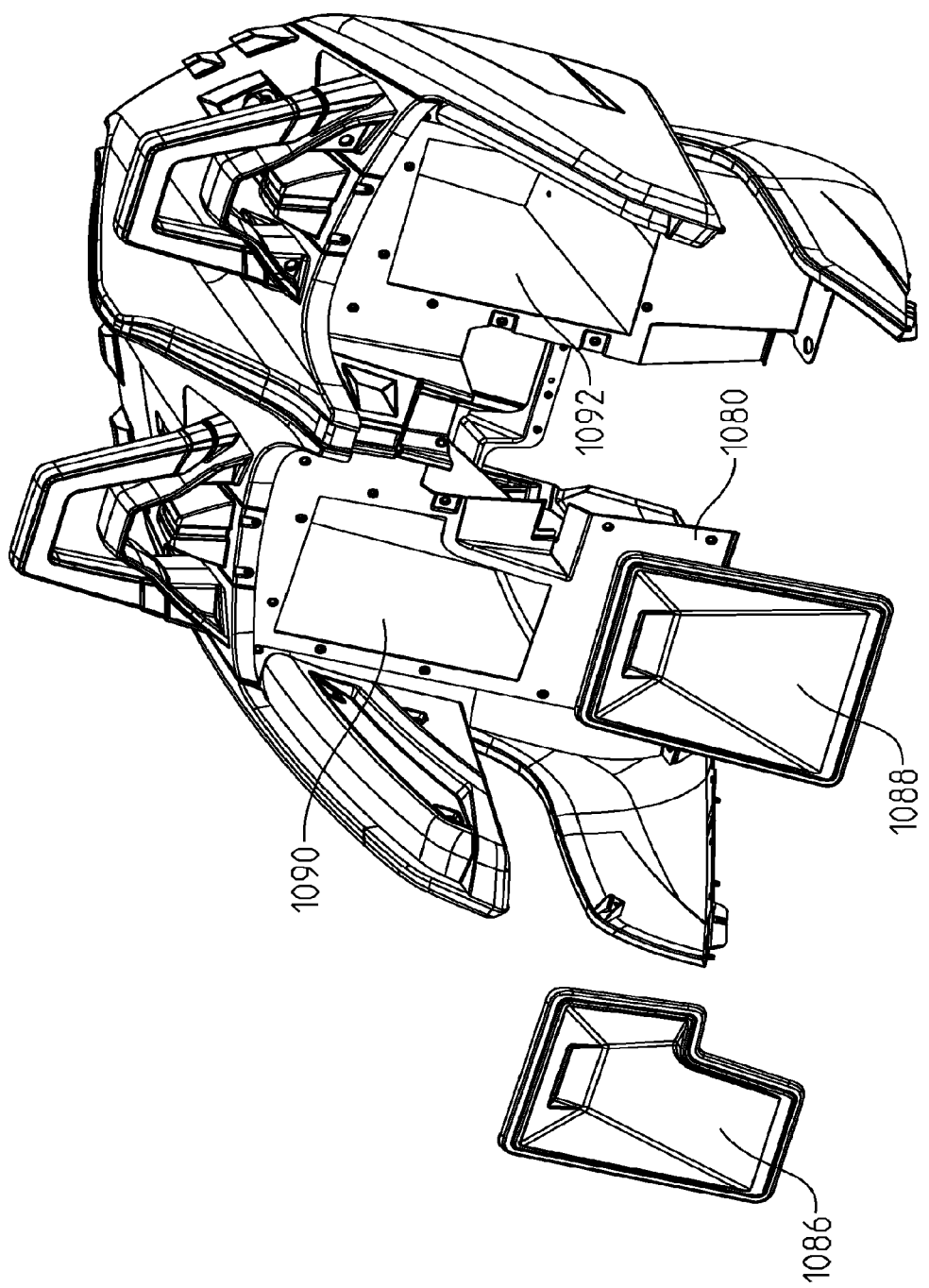
FIG. 51 is a view similar to that of FIG. 49 showing storage compartments.

With respect now to FIGS. 48-51, it should be appreciated that rear edge 1032 of center console 1010 aligns with front edge 1080 (FIG. 49) of rear body portion 518; that rear edge 1042 of floorboard 1012 aligns with front edge 1084 of rear body portion 518; and that rear edge 1052 of floorboard 1014 aligns with front edge 1082 of rear body portion 518. As shown in FIGS. 49 and 51 rear body portion 518 also includes access doors 1086 and 1088 behind the driver and passenger seats to access storage compartments 1090 and 1092 as shown in FIG. 51.

Figure 52:
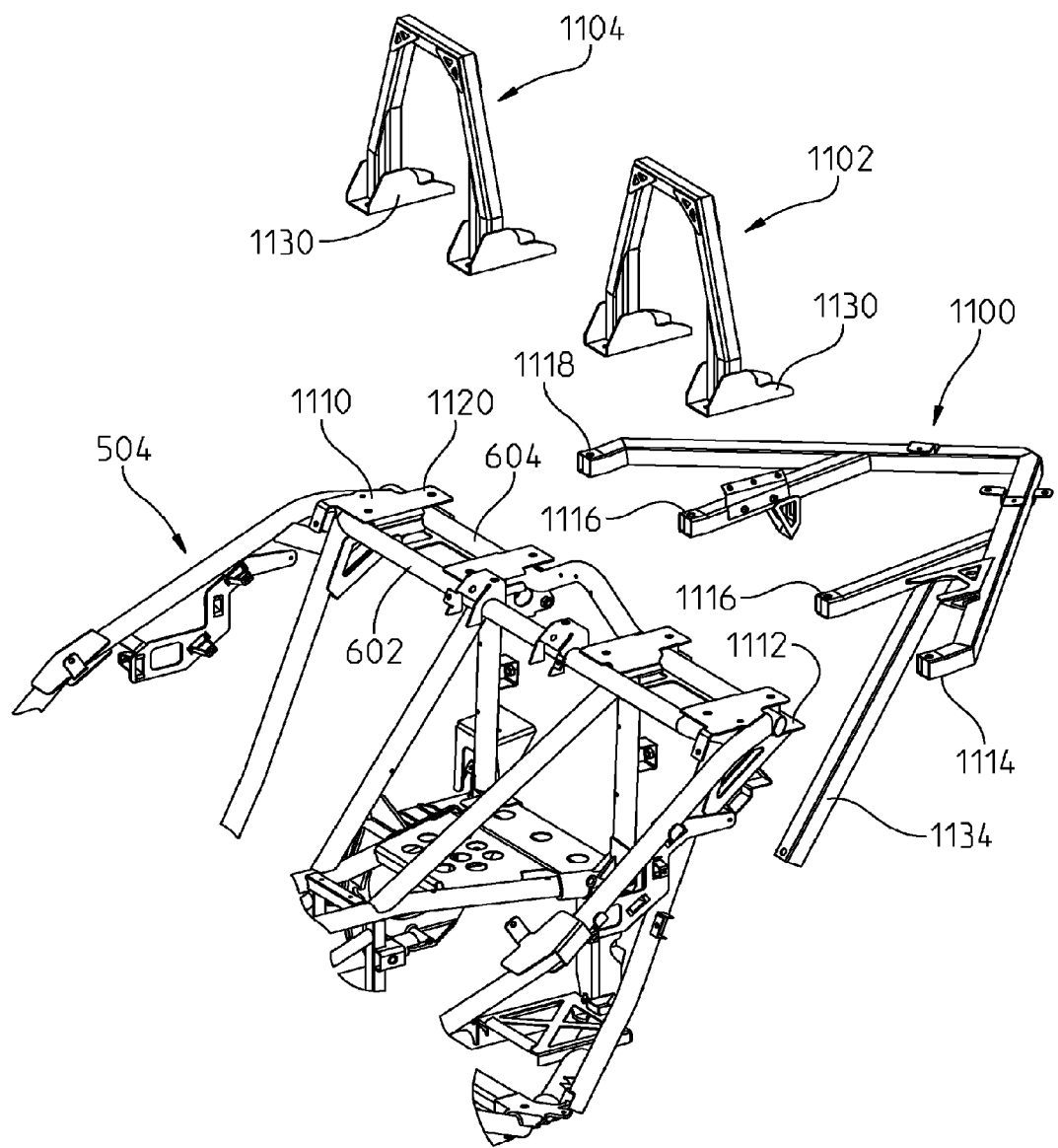
FIG. 52 is a front perspective view of the rear frame in partial fragmentation.
Figure 53:
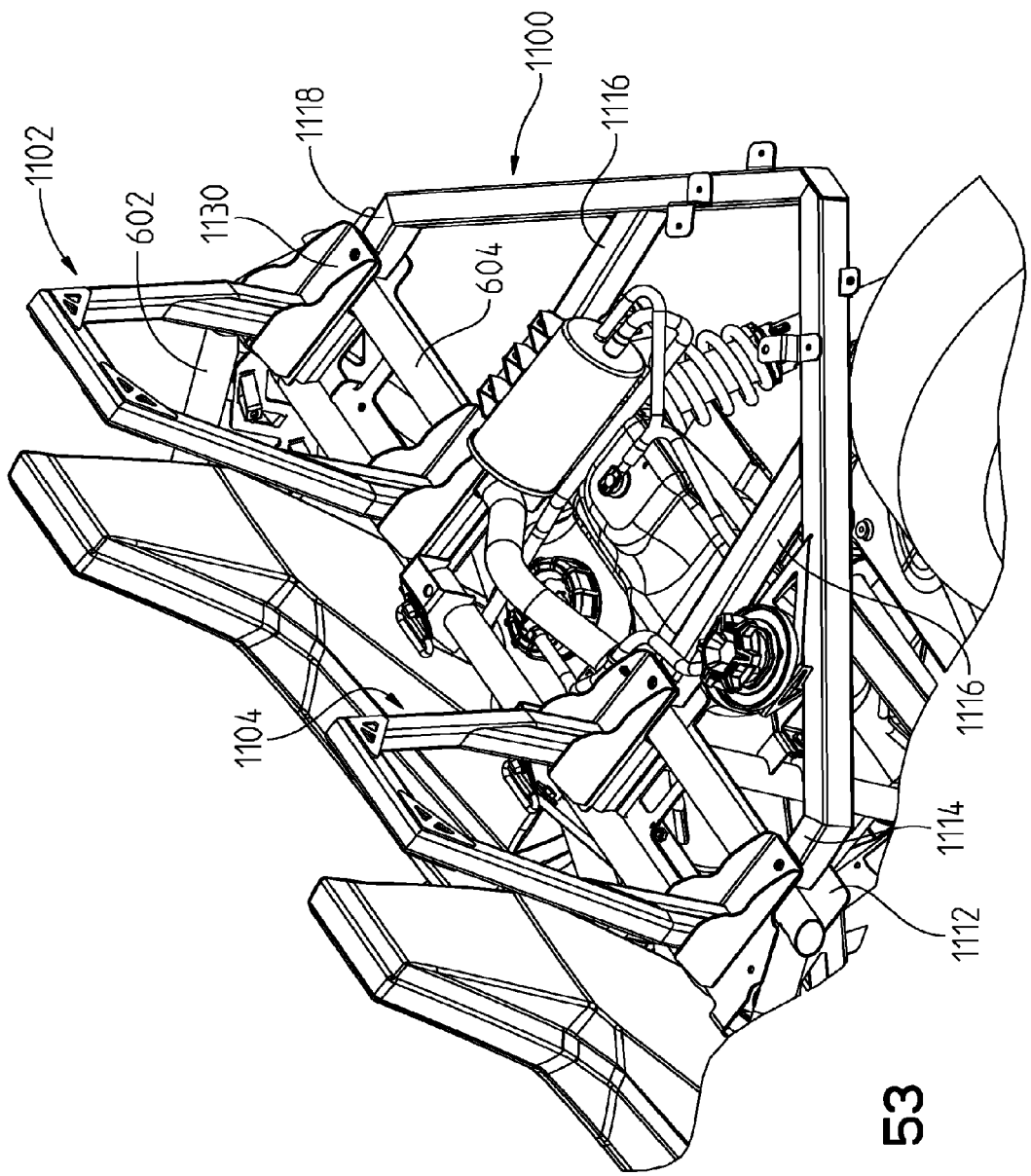
FIG. 53 is a rear perspective view of the rear frame in partial fragmentation.

FIGS. 52 and 53 show rear frame portion 1100 and rear head protectors 1102 and 1104. Rear frame tubes 602, 604 have upper and lower plates 1110, 1112 and rear frame portion 1100 includes frame tubes 1114 and 1116, having at their leading ends apertures 1118 which correspond with apertures 1120. As shown in FIG. 53, each of the leading ends of frame tubes 1114, 1116 are positioned between the plates 1110, 1112, and protection members 1102, 1104 are positioned above plates 1110 with feet 1130 corresponding with plates 1110, and fasteners are received through feet 1130, plates 1110, 1112 and through frame tubes 1114, 1116. Frame tube 1134 attaches to the rear of frame 504 to rigidify frame member 1110. With the frame 504 and body components 514, 518 and 520 described, the attachment of the body components 514, 518 and 520 to the frame 504 will now be described.

Figure 54:
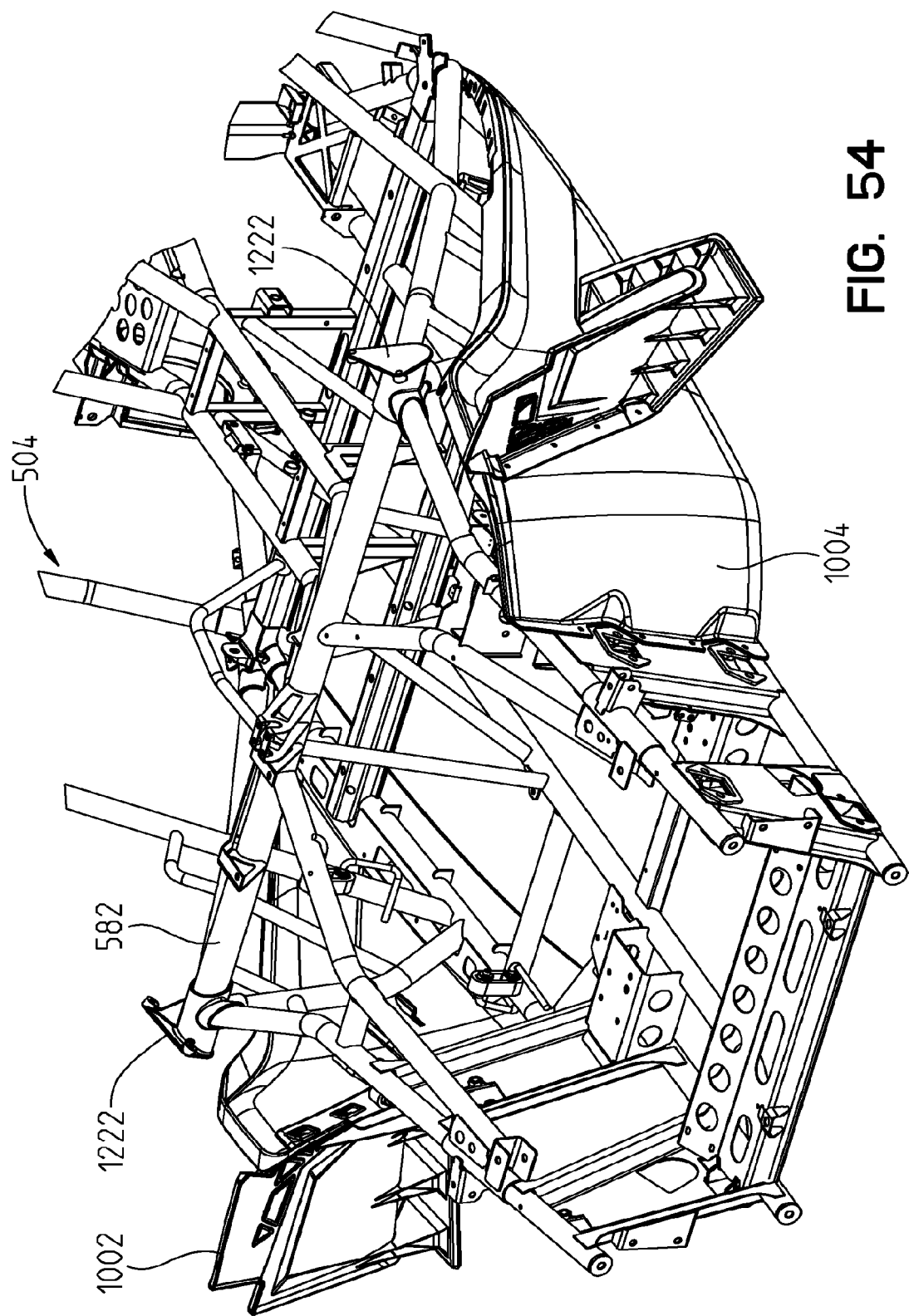
FIG. 54 is a front perspective view of the front frame in partial fragmentation, with portions of the body assembled.
Figure 55:
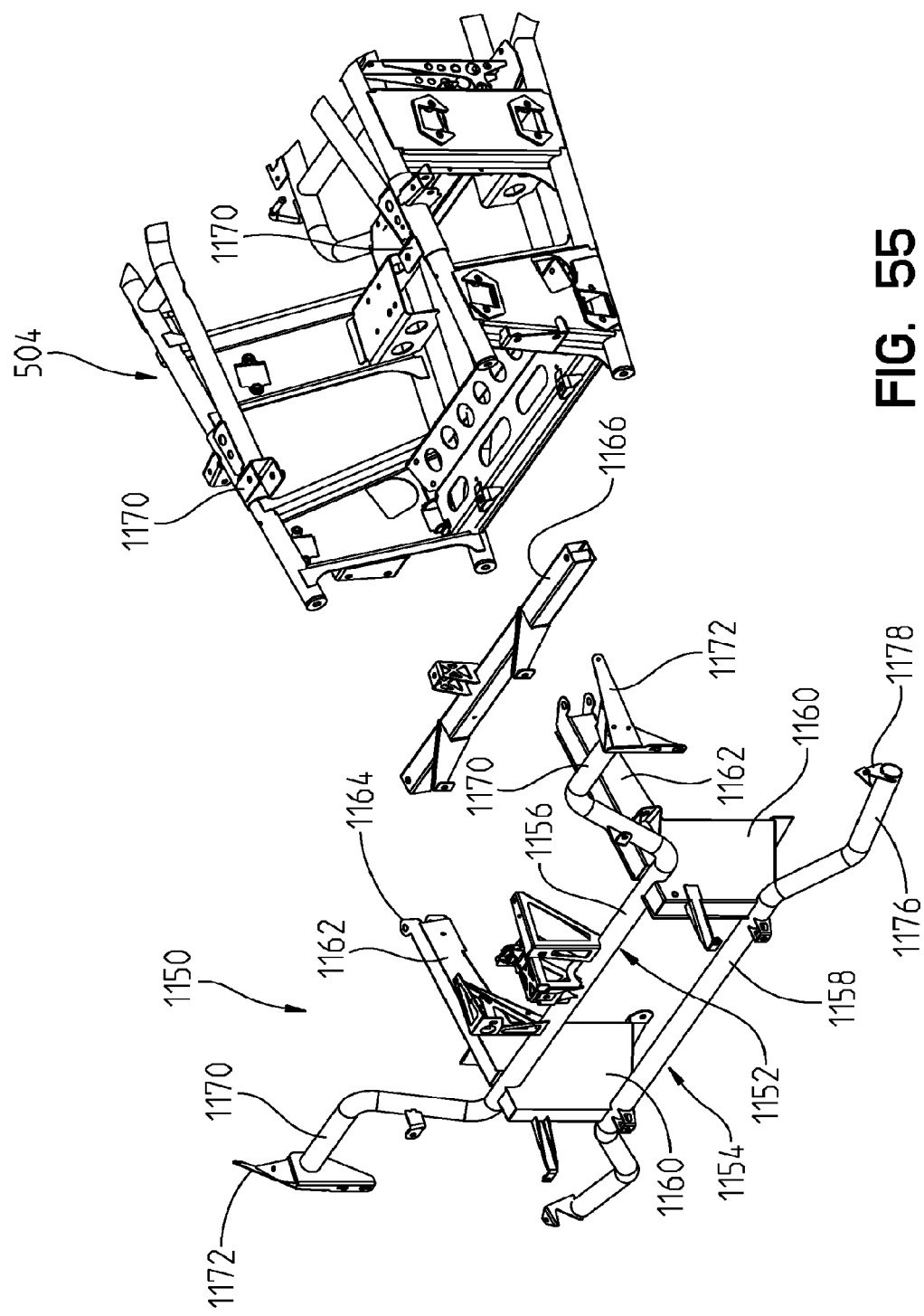
FIG. 55 is a front perspective view of the front frame in partial fragmentation.
Figure 56:
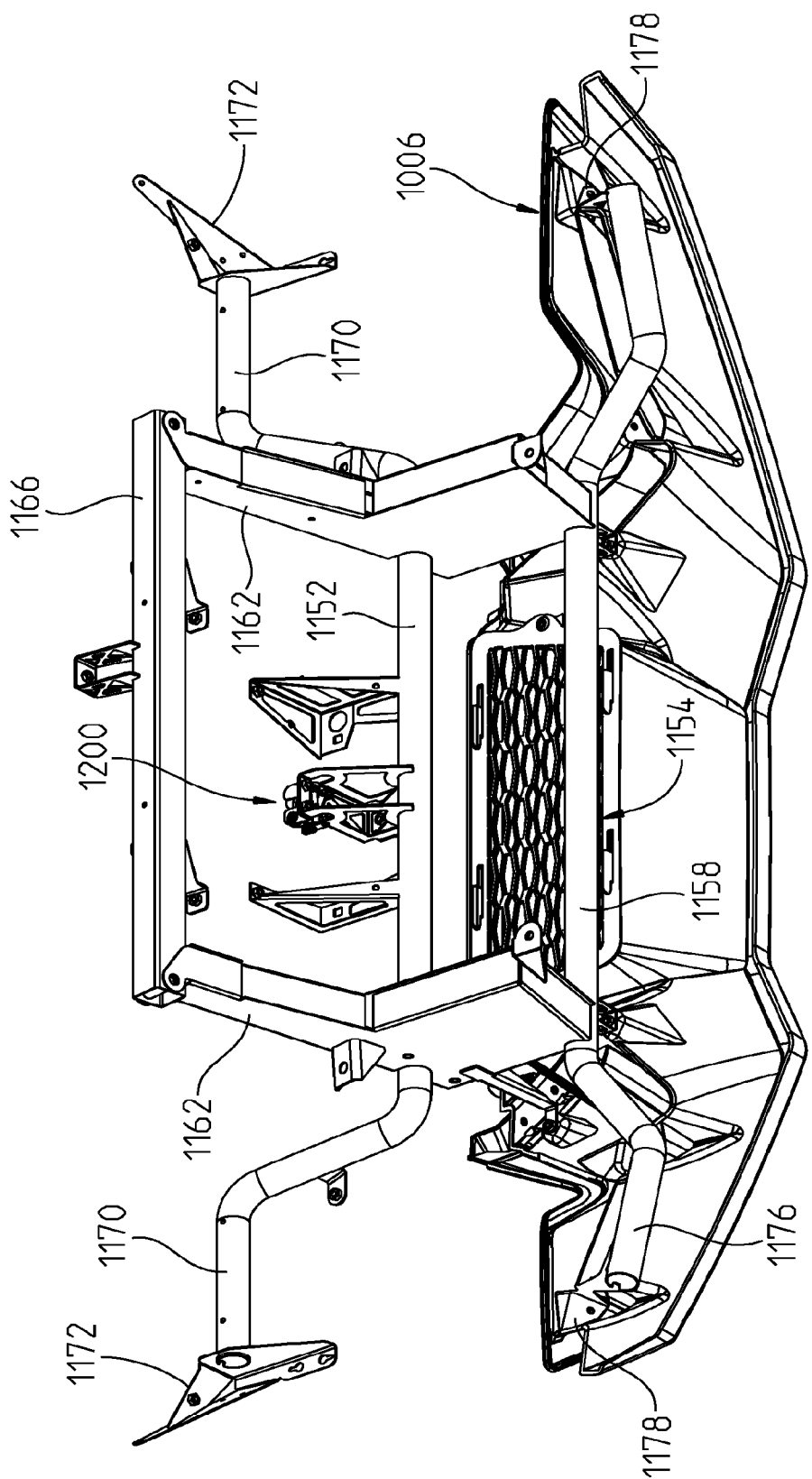
FIG. 56 is a rear perspective view of a portion of the body being assembled.
Figure 57:
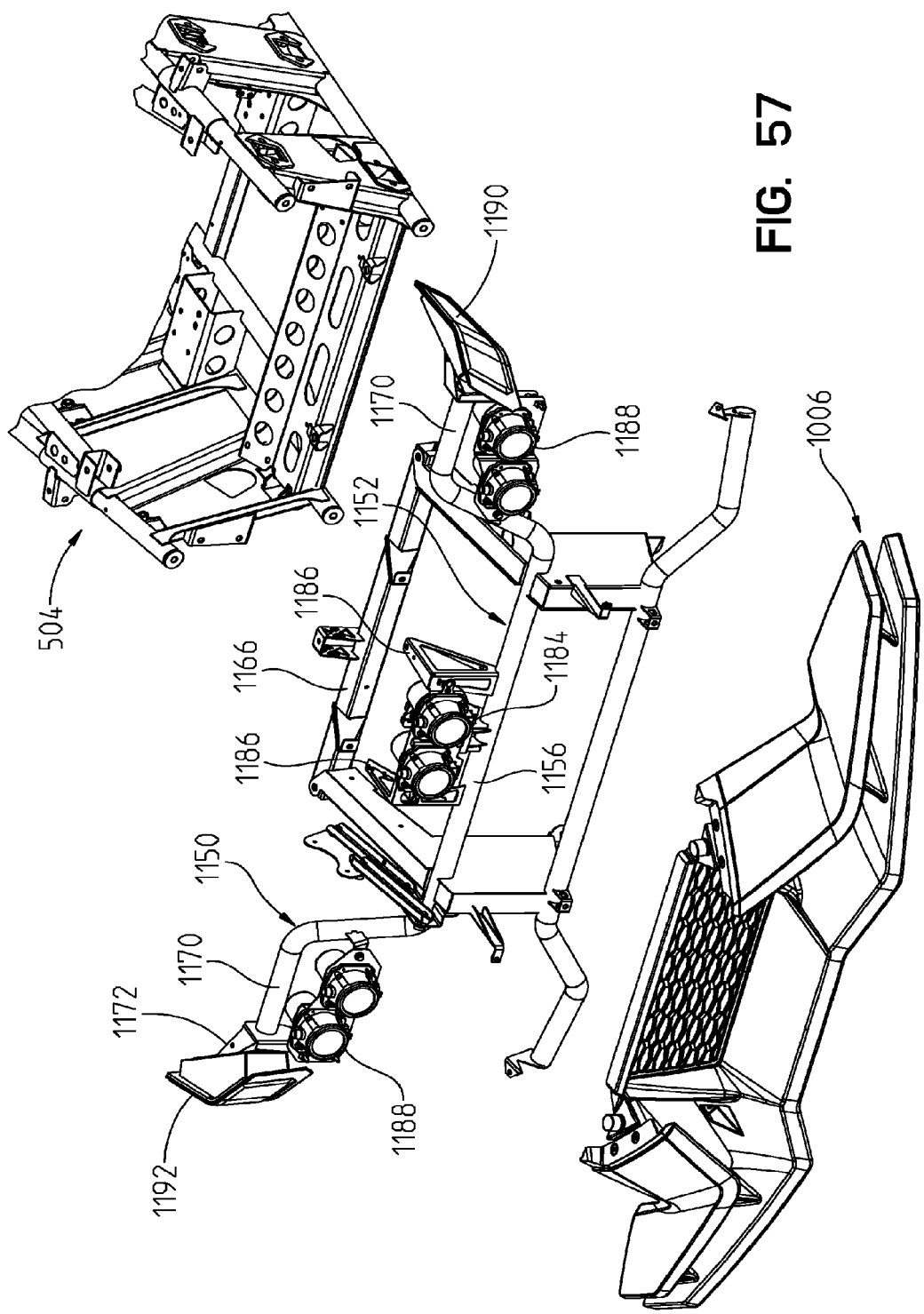
FIG. 57 is a rear perspective view of the portion of the body being assembled, and various front light pods.

With reference now to FIG. 54, side rings 1002 and 1004 are shown attached to the side of frame 504, adjacent a front thereof. With reference now to FIG. 55-57, a front frame section 1150 is shown having an upper tube 1152 and a lower tube 1154. Upper tube 1152 includes a center frame portion 1156 which is parallel with a lower section 1158. Sections 1156 and 1158 are held in a parallel manner by frame portions 1160 having rear extension members 1162. Extension members 1162 include rear open brackets 1164 which receive therein frame tube portion 1166. Extension portions 1162 and frame tube 1166 are together received in receiving brackets 1170 extending from the front of frame 504. Frame tube 1152 includes outer extension portions 1170 having brackets 1172. Lower frame tube 1154 includes extension portions 1176 having brackets 1178. As shown in FIG. 56, lower spoiler is shown from an under side view showing lower frame tube 1154 conforming to an inner surface of spoiler 1006 whereby the spoiler 1006 may be attached to lower frame tube 1154 at a plurality of positions by way of fasteners as is known in the art.

As shown in FIG. 57, a center light pod 1184 is shown attached to brackets 1186. Left and right light pods 1188 are attached to tube extensions 1170. Turn signals 1190 and 1192 are attached to brackets 1172. Thus for applications in the U.S., light pod 1184 would be the headlights with light pods 1188 being similar to day-time running lights. For international applications, light pod 1184 would be removed and replaced with a body panel with one or more of the lights in light pods 1188 being the head lights. Lights in light pods 1188 could alternatively be high and low beam lights.

Figure 58:
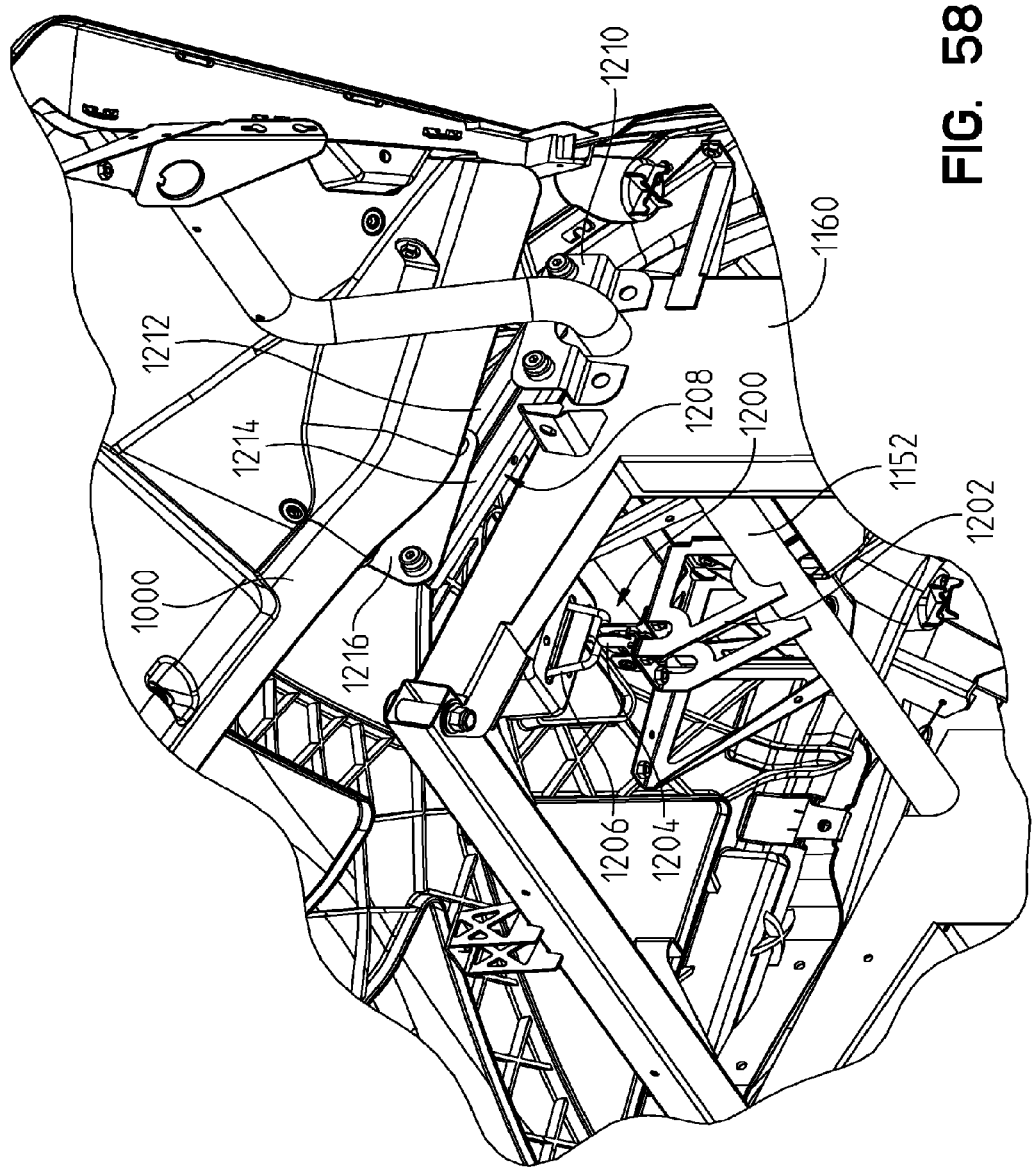
FIG. 58 is a rear perspective view of the front frame and hood in partial fragmentation.

With reference now to FIGS. 56 and 58, a hood latch 1200 is shown attached to frame tube 1152. Latch 1200 is comprised of a bracket 1202 and a latch member 1204. A catch 1206 is attached to a bottom of hood 1000. As shown in FIG. 58, a four-bar linkage mechanism 1208 is comprised of a bracket 1210, link arms 1212, 1214, and an end bracket 1216. Ends of link arms 1212, 1214 are attached to bracket 1210 and to end bracket 1216. Bracket 1210 is attached to frame portion 1160 while bracket 1216 is attached to a bottom of hood 1000. Another latch, similar to 1200 and catch 1206 is positioned rearwardly of latch 1200 (not shown) on the rearward part of hood 1000 such that two catches and two latches are in latched condition when the hood is completely down. When the latches are released, releasing the catches 1206, the hood 1000 rotates upwardly and away from the front of the vehicle (in a clock-wise sense as viewed in FIG. 58) and away from the lights and lower spoiler 1006.

Figure 59:
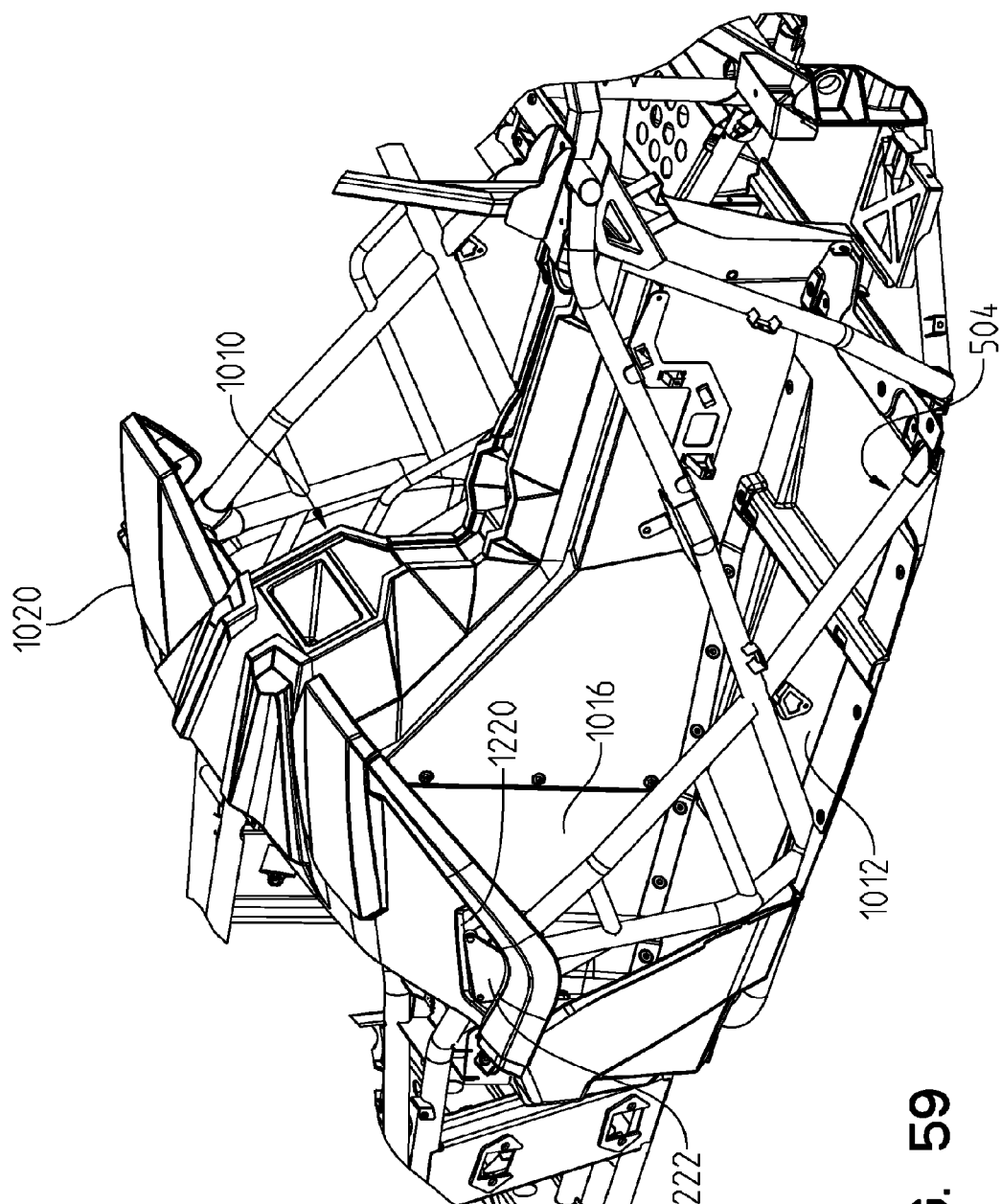
FIG. 59 is a rear perspective view of the seat compartments with portions of the body assembled.

With reference now to FIG. 59, center console 1010 is shown in position over the center frame tubes 620, and left floor board 1012 and driver feet compartment 1016 is shown in position. Hood 1020 conforms over cross tube 582 and forms a transition with center console 1010. As shown in FIG. 58, dashboard 1020 shows opening 1220 which exposes ends 1222 of cross tube 582. In this manner, rear view mirrors (not shown) may be attached to frame 504 by way of fasteners through the rear view mirrors and engaging with brackets 1222. Alternatively, an overhead structure in the way of a roof or other canopy, such as a roll cage, can be attached to frame 504 by connection to brackets 1222 in the front, and by removing members 1102, 1104 (FIG. 52) and attaching the accessory roof to the top of plates 1110.

Figure 60:
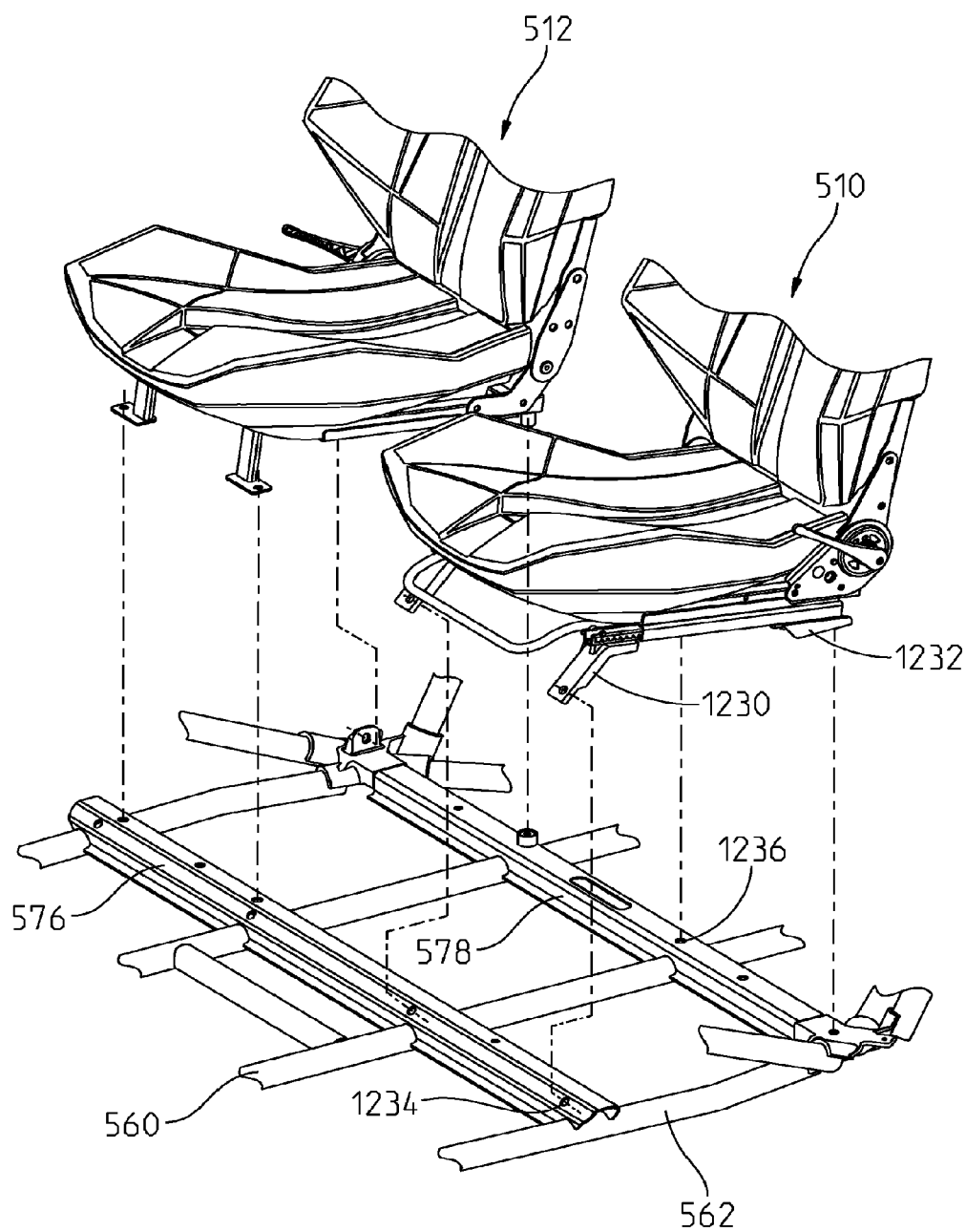
FIGS. 60-62 show various perspective views of the seat installation.
Figure 61:
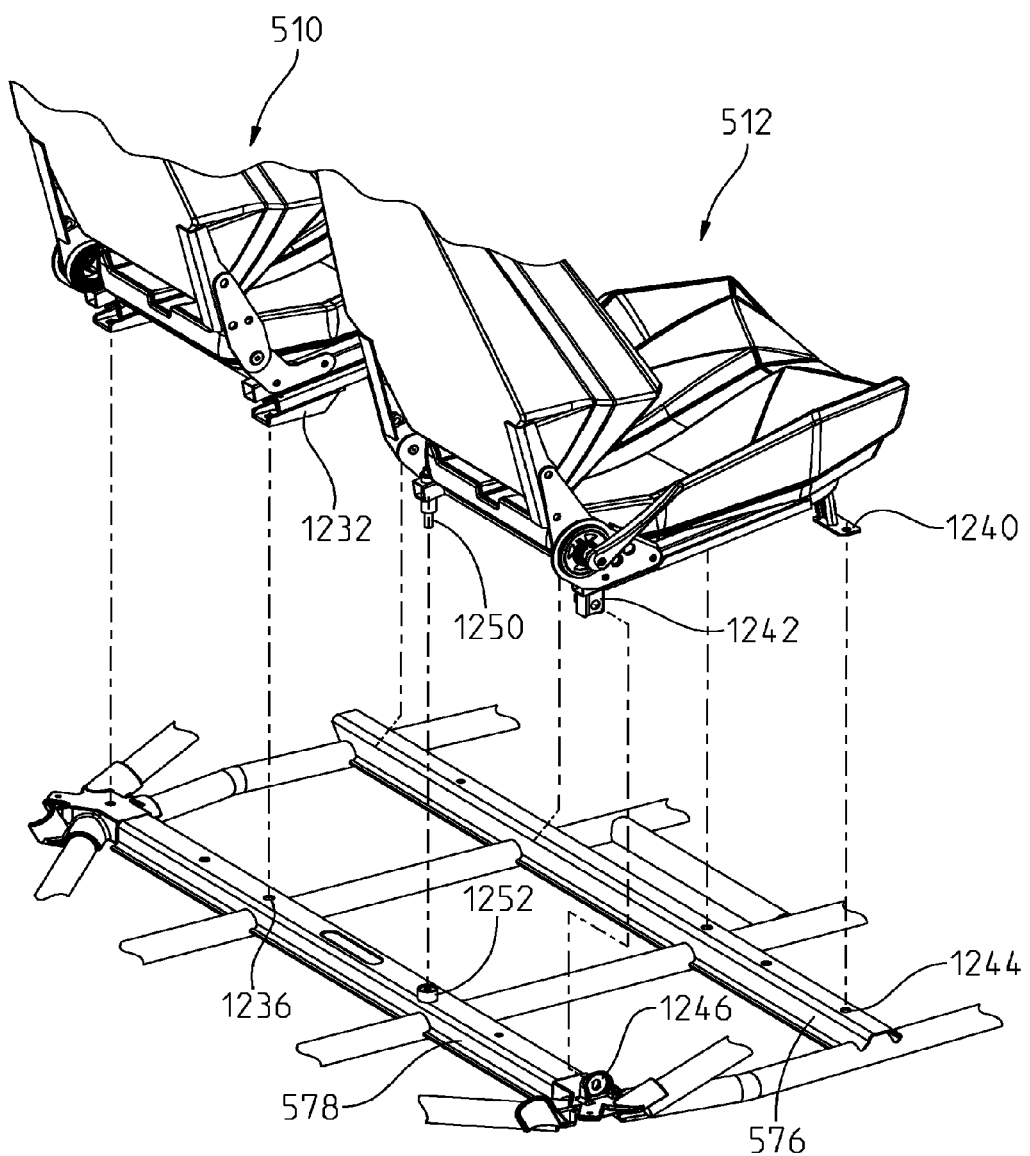
Figure 62:
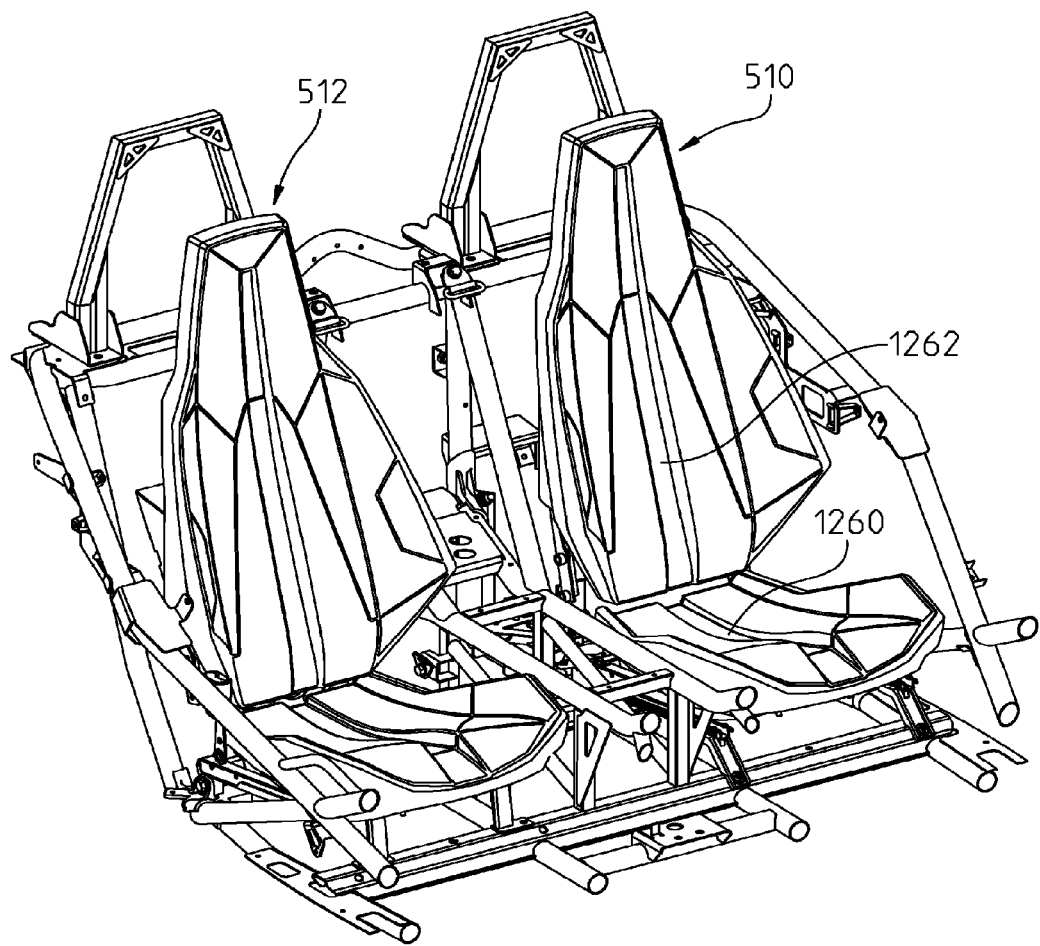

With reference now to FIGS. 60-62, driver seat 510 and passenger 512 are shown exploded away from channels 576 and 578. Driver seat 510 is shown including lower rails having front feet 1230 and rear feet 1232 which may be attached to apertures 1234, 1236, respectively, in the channels 576, 578. In a similar manner, passenger seat 512 includes a front foot 1240 and a rear foot 1242 attachable to front apertures 1244 and rear bracket 1246, respectively. Locating pin 1250 is positionable in aperture 1252 to locate the seat relative to channels 576, 578. FIG. 62 shows seats 510, 512 in the fully installed position. As shown best in FIG. 62, a groove 1260 is defined in the seat bottoms of seats 510 and 512 and a groove 1262 is defined in the seat backs of seats 510 and 512. This allows cooling air to reach the drivers back for cooling.

Figure 63:
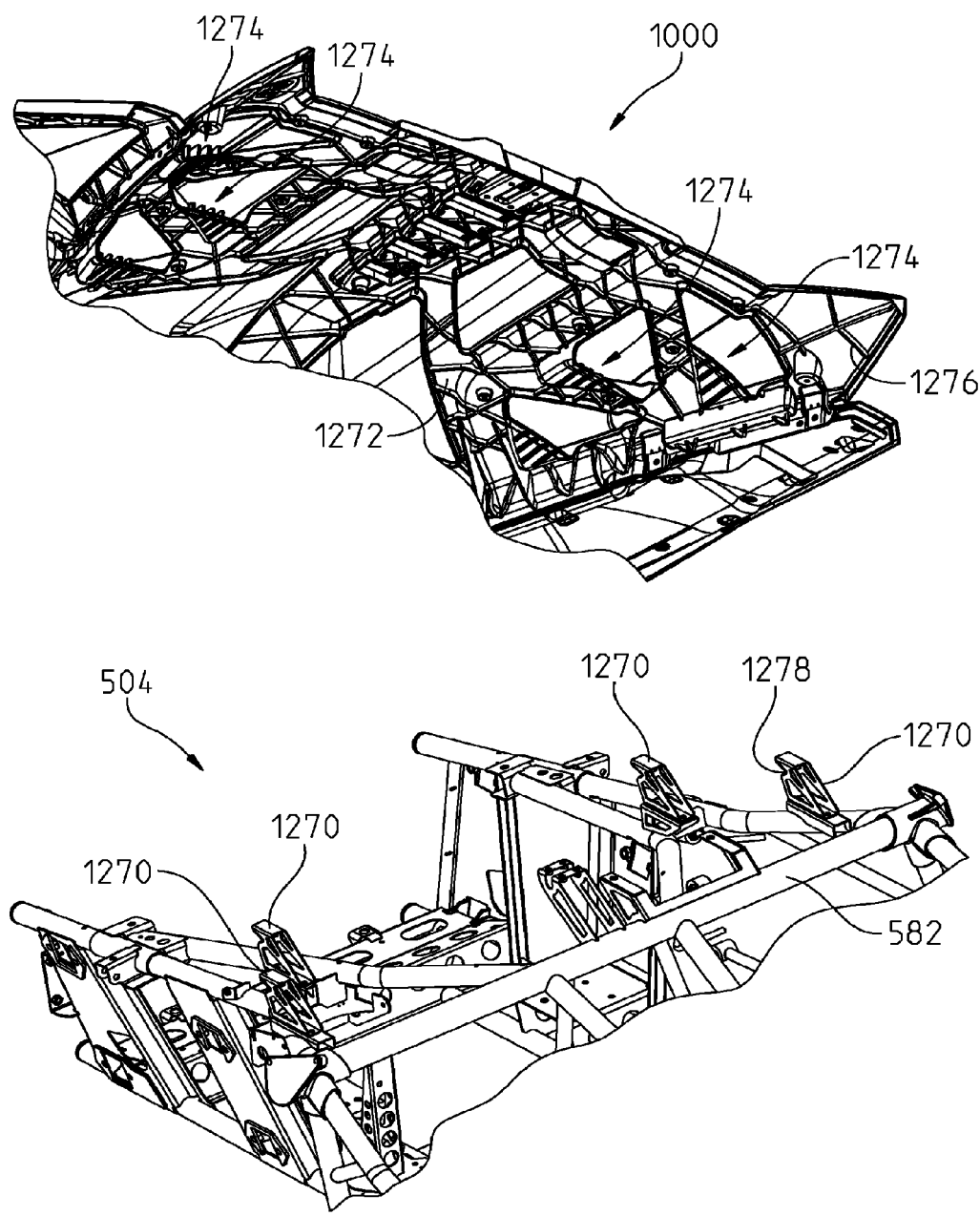
FIG. 63 shows an underside perspective view of the hood positioned over a front of the frame.

With reference to FIG. 63, the frame 504 includes a plurality of hooks 1270 positioned on the frame, and the underside of the hood includes an inner layer 1272 having a plurality of pockets 1274 extending downwardly therefrom. Each of the pockets includes a rearwardly extending edge 1276, which aligns with a forwardly face edge 1278 on hooks 1274. The hooks 1270 are spaced slightly rearwardly of the pockets 1274 for clearance, but prevent unintended movement of the hood 1000 relative to the frame 504.

Many other features of the vehicles 2 or 502 are also possible. First, while it was discussed that the motive source was an engine, that is an internal combustion engine, the motive source could be powered in any manner. For example, the power source could be a hybrid engine, or battery powered, or any other power source contemplated. Also the steering was described as rack and pinion; the steering could be electronic power steering. It is also anticipated that the vehicle will have several electronic features, namely:

ABS: Antilock Brake System. This system will modulate brake pressure during brake events to prevent excessive wheel slip.

TCS: Traction Control System. This system will prevent excessive rear wheel slip during acceleration events by modulation of engine throttle and/or brake.

MSR: System prevents excessive rear wheel slip during events that lock the rear wheel on a slippery surface when a lower gear is engaged or load is abruptly changed. This is accomplished by engine throttle modulation.

EBD: Electronic Brake Distribution. Brake pressure will be modulated to keep rear wheel slip at same level as front.

VSC: Vehicle Stability Control. In a cornering event if the yaw rate of the vehicle exceeds an expected value based on steering wheel angle and vehicle speed, the throttle will be modulated and outside front brake applied to keep the vehicle traveling in the intended direction.

In that regard, vehicle 2 or 502 has an electronic stability control system which includes a wheel speed sensor at each of the two front wheels and one at the single rear wheel, a steering angle sensor, a multi-axis sensor in the form of yaw rate and acceleration, and an electronic control unit and/or engine control module for operation of the vehicle. Communication between the various sensors and the engine could be by way of a CAN network bus, which could follow the J1939 protocol.

In particular the electronic stability control provides correction to the vehicle in the condition of over steering. In an over steering condition, the front wheels are turned inwardly to a curve to steer at a radius which is smaller than what can be handled given the speed of the vehicle. In this case the yaw velocity is too large and the rear axle slides outwardly away from the curve. In this case, stabilization is made by brake intervention at the curve outer front wheel, most likely the outer front wheel. The stability control unit detects vehicle deviation from the intended vehicle course, which sends a torque request to the engine control module to reduce engine torque, which is typically done through a throttle control.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A three wheeled vehicle, comprising:
   a frame, comprising a front frame portion, a mid frame portion and a rear frame portion;
   an engine supported by the front frame portion;
   a transmission operably coupled to the engine;
   a pair of front wheels operably coupled to the front frame portion;
   a single rear wheel operably coupled to the rear frame portion, and drivingly coupled to the transmission;
   side by side seats mounted on the mid frame portion, rearward of the engine; and
   a plurality of longitudinal frame members positioned between the side by side seats and a first plurality of upstanding frame members coupled to the longitudinal frame members, the longitudinal frame members are positioned below a fuel tank and the upstanding frame members are positioned forward of the fuel tank.

2. The vehicle of claim 1, wherein second upstanding frame members are positioned rearward of first upstanding frame members and alongside the fuel tank.

3. The vehicle of claim 1, wherein the combination of longitudinal frame members and upstanding frame members generally surrounding the fuel tank.

4. The vehicle of claim 1, wherein a support plate is coupled to the longitudinal frame members, the support plate lies between the fuel tank and a final drive member.

5. The vehicle of claim 1, further comprising a driveshaft assembly extending rearwardly from the transmission to the final drive, the fuel tank being longitudinally rearward of the driveshaft.

6. A three wheeled vehicle, comprising:
   a vehicle frame extending along a longitudinal centerline and comprising a front frame portion, a mid frame portion, and a rear frame portion;
   an engine mounted to the front frame portion;
   a front suspension coupled to the front frame portion, defined by left and right side suspension assemblies;
   front wheels, defined by a front left wheel operably coupled to the left side suspension assembly, and a right wheel operably coupled to the right side suspension assembly;
   a steering assembly operably coupled to the front wheels;
   side by side seats supported by the mid frame portion and positioned rearward of the engine;
   a single rear wheel operably coupled to the rear frame portion about an axis of rotation; and
   a fuel tank coupled to the frame, and extending along the centerline of the vehicle, the fuel tank having a bottom most surface positioned vertically above the axis of rotation of the single rear wheel, wherein a mid-point of the fuel tank is located rearward of the side by side seats and forward of the single rear wheel.

7. The vehicle of claim 6, wherein the fuel tank is coupled to the rear frame portion of the vehicle.

8. The vehicle of claim 6, further comprising a swing arm operably coupling the single rear wheel to the rear frame portion, the swing arm being pivotably coupled to the rear frame portion at a pivot location, wherein the fuel tank is substantially forward of the pivot location.

9. The vehicle of claim 6, further comprising a transmission and a front sprocket operably coupling the transmission to the rear wheel, wherein the fuel tank is substantially rearward of the front sprocket.

10. The vehicle of claim 6, wherein the fuel tank is forward of the rear wheel axis of rotation.

11. The vehicle of claim 6, further comprising a belt drive operatively coupling the engine to the rear wheel.

12. The vehicle of claim 6, further comprising a muffler longitudinally forward of the side by side seats.

13. A three wheeled vehicle, comprising:
- a vehicle frame;
- a front suspension operably coupled to the frame comprising a left front suspension assembly and a right front suspension assembly;
- front wheels defined by a front left wheel operably coupled to the left front suspension assembly and a right wheel operably coupled to the right front suspension assembly;
- an engine supported by the frame;
- at least one seat positioned rearward of the engine and having a seating bottom;
- a fuel tank supported by the frame; and
- a single rear wheel having an axis of rotation and a swing arm operably coupling the wheel to the frame rearward of the at least one seat, the swing arm being pivotably coupled to the rear frame portion at a pivot location, wherein the fuel tank is substantially forward of the pivot location, and a portion of the fuel tank is above the seating bottom.

14. The vehicle of claim 13, wherein the fuel tank is located along a longitudinal centerline of the vehicle.

15. The vehicle of claim 13, wherein the fuel tank is rearward of the at least one seat and forward of the wheel axis.

16. The vehicle of claim 13, further comprising a battery positioned below the seating bottom.

17. The vehicle of claim 13, further comprising a muffler positioned forward of the at least one seat.

18. The vehicle of claim 17, wherein the muffler is positioned forward of the seating bottom.

19. The vehicle of claim 13, wherein the rear wheel is drivingly coupled to the engine.

20. The vehicle of claim 13, wherein the fuel tank is located above the pivot location.

21. The vehicle of claim 13, wherein a steering input member is rearward of the engine.

22. The vehicle of claim 13, wherein the pivot location is rearward of the at least one seat.

23. The vehicle of claim 13, wherein the at least one seat defines a first and second seat in a side by side arrangement.

24. The vehicle of claim 23, further comprising a driveshaft assembly extending rearwardly from the engine to a final drive, the driveshaft is located between the first and second seats.

\* \* \* \* \*